(12) United States Patent
Nishimura et al.

(10) Patent No.: US 8,337,284 B2
(45) Date of Patent: Dec. 25, 2012

(54) GAME APPARATUS AND STORAGE MEDIUM HAVING GAME PROGRAM STORED THEREIN

(75) Inventors: Kentaro Nishimura, Kyoto (JP); Masayasu Nakata, Kyoto (JP); Toshikazu Tomizawa, Kyoto (JP); Yosuke Hatayama, Kyoto (JP); Noriyuki Niwa, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2514 days.

(21) Appl. No.: 11/052,046

(22) Filed: Feb. 8, 2005

(65) Prior Publication Data

US 2005/0176486 A1 Aug. 11, 2005

(30) Foreign Application Priority Data

Feb. 9, 2004 (JP) ................................ 2004-032473

(51) Int. Cl.
*A63F 9/24* (2006.01)
*A63F 13/00* (2006.01)
(52) U.S. Cl. .................... 463/4; 463/31; 463/36; 463/37
(58) Field of Classification Search ................. 463/8–9, 463/30–31, 4, 36–37
See application file for complete search history.

(56) References Cited

U.S. PATENT DOCUMENTS

| 5,618,232 | A | * | 4/1997 | Martin | 463/25 |
|---|---|---|---|---|---|
| 6,572,476 | B2 | | 6/2003 | Shoji et al. | |
| 6,926,609 | B2 | * | 8/2005 | Martin | 463/36 |
| 7,200,584 | B2 | * | 4/2007 | Sakurai | 706/58 |
| 8,246,454 | B2 | * | 8/2012 | Zalewski | 463/31 |
| 8,246,455 | B2 | * | 8/2012 | Kawabata | 463/32 |
| 8,246,457 | B2 | * | 8/2012 | Yoshida | 463/36 |
| 8,246,458 | B2 | * | 8/2012 | Nakajima et al. | 463/36 |
| 8,246,459 | B2 | * | 8/2012 | Ryu | 463/36 |
| 8,246,464 | B2 | * | 8/2012 | Willis et al. | 463/42 |
| 8,246,466 | B2 | * | 8/2012 | Herrmann et al. | 463/42 |
| 8,246,469 | B2 | * | 8/2012 | Nogami et al. | 463/42 |
| 8,246,472 | B2 | * | 8/2012 | Kaminkow et al. | 463/46 |
| 8,250,206 | B2 | * | 8/2012 | Horii et al. | 709/224 |
| 2002/0191029 | A1 | * | 12/2002 | Gillespie et al. | 345/810 |
| 2004/0183817 | A1 | * | 9/2004 | Kaasila | 345/660 |
| 2005/0140660 | A1 | * | 6/2005 | Valikangas | 345/173 |
| 2007/0287541 | A1 | * | 12/2007 | George et al. | 463/37 |

FOREIGN PATENT DOCUMENTS

EP 0 553 532 A2 8/1993
(Continued)

OTHER PUBLICATIONS

Office Action issued Jul. 4, 2008 in corresponding Japanese Application No. 2004-032473.

(Continued)

*Primary Examiner* — Steven J Hylinski
(74) *Attorney, Agent, or Firm* — Nixon & Vanderhye P.C.

(57) ABSTRACT

A touch panel 13 is mounted on a second LCD 12. If the player touch-operates the touch panel 13 so as to touch on an offense button OB, the symbolized representation of any offense athlete among a plurality of player objects composing the player's team becomes relatively large. Thus, in a game where the action or settings of a game object image is changed by touch-operating the game object image, the image of a game object that is highly frequently operated in situations similar to the current situation is enlarged, thereby facilitating touch-operation.

33 Claims, 34 Drawing Sheets

FOREIGN PATENT DOCUMENTS

| | | |
|---|---|---|
| JP | 2001-109557 | 4/2001 |
| JP | 2001-286678 | 10/2001 |
| JP | 2002-939 | 1/2002 |
| JP | 2004-021933 | 1/2004 |

OTHER PUBLICATIONS

ALB Airland Battle SCPS10015, Japan, Sony Computer Entertainment Inc., National Center for Industrial Property Information, accepted on Sep. 18, 1998, p. 65 w/ an at least partial English-language translation.

Schwarzschild W2 Koushiki Gaidobukku, Japan, Kabushiki kaisha Keibunsha, Sep. 10, 1999, first edition, p. 37 w/ an at least partial English-language translation.

European Search Report mailed Aug. 10, 2012 in European Application No. 05002494.2.

* cited by examiner

F I G. 6
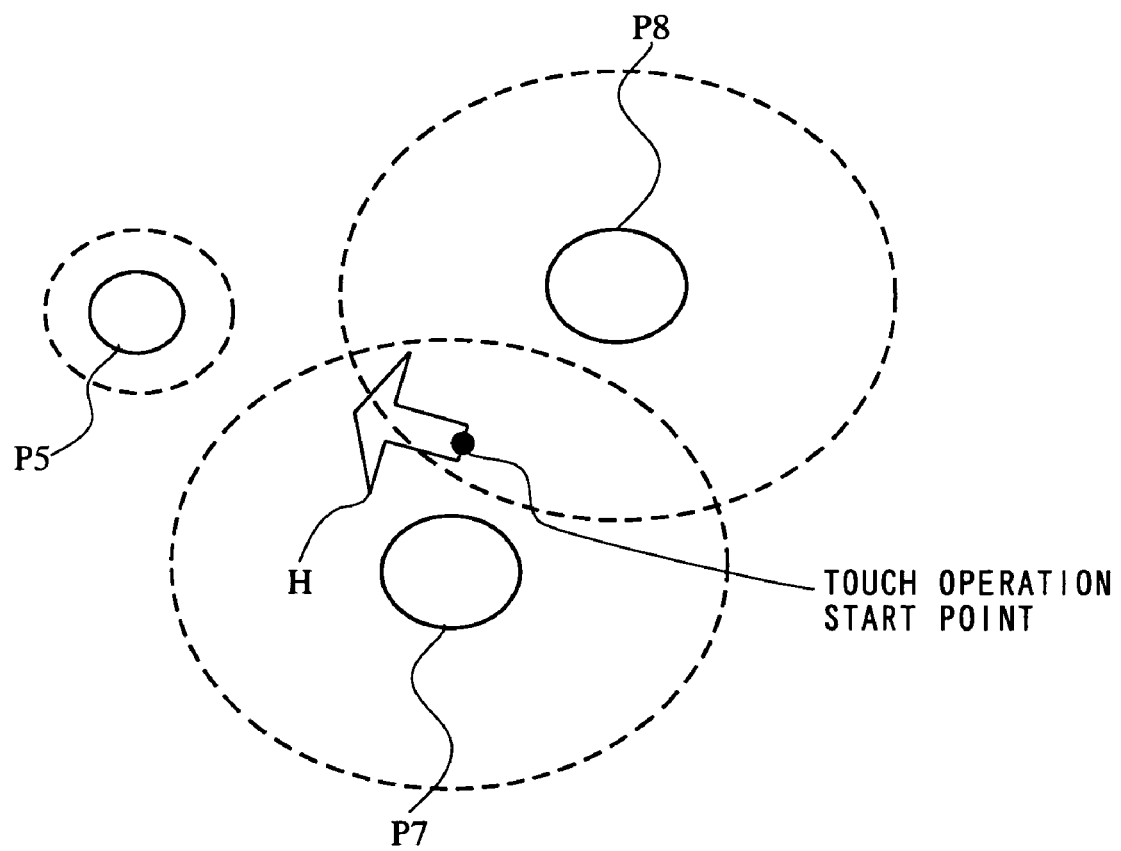

F I G. 8
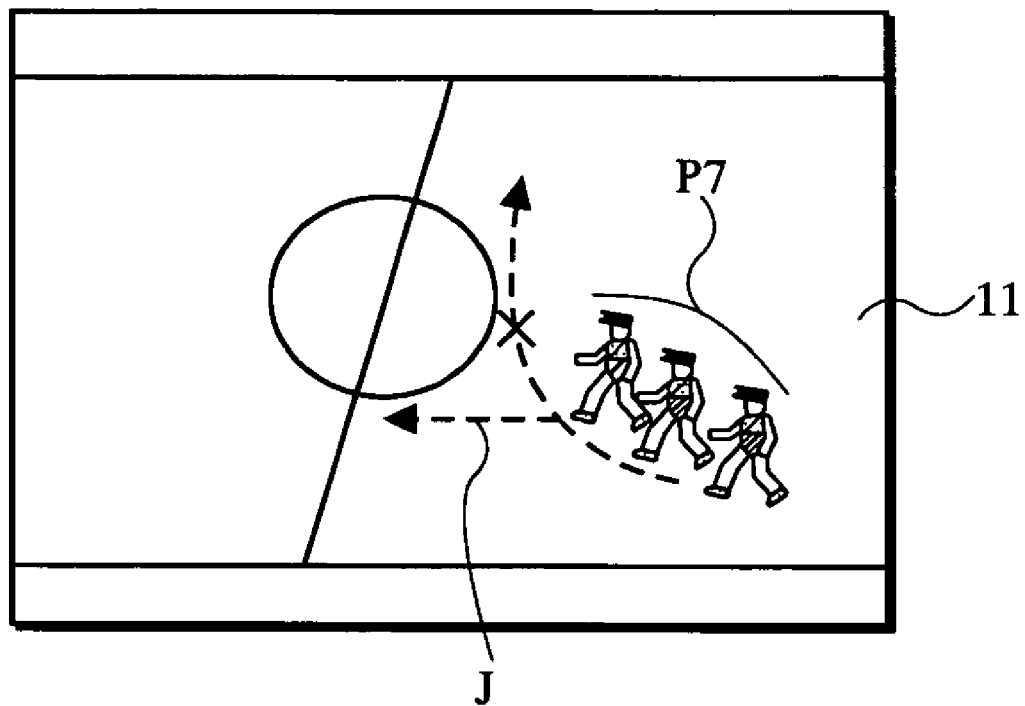

F I G. 2 3
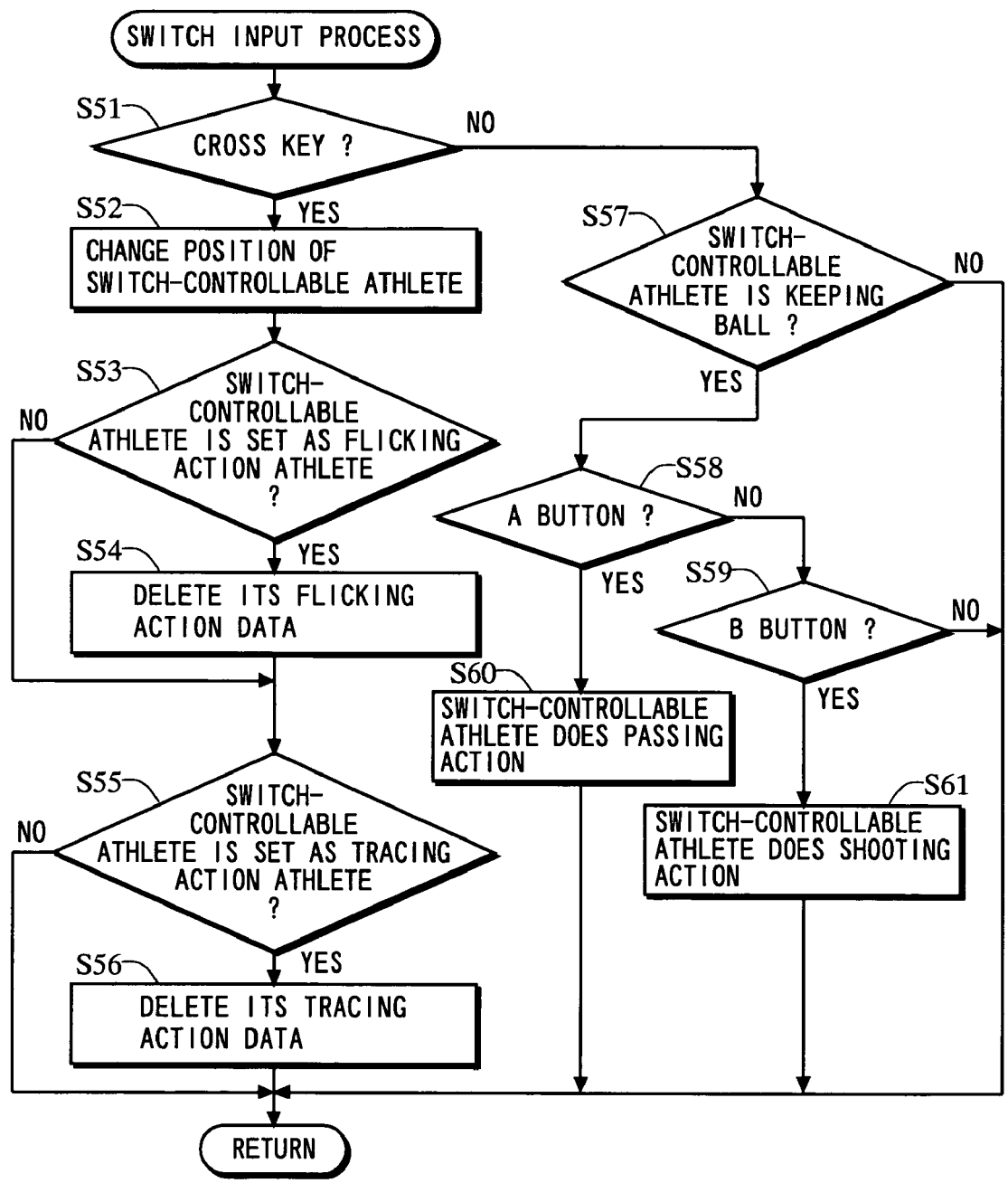

F I G. 3 4
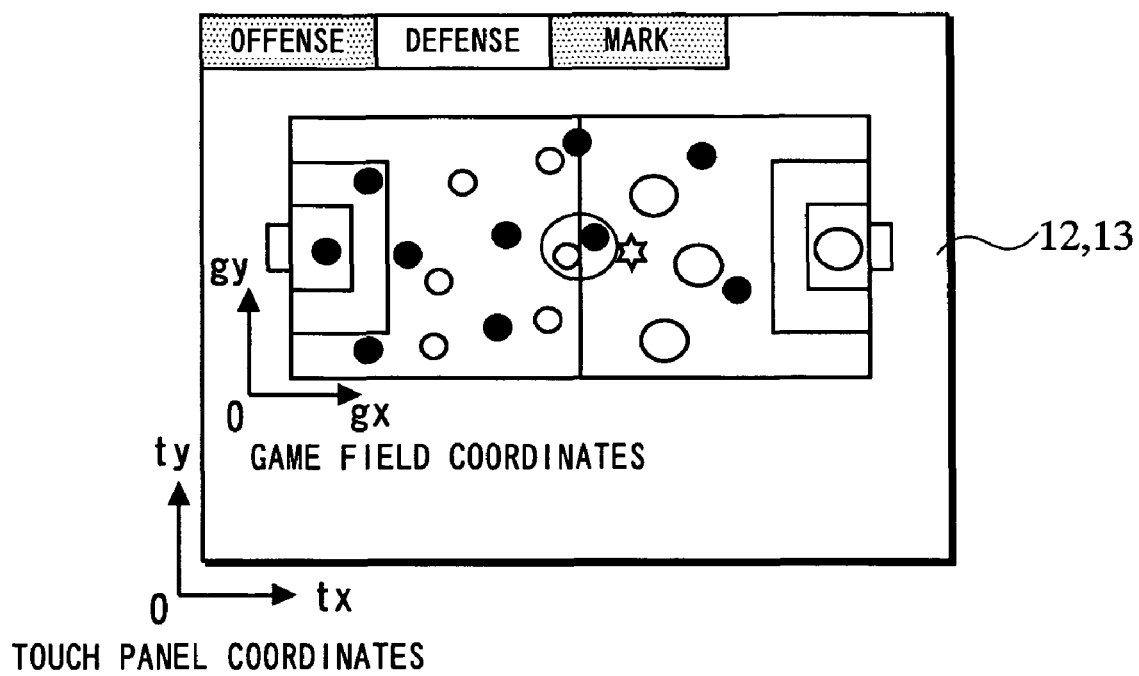

GAME APPARATUS AND STORAGE MEDIUM HAVING GAME PROGRAM STORED THEREIN

FIELD

The illustrative embodiments relate to a game apparatus and a storage medium having stored therein a game program to be executed by a computer of the game apparatus. More particularly, the illustrative embodiments relate to a game apparatus, which includes a touch panel mounted on a surface of a display section for displaying game images, and to a storage medium having stored therein a game program to be executed by a computer of the game apparatus.

BACKGROUND AND SUMMARY

Conventionally, game apparatus for allowing a player to enjoy a game by controlling a character which is displayed on a game screen have been in wide use.

Also, there are game apparatus having a touch panel provided on a display screen for controlling player characters. For example, in a game disclosed in Japanese Laid-Open Patent Publication No. 2002-939, a player causes a player character appearing in a game image to take actions while touch-operating a touch panel at appropriate times. Japanese Laid-Open Patent Publication No. 2002-939 discloses a game in which a golf swing can be executed by touching and dragging a PUSH button which is displayed as a game image on a touch panel, a game in which a player character can be made to jump by being touched, and the like. In these games, as a player touches a game image, which is displayed on a game screen, via a touch panel, an instruction indicated by the game image is executed or a character represented by the game image becomes a target for operation.

In the game apparatus disclosed in Japanese Laid-Open Patent Publication No. 2002-939, however, in order for the player to perform a game operation, it is apparently necessary to touch an object (PUSH button, a character, etc.) via the touch panel. Accordingly, if the size of an object image that is to be touched is small, it may be difficult for the player to touch the image. Here, it is conceivable to increase the size of the object image that is to be touched in order to improve the ease of touch operation. For example, in any of the following cases, it may be difficult for the player to touch the object image if the size of the object image is limited and small: the size of the display screen or the touch panel is limited; a number of objects are present on the screen; and a wide game field is desired to be displayed.

The illustrative embodiments will be described briefly below. The reference numerals, step numbers, and the like provided in parentheses merely illustrate correspondence for assisting in the understanding of the illustrative embodiments, and by no means limit the scope of the embodiments.

An exemplary game apparatus (1) of an illustrative embodiment displays a game image (second game image) in which a plurality of game objects (P) appear in a game field. The game apparatus comprises: a display section (12); a touch panel (13) provided on a surface of the display section; display control means (S30); parameter storage means (2d); first condition determination means (S25, S92 to S94); second condition definition means (2c); selection means (S26, S97 to S99); display size change means (S26, S97 to S99); determination means (S82); and changing means (S21). The display control means is operable to display on the display section a game field image representing the game field, and game object images each representing a game object, the game object images being displayed at display positions in accordance with an arrangement of the game objects in the game field. The parameter storage means is operable to store a parameter pertaining to each of the game objects. The first condition determination means is operable to determine, during game progression, whether at least one of the game objects displayed on the display section satisfies a first condition for increasing a display size of a game object image of the at least one of the game objects. The second condition definition means is operable to define, as a second condition, a parameter pertaining to a game object whose display size is to be increased, in association with the first condition. If the first determination means determines during the game progression that the first condition is satisfied, the selection means is operable to select a game object having a parameter which satisfies the second condition associated with the first condition. The display size change means is operable to change a display size of a game object image of the game object selected by the selection means so as to be larger than in a case where the game object is unselected. The determination means is operable to determine whether a judgment region on the touch panel is touched, the judgment region having a predetermined size in accordance with a position at which a game object image is displayed and a display size of the game object image. The changing means is operable to change data related to a game object corresponding to the game object image targeted for determination by the determination means. Alternatively, the display size change means may store data for a plurality of game object images to be displayed in different sizes, or an enlargement process may be performed on data for a single game object image. Also, the parameter may be invariable (attribute of $2d$), or may vary in accordance with game progression (position of $2d$ (game field coordinates)).

Specifically, the parameter includes attribute data corresponding to an attribute selected from among a plurality of attributes. In this case, the second definition means defines the second condition so as to correspond to a specific attribute.

The game apparatus may further comprise button image display control means (OB, DB, MB), and button touch detection means. The button image display control means is operable to display a button image on the display section. The button touch detection means is operable to detect whether the button image on the display section is selected by performing a touch-operation on the touch panel. In this case, the first condition is detected by the button touch detection means.

For example, the first condition is that a predetermined game situation (offense, defense) occurs during the game progression.

Also, when the game object selected by the selection means is located at a predetermined position in the game field (S25), the game object image display control means may make the game object image of the game object selected by the selection means larger on the display section (S26).

A storage medium according to one illustrative embodiment stores a game program to be executed by a computer in a game apparatus including: a display section for displaying a game image in which a plurality of game objects appear in a game field; a touch panel provided on a surface of the display section; and a storage section. The game program causes the computer to function as: display control means; parameter storage means; first condition determination means; second condition definition means; selection means; display size change means; determination means; and changing means. The display control means is operable to display on the display section a game field image representing the game field, and game object images each representing a game object, the game object images being displayed at display positions in accordance with an arrangement of the game objects in the game field. The parameter storage means is operable to store a parameter pertaining to each of the game objects. The first condition determination means is operable to determine, during game progression, whether at least one of the game objects displayed on the display section satisfies a first condition for increasing a display size of a game object image of the at least one of the game objects. The second condition definition means is operable to define, as a second condition, a parameter pertaining to a game object whose display size is to be increased, in association with the first condition. The selection means is operable to, if the first determination means determines during the game progression that the first condition is satisfied, select a game object having a parameter which satisfies the second condition associated with the first condition. The display size change means is operable to change a display size of a game object image of the game object selected by the selection means so as to be larger than in a case where the game object is unselected. The determination means is operable to determine whether an evaluation region on the touch panel is touched, the evaluation region having a predetermined size in accordance with a position at which a game object image is displayed and a display size of the game object image. The changing means is operable to change data related to a game object corresponding to the game object image targeted for determination by the determination means.

Specifically, the parameter includes attribute data corresponding to an attribute selected from among a plurality of attributes. In this case, the second definition means defines the second condition so as to correspond to a specific attribute.

The game program may cause the computer to function further as button image display control means, and button touch detection means. The button image display control means is operable to display a button image on the display section. The button touch detection means is operable to detect whether the button image on the display section is selected by performing a touch-operation on the touch panel. In this case, the first condition is detection by the button touch detection means.

For example, the first condition is that a predetermined game situation occurs during the game progression.

Also, when the game object selected by the selection means is located at a predetermined position in the game field (S25), the game object image display control means may make the game object image of the game object selected by the selection means larger on the display section.

According to the an exemplary game apparatus of one illustrative embodiment, in a game where the action and settings of game objects can be changed, it is possible to increase the display size of an image of a game object having a predetermined parameter in accordance with the situation by touch-operating the image of the game object. Accordingly, it is easy to perform touch-operation on a game object having a parameter from which it can be recognized that the game object is highly likely to be operated in the current situation. Also, not all game object images are increased, and therefore the possibilities that game object images might overlap with each other or a game field image might be widely hidden are low, making it possible to maintain the ease of viewing the game image. It is also possible to display a number of game object images as necessary. Further, through the visual effect of enlarging the display size of a game object image, the player can readily recognize a game object which is frequently operated in situations similar to the current situation.

In the case of defining the second condition so as to correspond to a specific attribute, game objects are classified by their attributes, and the size of an image of a game object associated with the specific attribute is increased in accordance with the current situation. Thus, the size of an image of a game object, which is frequently operated in situations similar to the current situation, is enlarged, thereby facilitating easy touch-operation.

In the case where the first condition is satisfied by touch-operating a button image, the player is able to increase the size of a game object image by touching the button image, and therefore can selectively adjust the size of the game object image as the player desires.

In the case where the first condition is satisfied in accordance with the game situation during the game progression, the size of a game object image is automatically changed in accordance with the game situation, and therefore the size of an image of a game object, which is frequently operated in situations similar to the current situation, is automatically enlarged, making it possible to quickly and readily perform touch-operation.

Also, in the case where an image of a game object is made larger in accordance with the position of the game object in the game field, it is possible to make the display size of an image of the most important game object in the game larger, thereby facilitating easy touch-operation on the image of the most important game object in the game.

Also, according to an exemplary game program of one illustrative embodiment, stored in a storage medium, the game program stored in the storage medium can be executed by a computer in the game apparatus, whereby effects similar to those attained by the aforementioned game apparatus can be obtained.

These and other aspects of the illustrative embodiments will become more apparent from the following detailed description of the illustrative embodiments when taken in conjunction with the accompanying drawings.

BRIEF DESCRIPTION OF THE DRAWINGS

FIG. 6 is a diagram for explaining a touch-controllable athlete that is selected in accordance with a touch operation start point;

FIG. 8 is a diagram for explaining an exemplary action of a player object P7 which is set to be a switch-controllable athlete during a movement of a tracing action;

FIG. 23 shows the subroutine of a switch input process to be performed at step S15 of FIG. 20;

FIG. 34 is a diagram illustrating the relationship between touch panel coordinates and game field coordinates.

DESCRIPTION OF THE ILLUSTRATIVE EMBODIMENTS

Figure 1:
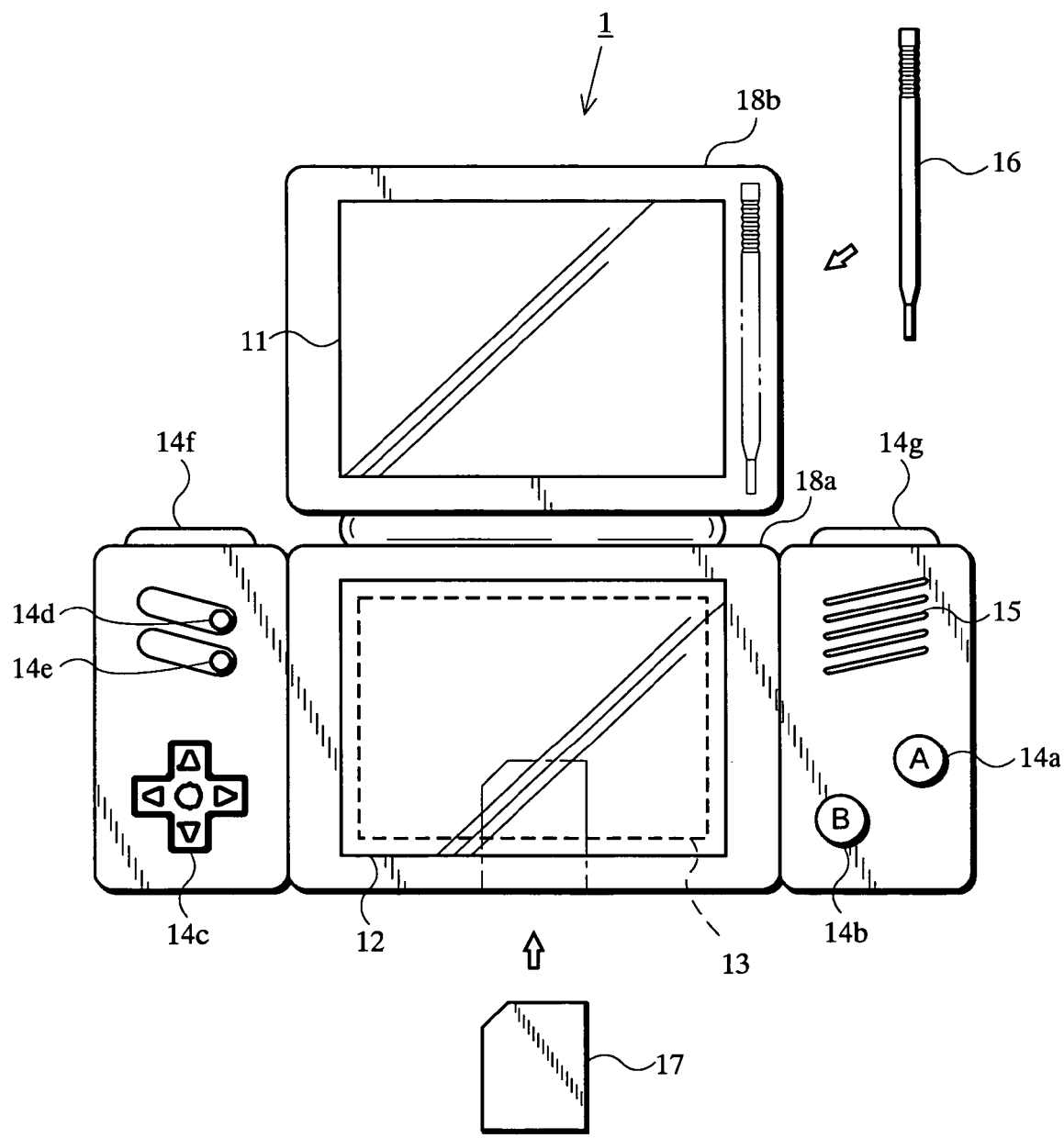
FIG. 1 is a view showing an outer appearance of a game apparatus 1 according to one illustrative embodiment.

An exemplary game apparatus for executing a game program according to one illustrative embodiment will be described with reference to the accompanying drawings. FIG. 1 is an external view of an exemplary game apparatus 1 which executes the game program. Here, a hand-held game apparatus is described as an example of the game apparatus 1.

In FIG. 1, the game apparatus 1 is accommodated in a housing 18 so that two liquid crystal display devices (hereinafter referred to as "LCDs") 11 and 12 are placed in predetermined positions. Specifically, in the case where the first and second LCDs 11 and 12 are to be disposed one on top of the other, the housing 18 is composed of a lower housing 18a and an upper housing 18b, the upper housing 18b being supported by a portion of the upper side of the lower housing 18a so as to be pivotable. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); and a direction switch (cross key) 14c, a start switch 14d, a select switch 14e, and side switches 14f and 14g, which are provided on a principal face of the left wing of the lower housing 18a (lying to the left of the second LCD 12). The operation switches 14a and 14b are used for giving instructions such as: "pass", "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of a moving direction for (i.e., a direction in which to move) a player object (or a player character) that can be controlled by using the operation switch section 14, or instructions of a moving direction for a cursor, for example. The side switches ("L" button) 14f and ("R" button) 14g are provided at the left and right ends of an upper face (upper side face) of the lower housing 18a. As necessary, more operation switches may be added.

A touch panel 13 (an area marked by dotted lines in FIG. 1) is mounted on the upper principal face of the second LCD 12. The touch panel 13 may be of any one of a resistive film type, an optical type (infrared type), and a capacitive coupling type. When a stick 16 (or a finger) is pressed against or moved or dragged on the upper principal face of the touch panel 13, the touch panel 13 detects the coordinate position of the stick 16 and outputs coordinate data.

As necessary, a hole (an area marked by double-dot lines in FIG. 1) for accommodating the stick 16 with which to manipulate the touch panel 13 is provided near a side face of the upper housing 18b. The hole can hold the stick 16. A cartridge receptacle (an area marked by dash-dot lines in FIG. 1) is provided in a portion of a side face of the lower housing 18a, into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
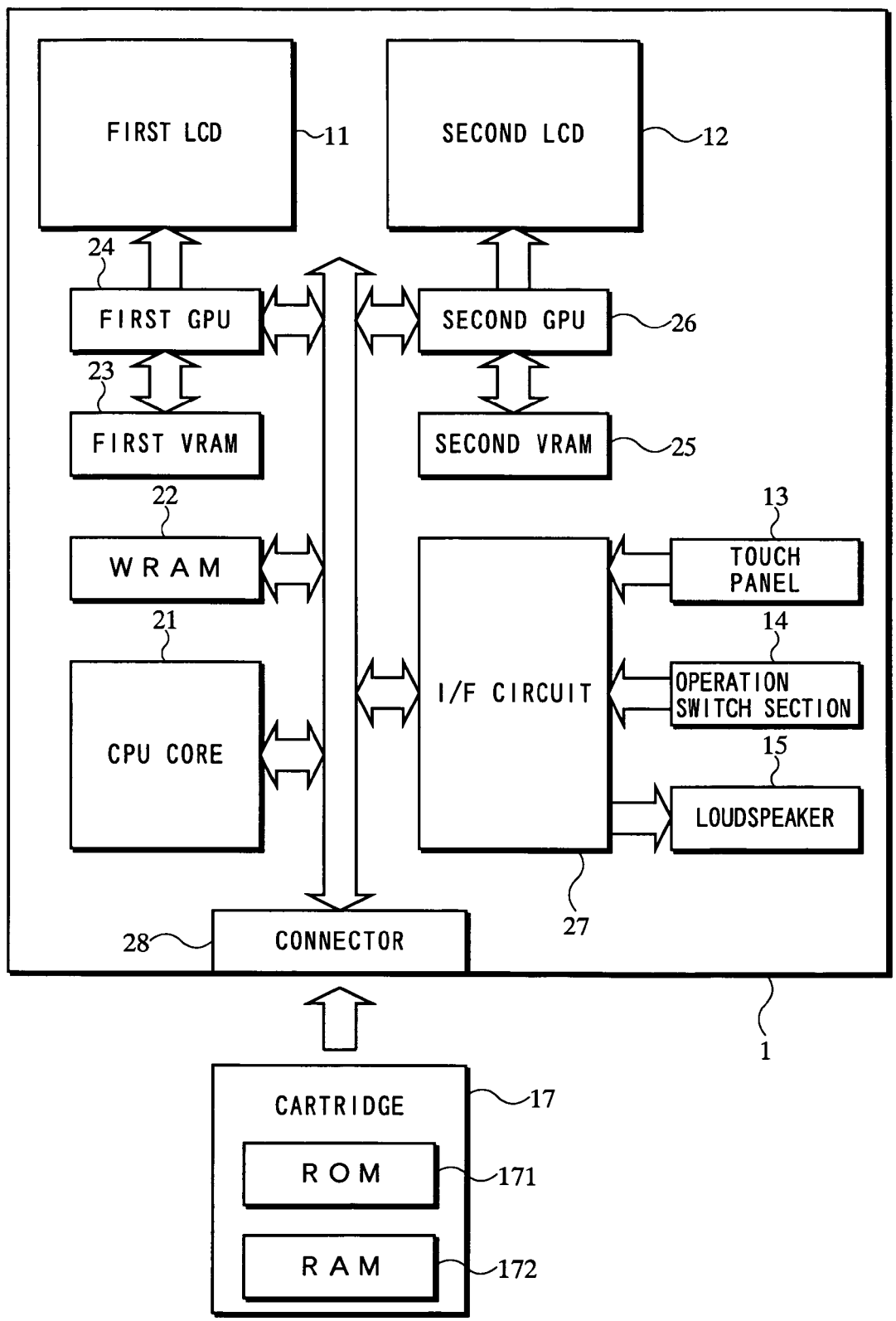
FIG. 2 is a block diagram illustrating an internal structure of the game apparatus 1 of FIG. 1.

Next, referring to FIG. 2, the internal structure of the game apparatus 1 will be described. FIG. 2 is a block diagram illustrating an internal structure of the game apparatus 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM (WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has recorded therein a game program which comprises instructions and data which are of a format executable by a computer in the game apparatus 1, in particular by the CPU core 21. The game program is loaded to the WRAM 22 as appropriate, and executed. Although the game program and the like are recorded on the cartridge 17 above, the game program and the like may be supplied via any other medium or via a communications circuit.

The touch panel 13, the operation switch section 14, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image on the basis of the data used for image generation which is stored in the WRAM 22, and writes images into the first VRAM 23. In accordance with an instruction from the CPU core 21, the second GPU 26 generates a second game image on the basis of the data used for image generation which is stored in the WRAM 22, and writes images into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been output from the first GPU 24. The second GPU 26 outputs to the second LCD 12 the second game image which has been written into the second VRAM 25 in accordance with an instruction from the CPU core 21, and the second LCD 12 displays the second game image having been output from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a coordinate system corresponding to the coordinate system of the second VRAM 25, and outputs data of position coordinates corresponding to a position which is input (designated) by means of the stick 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 16:
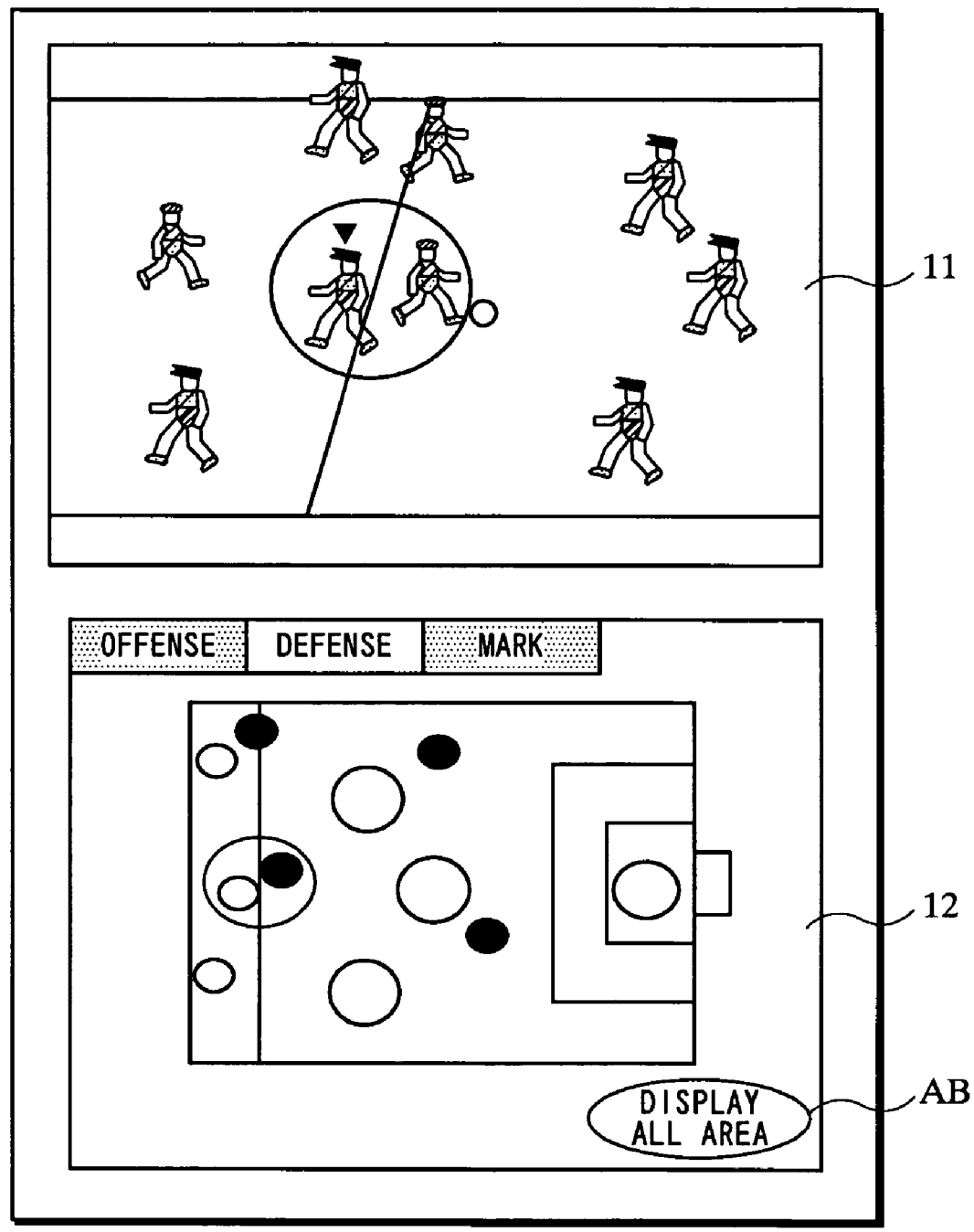
FIG. 16 is a diagram illustrating an exemplary first game image and an exemplary enlarged second game image.
Figure 17:
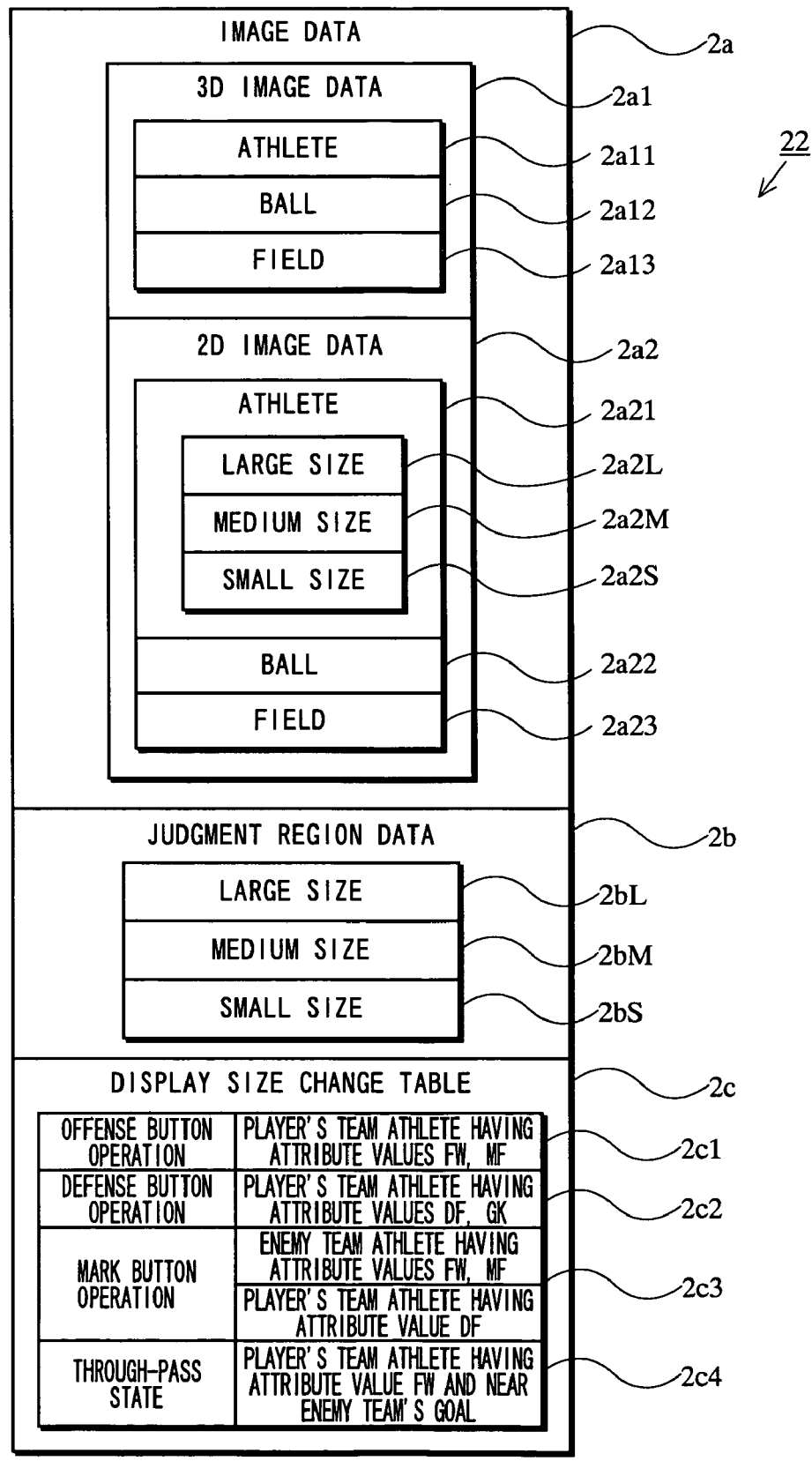
FIG. 17 is a RAM image diagram of a WRAM 22 of FIG. 2.
Figure 18:
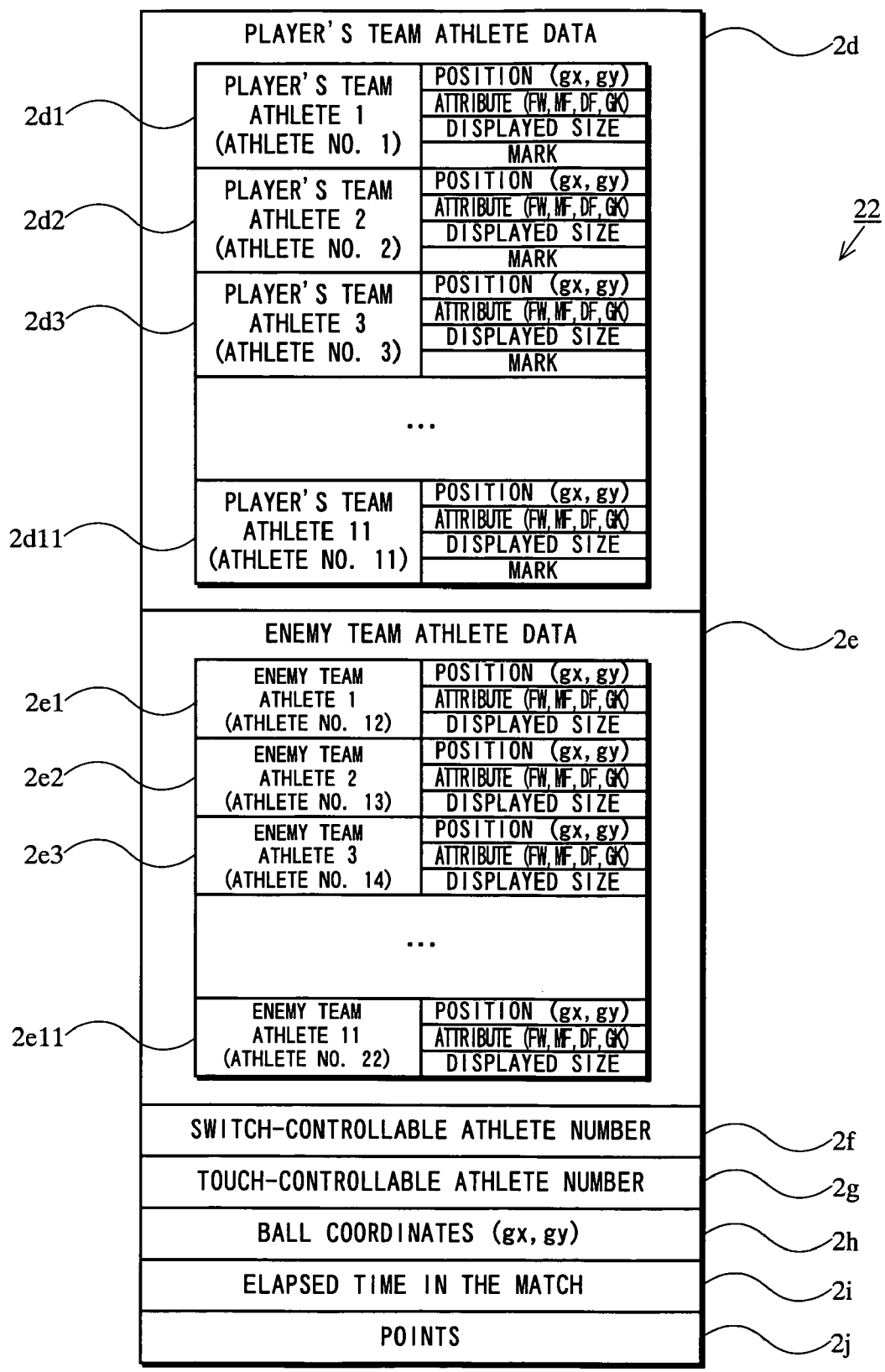
FIG. 18 is a RAM image diagram of the WRAM 22 of FIG. 2.
Figure 19:
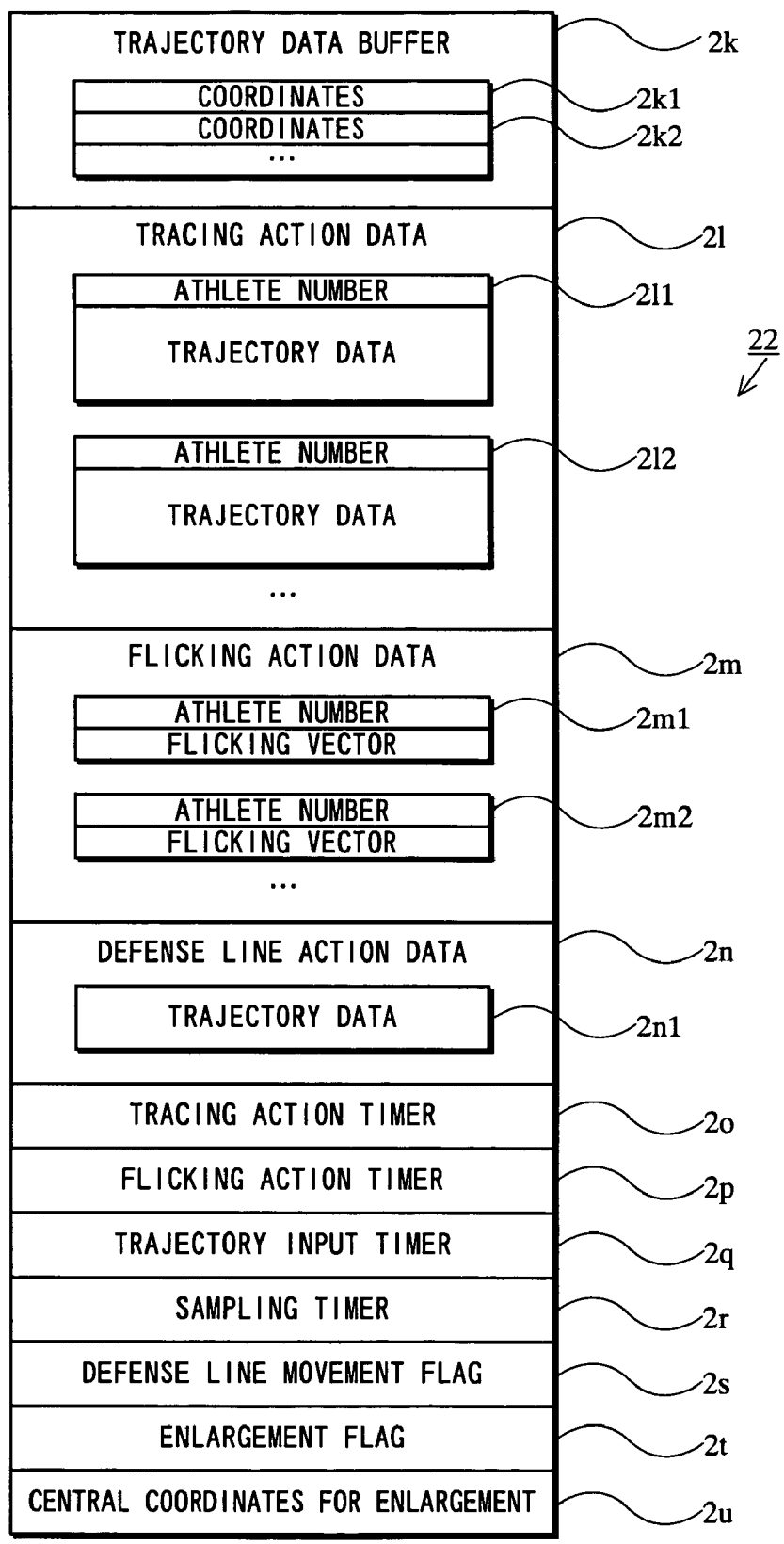
FIG. 19 is a RAM image diagram of the WRAM 22 of FIG. 2.

Next, processes performed by a game apparatus which executes the game program will be described with reference to FIGS. 3 to 34. A game which is provided by the game program is a soccer game in which a plurality of player objects (game objects) that are controllable by the player appear in a game space. FIGS. 3 to 16 are diagrams illustrating exemplary game images to be displayed on the first LCD 11 and the second LCD 12. FIGS. 17 to 19 are diagrams for explaining RAM images of an exemplary WRAM 22. FIGS. 20 to 33 are flowcharts which are to be executed by the game apparatus 1 in accordance with an exemplary game program. FIG. 34 is a diagram for explaining coordinate data to be used in an exemplary game program.

Figure 3:
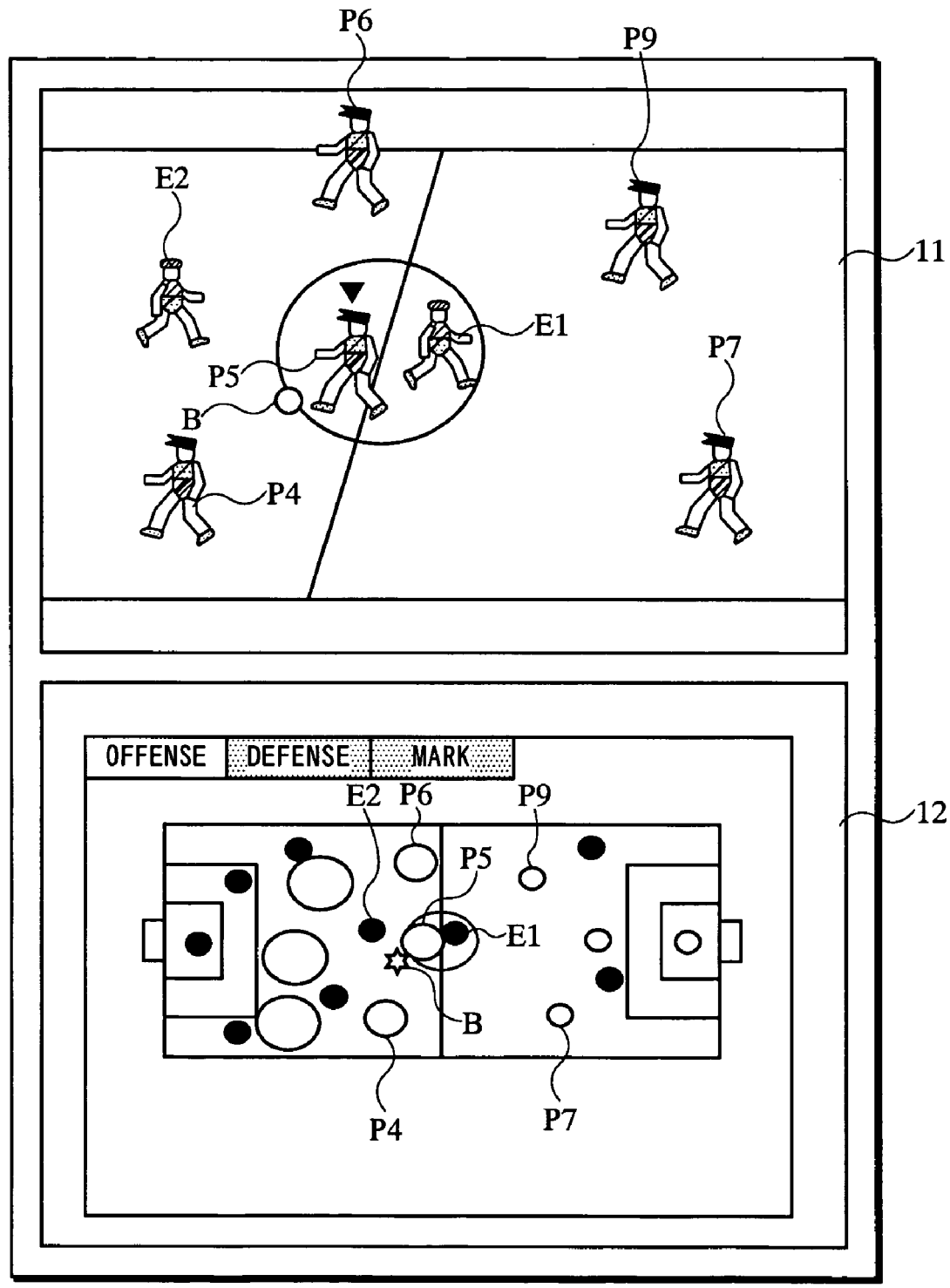
FIG. 3 is a diagram showing an example of a first game image and an example of a second game image to be displayed on a first LCD 11 and a second LCD 12, respectively.

FIG. 3 shows an example of a first game image to be displayed on the first LCD 11 and an example of a second game image to be displayed on the second LCD 12. The first game image is a 3D expression of a part of a game field (soccer field) which is provided in the game space. The second game image is a 2D image expression of the same game space as viewed from above. In other words, the first game image and the second game image are images representing the same game space, such that each object acts similarly in both images. In the second game image, a 2D image of the entire game field is presented, on which a simplified version of each object is shown so as to correspond to its position in the game field. In other words, the second game image is a radar representation of the entire soccer field and all objects thereon. Thus, according to one illustrative embodiment the first game image is presented as a 3D expression and the second game image is presented as a 2D expression of the entire game field in the game space. Alternatively, both game images may be 2D expressions, or both game images may be 3D expressions.

FIG. 3 shows a state in which the player's team is on offense. In the first game image, a predetermined range of game space, substantially centered around an athlete object which has the ball, is displayed. Specifically, in the first game image of FIG. 3, player objects P4 to P7 and P9, which constitute part of the athlete objects composing the player's team, and enemy objects E1 and E2, which constitute part of the athlete objects composing an enemy team, are shown. In the first game image, a ball object B representing a soccer ball is also displayed. A plurality of athlete objects composing the player's team are the player objects that are controllable by the player. Specifically, one of the plurality of athlete objects composing the player's team is controllable by means of the operation switch section 14, and all of the athlete objects composing the player's team are controllable by means of the touch panel 13.

While on offense, the player object which has the ball object B is automatically selected as a switch-controllable athlete. As used herein, a "switch-controllable athlete" is a player object which is player controllable by using the operation switch section 14, e.g., the operation switches 14*a* and 14*b* or the direction switch 14*c*. In FIG. 3, the player object P5 is set as a switch-controllable athlete and is being displayed with a mark (e.g., a solid triangle) so as to be distinguishable from the other objects. On the other hand, while the player is on defense, the player object which is closest to the ball object B is set as the aforementioned switch-controllable athlete. The first game image is a 3D expression of a game space which at least contains the player object that is set as the switch-controllable athlete.

The second game image is a radar representation, as plan-viewed from above, of the entire soccer field (game field) which is set in the game space. The second game image shows all player objects in the player's team which are controllable by the player, and each player object is symbolized as a blank circle or the like. In the second game image, each of the player objects P4 to P7 and P9 which are shown in the first game image are symbolized at the same position on the game field as in the first game image. The second game image shows all of the plurality of athlete objects composing the enemy team, each being symbolized as a solid circle or the like. In the second game image, each of the athlete objects E1 and E2 shown in the first game image are symbolized at the same position on the game field as in the first game image. The second game image also shows the ball object B representing a soccer ball, which is symbolized by a star, for example.

Figure 4:
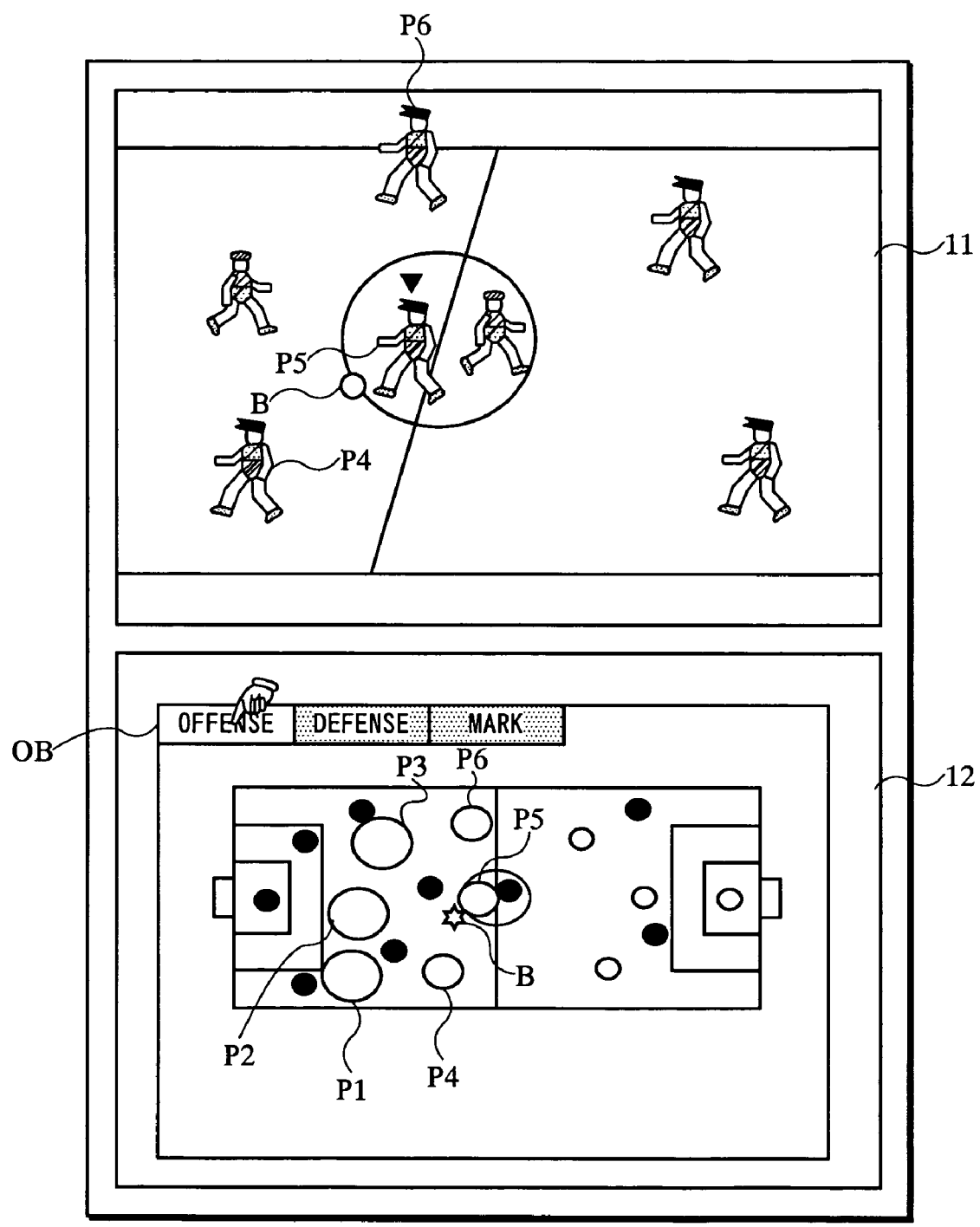
FIG. 4 is a diagram illustrating an exemplary first game image and an exemplary second game image to be displayed in the case where an offense button OB is touch-operated.

In FIG. 4, in an upper left region of the second game image, an offense button OB is displayed. If the player touch-operates the touch panel 13 so as to touch on the offense button OB, the symbolized representation of any "offense athlete" among the plurality of athlete objects composing the player's team becomes relatively large. In FIG. 4, a mark representing a hand is shown at the position of the offense button OB, which is a schematic representation of the player's hand performing the touch operation (the same is also true in FIG. 5 and any subsequent figure). The player objects and enemy objects in the soccer game are classified by attribute values as follows: forward (hereinafter also referred to as "FW"), midfielder (hereinafter also referred to as "MF"), defender (hereinafter also referred to as "DF"), and goalkeeper (hereinafter also referred to as "GK"). For example, the aforementioned "offense athletes" correspond to the player objects of the attribute values FW and MF. In FIG. 4, the player objects P1 to P3 (attribute value FW) and the player objects P4 to P6 (attribute value MF) are symbolized so as to appear relatively large as compared to the other player objects (attribute values DF and GK).

If the player touch-operates the offense button OB, the symbolized representation of any player object which is capable of receiving a through-pass becomes even larger. For example, "player objects which are capable of receiving a through-pass" are player objects of the attribute value FW which are deployed near a penalty area of the enemy team in a state where a player object of the attribute value MF is keeping the ball object B. In FIG. 4, since the player object P5 of the attribute value MF is keeping the ball object B, the symbolized representations of the player objects P1 to P3 of the attribute value FW are made larger than the other player objects, thus being indicated as player objects which are capable of receiving a through-pass.

The above illustrates an example in which the symbolized representations of the player objects in the second game image are changed in size when the player has touch-operated the offense button OB. Alternatively, an automatic size change may be made in accordance with the position at which each player object is located. For example, while a given player object has the ball on the enemy side of the field, the symbolized representations of the player objects corresponding to offensive athletes may automatically be made relatively large. Moreover, the symbolized representations of the player objects corresponding to offensive athletes may automatically be made relatively large also while a given enemy object has the ball on its own side of the field (i.e., the enemy side from the standpoint of the player).

Figure 5:
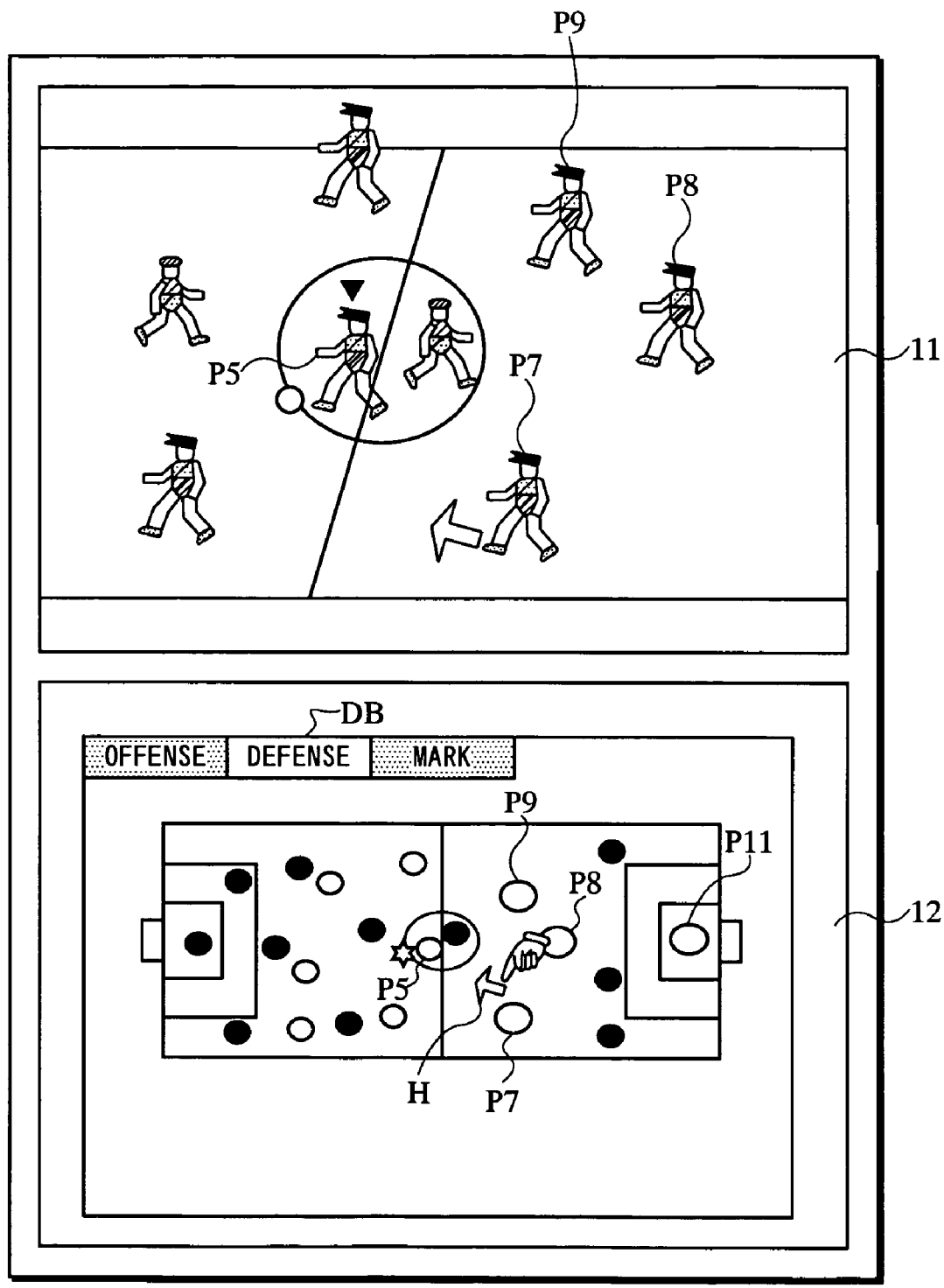
FIG. 5 is a diagram illustrating an exemplary first game image and an exemplary second game image to be displayed in the case where a defense button DB is touch-operated, in which a flicking action is shown.

In FIG. 5, in the upper left region of the second game image, a defense button DB is also displayed. If the player touch-operates the touch panel 13 so as to touch the defense button DB, the symbolized representation of any "defensive athlete" among the plurality of player objects composing the player's team becomes relatively large. For example, the aforementioned "defensive athletes" correspond to the player objects of the attribute values DF and GK. In FIG. 5, the player objects P7 to P9 (attribute value FW) and P11 (attribute value GK) are symbolized so as to appear relatively large as compared to the other player objects (attribute values FW and MF). Thus, by increasing the displayed size of those player objects which are likely to be touch-operated given the game situation, the operation of the player objects using the touch panel 13 is facilitated.

By using the touch panel 13, the player can select a player object from among the plurality of player objects shown in the second game image, and control the player object. A first example of an action to be made by a player object in response to an operation using the touch panel 13 is a flicking action. For example, suppose that the player has performed a touch operation in a manner of flicking the touch panel 13, in a direction from the root of arrow H to the tip of arrow H. In this case, one of the player objects (referred to as a "touch-controllable athlete") is selected in accordance with the start point of the touch operation (referred to as the "touch operation start point"), and this player object moves linearly in the direction of arrow H for a predetermined period of time (flicking action). As used herein, a "touch-controllable athlete" is an athlete object which, when a certain touch operation is performed, moves in accordance with the touch operation. Hereinafter, with reference to FIG. 6, the touch-controllable athlete to be selected in accordance with the touch operation start point will be described.

FIG. 6 is a schematic enlarged diagram showing a portion of the second game image. In FIG. 6, each player object displayed in the second game image has a judgment region extending around itself. In FIG. 6, judgment regions corresponding to the player objects P5, P7, and P8 are each shown by a broken line. The size of each such judgment region is proportional to the size of the symbolized representation of the player object. Any player object whose judgment region happens to accommodate the touch operation start point is a candidate for a touch-controllable athlete. For example, if the player has performed a touch operation in a manner of flicking the touch panel 13 in the direction of arrow H, the player objects P7 and P8 become touch-controllable athlete candidates. Out of these candidates, the player object whose symbolized representation's outer periphery lies closest to the touch operation start point is selected as a touch-controllable athlete. For example, in the case of FIG. 6, the player object P7 is selected as the touch-controllable athlete.

As described above, among the player objects whose judgment regions accommodate a touch operation start point, the player object whose symbolized representation's outer periphery lies closest to the touch operation start point is selected as a touch-controllable athlete. In another example, among the player objects whose judgment regions accommodate the touch operation start point, the player object whose symbolized representation's center (or whose judgment region's center) lies closest to the touch operation start point may be selected as a touch-controllable athlete. In still another example, among the player objects whose judgment regions accommodate the touch operation start point, the player object which minimizes the value of the ratio "distance between the touch operation start point and the center of the judgment region/radius of the judgment region" may be selected.

Referring back to FIG. 5, the player object P7 which is selected as the touch-controllable athlete makes a flicking action, and moves linearly in the direction of arrow H on the second game image for the duration of a predetermined period of time. Simultaneously on the first game image, the player object P7 also moves linearly in the direction of the arrow shown, for the duration of the predetermined period of time. Even before the lapse of the predetermined period of time, the linear movement may be ceased when a predetermined condition is satisfied (e.g., when going beyond a touch line). "A certain period of time" is a notion which not only refers to a predetermined period of time, but also encompasses a period which may vary depending on predetermined conditions.

Figure 7:
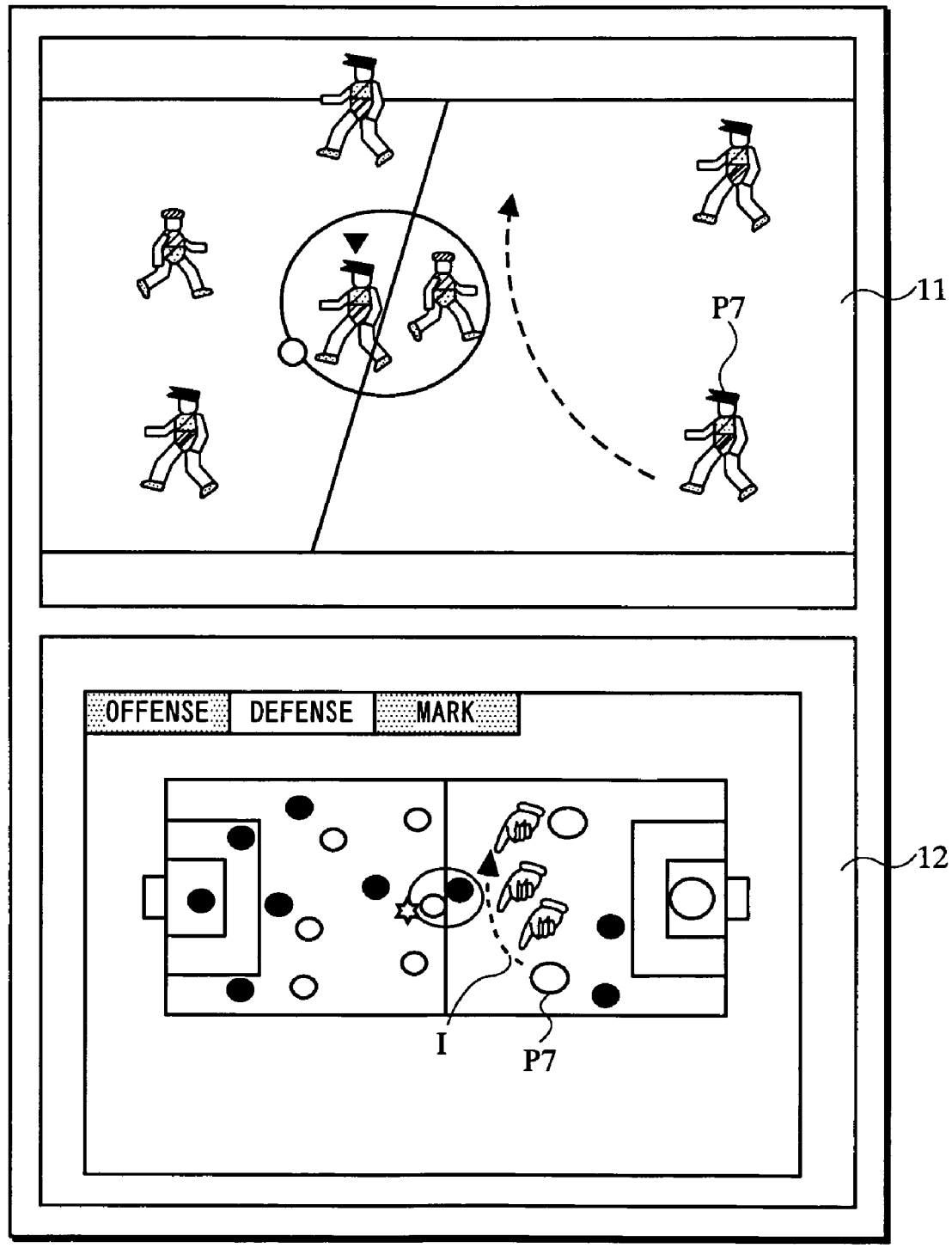
FIG. 7 is a diagram illustrating an exemplary first game image and an exemplary second game image in which a tracing action is shown.

A second example of an action to be made by a player object in response to an operation using the touch panel 13 is a tracing action. Suppose that, as shown in FIG. 7, the player has performed a touch operation on the touch panel 13 so as to draw a trajectory (as indicated by a broken line) in the direction of arrow I. In this case, in a similar manner to the above, the player object P7 is selected as a touch-controllable athlete in accordance with the touch operation start point. Then, the trajectory of the touch operation is displayed on the second game image, and the player object P7 moves along the displayed trajectory (tracing action). Simultaneously on the first game image, the player object P7 moves along a trajectory in the direction of the arrow shown. Note that among the two arrows shown in FIG. 7, the arrow on the second game image is actually displayed, but the arrow on the first game image is only illustrative and not actually displayed on the game screen. Alternatively, the arrow on the first game image may also be displayed.

Note that a player object which is moving in a flicking action or tracing action as described above may be set as a switch-controllable athlete during the movement (for example, if the ball comes near a player object undergoing a flicking action, the player object undergoing the flicking action will be set as a switch-controllable athlete). In this case, unless a further instruction for movement is given from the player by means of the operation switch section 14, the flicking action or tracing action is continued. On the other hand, if a further instruction for movement is given by operating the operation switch section 14 during the movement, the player object gives priority to the instruction for movement given by means of the operation switch section 14. For example, as shown in FIG. 8, if the player object P7 which is undergoing a movement of a tracing action is set as a switch-controllable athlete and the player presses "left" on the direction switch 14c, the player object P7 will cease the tracing action and move in the direction of arrow J.

Figure 9:
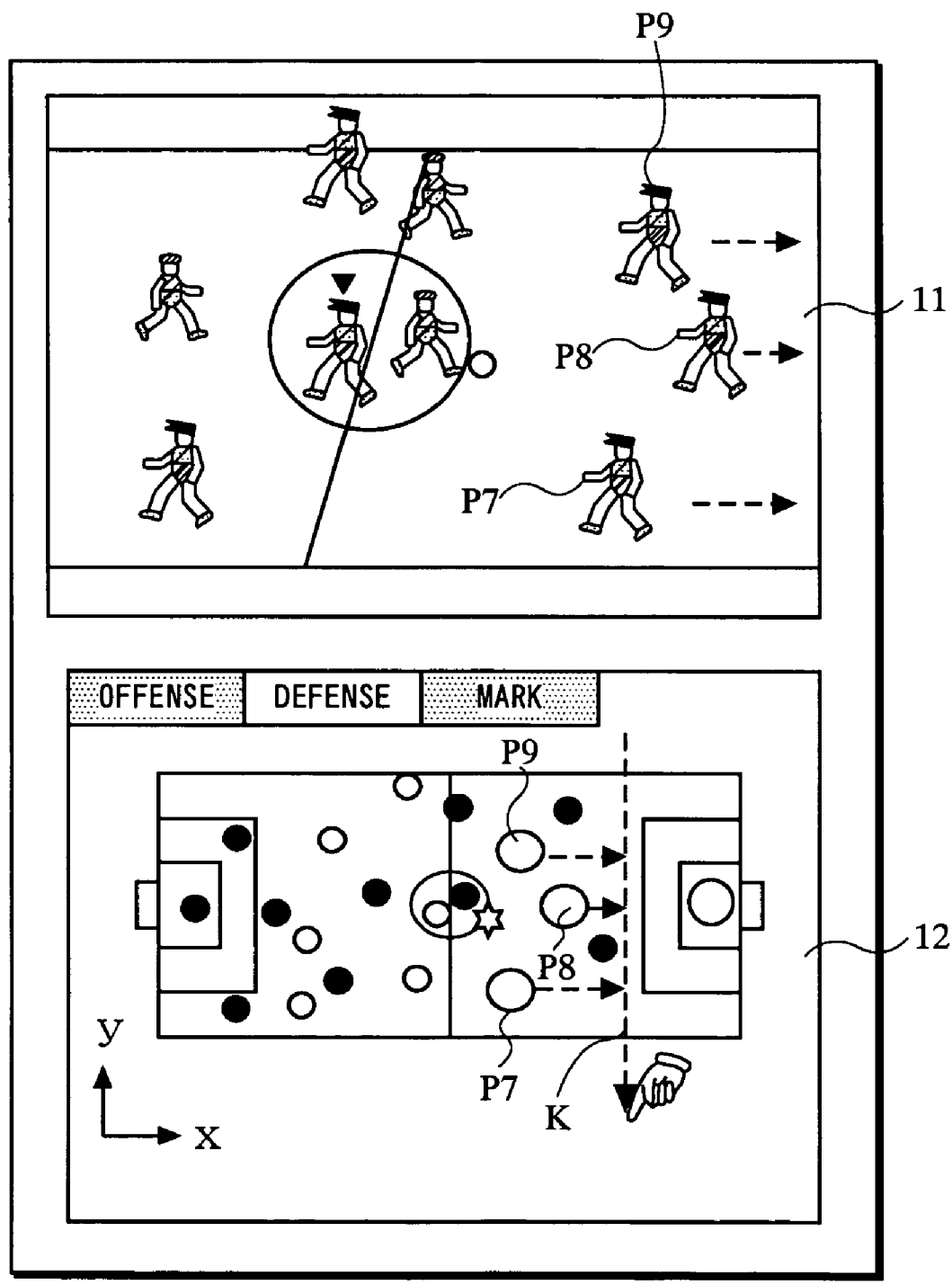
FIG. 9 is a diagram illustrating an exemplary first game image and an exemplary second game image in which a defense line action is shown.

A third example of an action to be made by a player object in response to an operation using the touch panel 13 is a defense line action. As shown in FIG. 9, suppose that the player has performed a touch operation on the touch panel 13 so as to draw a trajectory across the field in the direction of arrow K, as indicated by a dotted line (vertical direction in FIG. 9; hereinafter x-y coordinates will be defined by referring to this direction as the y direction and referring to a direction perpendicular to the y direction as the x direction). In this case, the trajectory (hereinafter referred to as defense line K) of the touch operation is displayed on the second game image, and the player objects of the attribute value DF move so as to line up along the defense line K (defense line action). Specifically, the player objects of the attribute value DF move along the x direction so as to approach the defense line K by a predetermined distance in a unit period of time. For example, in FIG. 9, the player objects P7 to P9 of the attribute value DF move toward the defense line K. Simultaneously on the first game image, the player objects P7 to P9 move toward the defense line K which has been set in the second game image.

Figure 10:
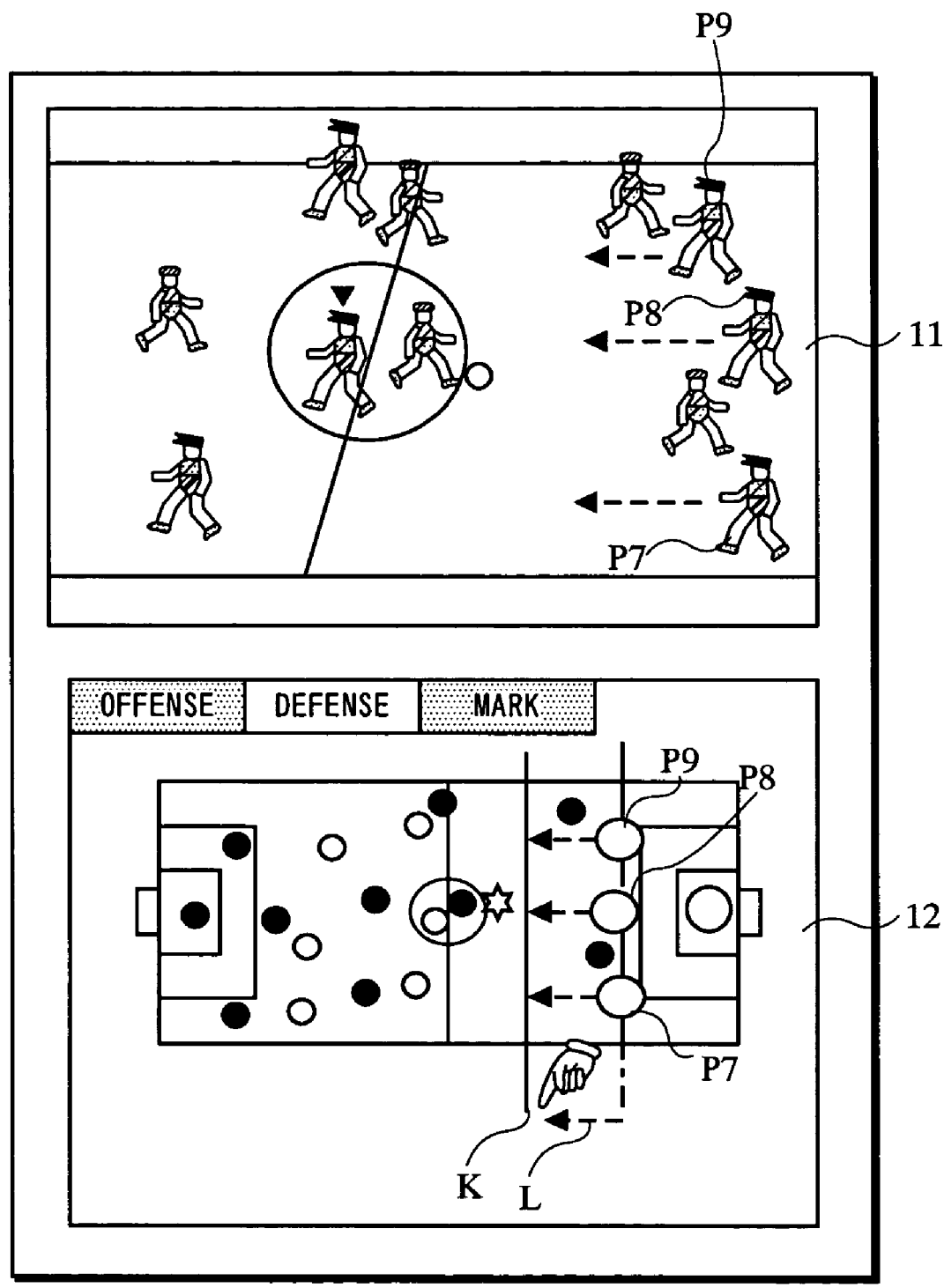
FIG. 10 is a diagram illustrating an exemplary first game image and an exemplary second game image to be displayed when a drag operation is performed for a defense line.

The defense line K drawn on the second game image can be translated along the x direction if the player performs a dragging touch operation on the touch panel 13. As shown in FIG. 10, suppose that the player has performed a touch operation on the touch panel 13 so as to drag the defense line K in the direction of arrow L. In this case, the defense line K displayed on the second game image is translated along the x direction in accordance with the touch operation. As a result, the player objects of the attribute value DF move so as to line up along the translated defense line K. For example, in FIG. 10, the player objects P7 to P9 of the attribute value DF move toward the translated defense line K. Simultaneously on the first game image, the player objects P7 to P9 move toward the defense line K which has been translated in the second game image.

Figure 11:
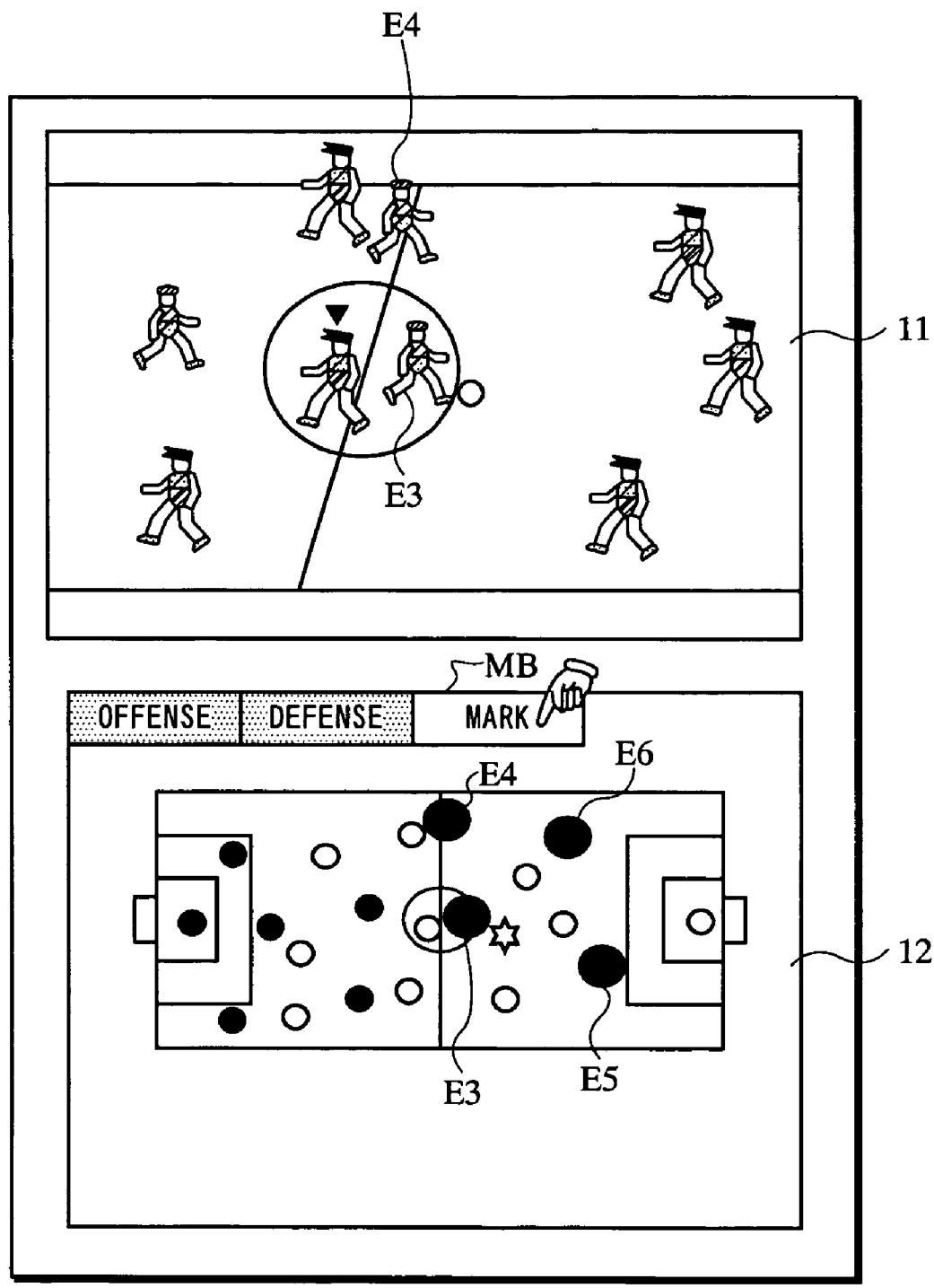
FIG. 11 is a diagram illustrating an exemplary first game image and an exemplary second game image to be displayed in the case where a mark button MB is touch-operated.
Figure 12:
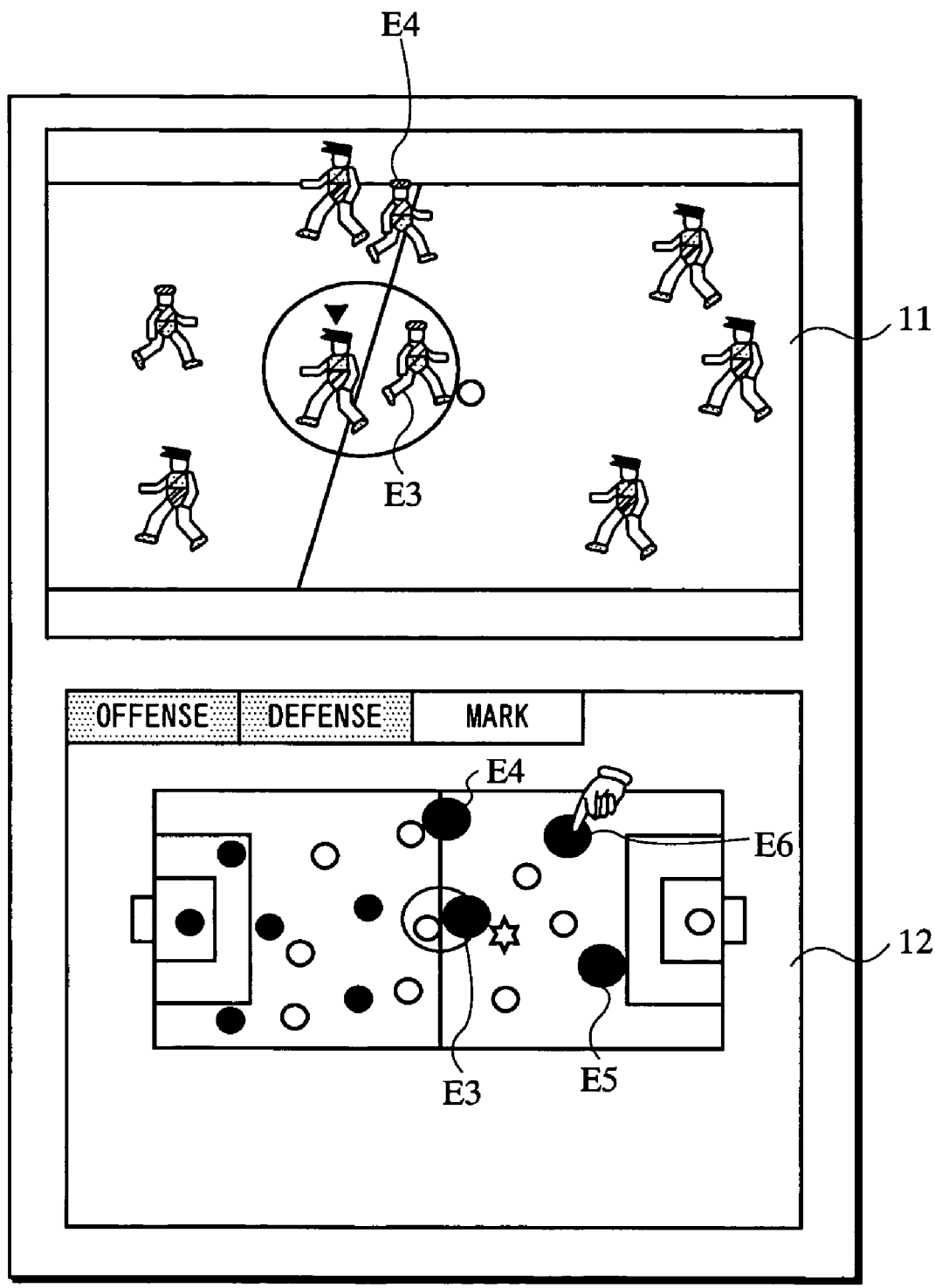
FIG. 12 is a diagram illustrating an exemplary first game image and an exemplary second game image to be displayed when selecting an athlete to become a target of marking.
Figure 13:
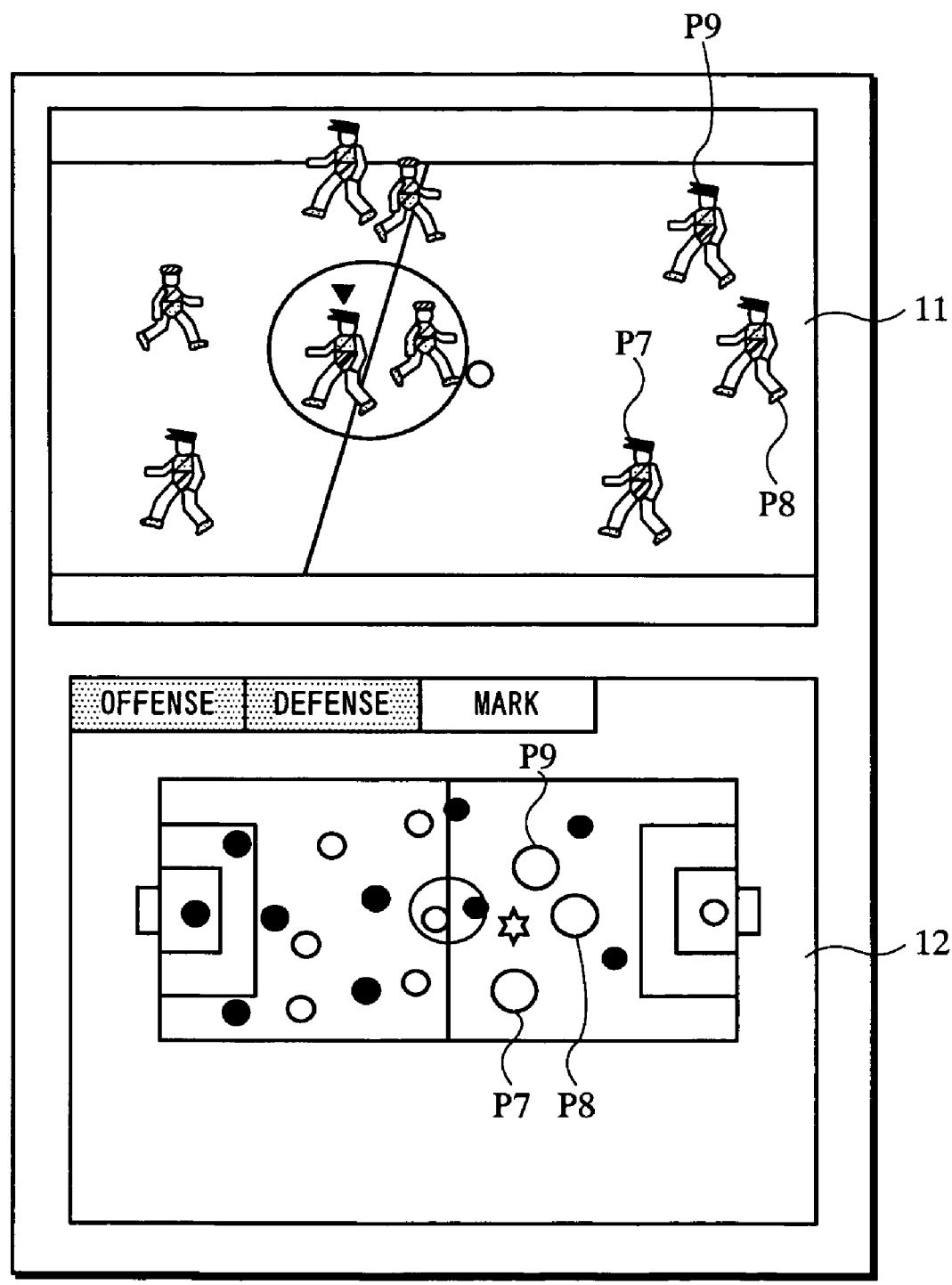
FIG. 13 is a diagram illustrating an exemplary first game image and an exemplary second game image to be displayed after an athlete to become a target of marking is selected.
Figure 14:
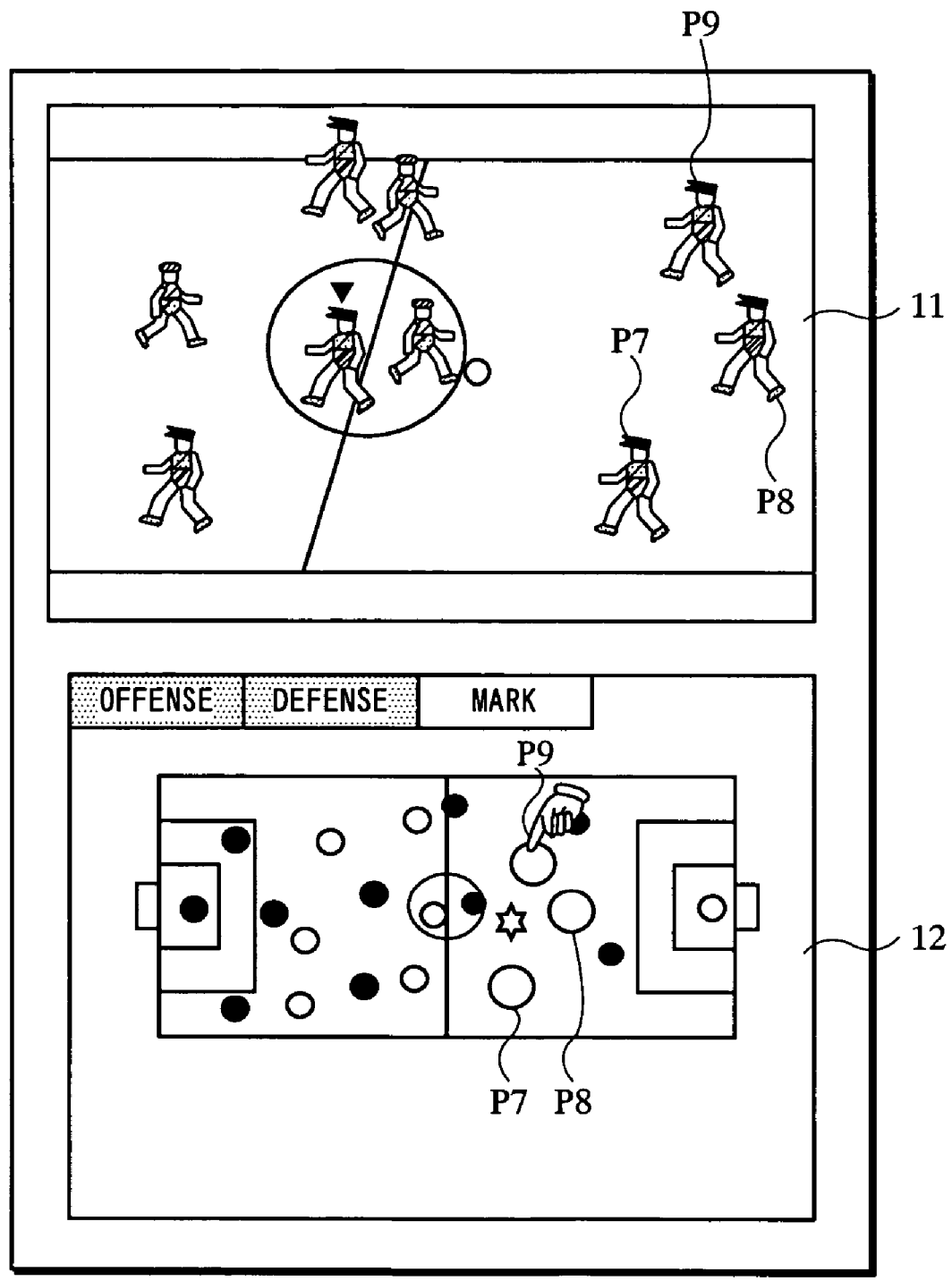
FIG. 14 is a diagram illustrating an exemplary first game image and an exemplary second game image to be displayed when selecting an athlete to perform a marking action.
Figure 15:
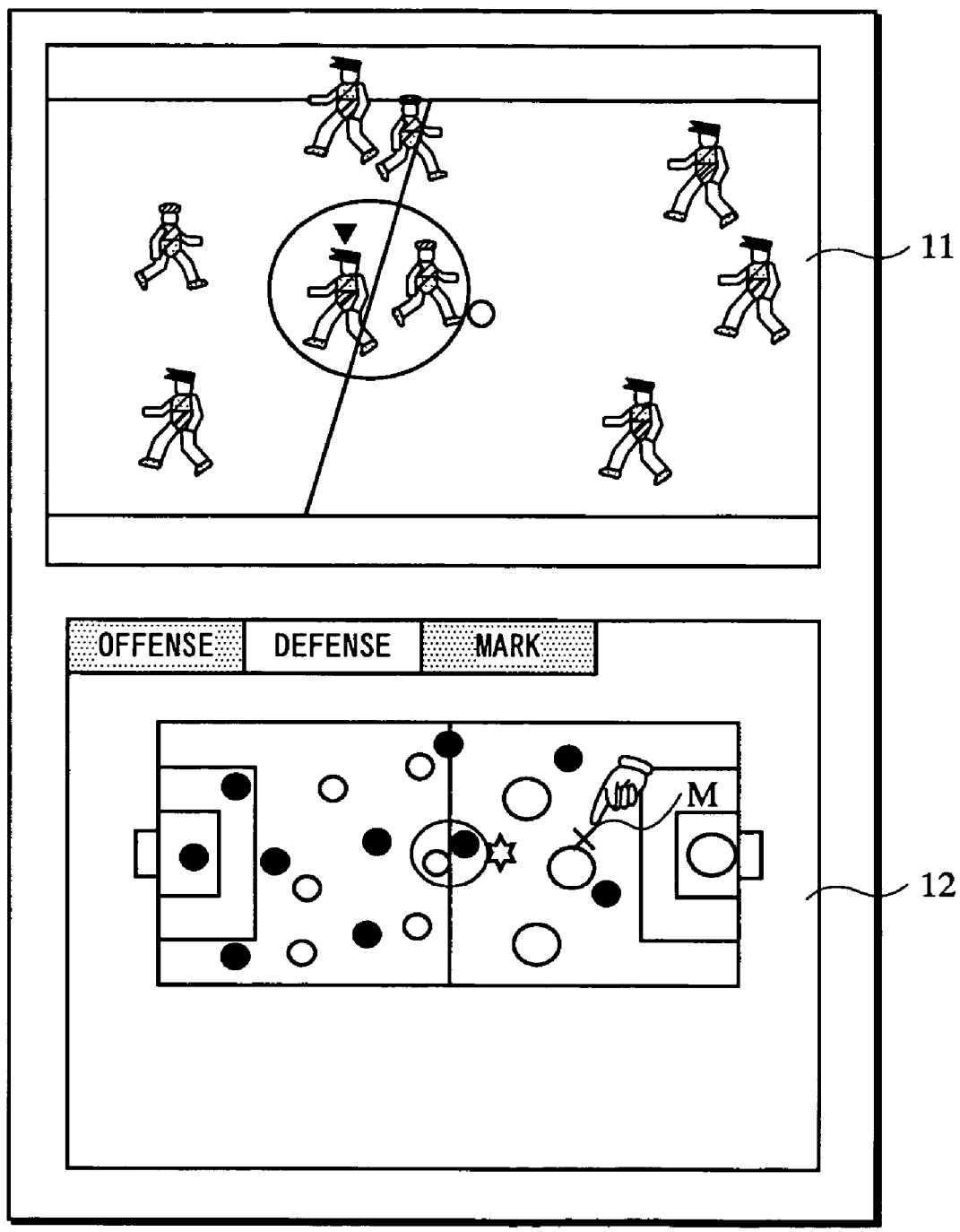
FIG. 15 is a diagram of an exemplary first game image and an exemplary second game image, illustrating a touch operation to be performed when displaying an enlarged second game image.

A fourth example of an action to be made by a player object in response to an operation using the touch panel 13 is a marking action. As shown in FIG. 11, a mark button MB is displayed in an upper central region of the second game image. If the player touch-operates the touch panel 13 so as to touch on the mark button MB, among the plurality of athlete objects composing the enemy team (hereinafter also referred to as "enemy objects"), the symbolized representations of offensive athletes in the second game image become relatively large. For example, the offensive athletes correspond to the enemy objects of the attribute values FW and MF. In the second game image of FIG. 11, enemy objects E3 and E4 (attribute value MF) and E5 and E6 (attribute value FW) are symbolized so as to appear relatively large as compared to the other enemy objects (attribute values DF and GK).

Next, the player selects an enemy object to be marked, and touch-operates the symbolized representation of this enemy object in the second game image, on the surface of the touch panel 13. Note that the symbolized representations of the enemy objects (FW and MF) which are likely to be marked are made relatively large to facilitate touch operation. For example, in FIG. 12, the player is touch-operating the enemy object E6 shown in the second game image. Once the enemy object to be marked is selected and touch-operated, among the plurality of player objects composing the player's team, the symbolized representations of the player objects of the attribute value DF in the second game image become relatively large. Moreover, the enemy objects, which have been symbolized in a relatively large size, are changed to the same size as that of the other enemy objects. In the second game image of FIG. 13, the player objects P7 to P9 (attribute value DF) are symbolized so as to appear relatively large as compared to the other player objects (attribute values FW, MF, and GK).

Next, the player selects a player object with which to mark the selected enemy object (E6 in FIG. 12), and touch-operates the symbolized representation of this player object in the second game image, on the surface of the touch panel 13. Note that the symbolized representations of the player objects which are likely to be marked (DF) are made relatively large to facilitate touch-operation. For example, in FIG. 14, the player is touch-operating the player object P9 shown in the second game image. As a result of these operations, the selected player object (P9) will automatically (i.e., even without player operations) move so as to mark the selected enemy object (E6) (marking action).

Moreover, in the second game image, the game field to be displayed in the second LCD 12 can be enlarged when the player performs a predetermined touch operation on the touch panel 13. For example, suppose that, while pressing the side switch 14f or 14g, the player performs a touch operation on the touch panel 13 so as to touch point M on the field in the second game image shown in FIG. 15. In this case, the second game image displayed in the second LCD 12 will be displayed so as to appear enlarged around the center point M, as shown in FIG. 16. Moreover, a display-all-area button AB is displayed in a lower right region of the enlarged second game image. If the player touch-operates the touch panel 13 so as to touch the display-all-area button AB, the original second game image, i.e., a radar representation of the entire field, is restored.

Thus, the player can perform various operations by manipulating the operation switch section 14 and the touch panel 13 while looking at the first game image and the second game image. In addition to the operation for the switch-controllable athlete using the operation switch section 14, which has conventionally been possible, it is also possible to select and control any of the player's team athletes at an appropriate time by using the touch panel 13.

Next, referring to FIGS. 17 to 19, RAM images of an exemplary WRAM 22 will be described. As shown in FIGS. 17 to 19, the WRAM 22 stores instructions and data which are of a format executable by a computer in the game apparatus 1, in particular by the CPU core 21. Moreover, the WRAM 22 stores game data which is generated by the CPU core 21 executing the game program. The game program is loaded to the WRAM 22 from the cartridge 17, as appropriate, and executed.

In FIG. 17, the WRAM 22 stores image data 2a, judgment region data 2b, and a display size change table 2c. These data are read from the cartridge 17, and stored as data which are independent of the game progression.

The image data 2a, which is data for displaying game objects and the like in the first game image and the second game image, includes 3D image data 2a1, 2D image data 2a2, and the like. The 3D image data 2a1, which is data for displaying game objects and the like in the first game image, includes: data 2a11 for displaying images of athletes (player objects and enemy objects); data 2a12 for displaying an image of a ball (ball object); data 2a13 for displaying an image of a field (soccer field); and the like. The 2D image data 2a2, which is data for displaying game objects and the like in the second game image, includes: data 2a21 for displaying images of athletes; data 2a22 for displaying an image of a ball; data 2a23 for displaying an image of a field; and the like. The data 2a21 for displaying images of athletes, which is contained in the 2D image data 2a2, includes data of large size 2a2L, medium size 2a2M, and small size 2a2S in order to enable changing of the symbolized representation size. In the case where image data is to be enlarged when performing a displaying process, it is unnecessary to store image data in each different size.

The judgment region data 2b, which is region data for enabling selection of the aforementioned touch-controllable athlete, includes: data of large size 2bL (corresponding to athletes 2a21 of the large size 2a2L); medium size 2bM (corresponding to athletes 2a21 of the medium size 2a2M); and small size 2bS (corresponding to athletes 2a21 of the small size 2a2S). Specifically, data concerning the value of the radius of the judgment (or evaluation) region may be stored, for example.

The display size change table 2c is a table indicating targets to be subjected to the aforementioned enlargement of symbolized representation size, and describes attribute values with respect to various touch operations to be performed on the touch panel 13 and various game situations. The attribute values correspond to parameters pertaining to the game objects. The display size change table 2c indicates first conditions (touch operation) in the present invention, and second conditions (attribute values) indicating targets for enlargement in association with the first conditions. For example, the display size change table 2c describes which object needs to have its displayed size changed and how much the change should be, with respect to the following cases: a case where an offense button operation has been made (2c1); a case where a defense button operation has been made (2c2); a case where a mark button operation has been made (2c3); a case where a through-pass state occurs (2c4); and the like. The display change size table describes that, if an offense button operation has been made (2c1), athletes (player objects) of the player's team having the attribute values FW and MF are to be displayed by using image data of the medium size 2a2M. The display change size table also describes that, if a defense button operation is made (2c2), athletes (player objects) of the player's team having the attribute values DF and GK are to be displayed by using image data of the medium size 2a2M. The display change size table further describes that, if a mark button operation has been made (2c3), athletes (enemy objects) of the enemy team having the attribute values FW and MF are displayed by using image data of the medium size 2a2M in a first phase; and in a second phase, athletes (player objects) of the player's team having the attribute value DF are displayed by using image data of the medium size 2a2M. And, the display change size table describes that, if the game situation is in a through-pass state (2c4), athletes (player objects) of the player's team having the attribute value FW, which are positioned near the enemy team's goal, have their displayed size incremented by one step. Any object that is not described in this table is to be displayed by using image data of the small size 2a2S.

As shown in FIG. 18, player's team athlete data 2d, enemy team athlete data 2e, a switch-controllable athlete number 2f, a touch-controllable athlete number 2g, ball coordinates 2h, elapsed time 2i in the match, and points 2j are further recorded in the WRAM 22. These are data which are generated by the CPU core 21 executing the game program, and whose descriptions vary in accordance with game progression.

The player's team athlete data 2d includes data 2d1 to 2d11 for managing a plurality of player's team athletes (player objects) which are respectively assigned with athlete Nos. 1 to 11. Each piece of player's team athlete data 2d1 to 2d11 includes: an athlete number; a position on the field (game field coordinates (gx, gy)); an attribute value, a displayed size in the second game image; mark data (the athlete number of an enemy object in a marking action); and the like.

The enemy team athlete data 2e includes data 2e1 to 2e11 for managing a plurality of enemy team athletes (enemy objects), which are respectively assigned with athlete Nos. 12 to 22. Each piece of enemy team athlete data 2e1 to 2e11 includes: an athlete number; a position on the field (game field coordinates (gx, gy)); an attribute value; a displayed size in the second game image; and the like.

The switch-controllable athlete number 2f designates an athlete number which is set for the aforementioned switch-controllable athlete. The touch-controllable athlete number 2g designates an athlete number which is set for the aforementioned touch-controllable athlete. The ball coordinates 2h designate the position of the ball object on the game field (game field coordinates (gx, gy)). The elapsed time 2i in the match designates an amount of time which has elapsed with game progression. The points 2j designates points which have been scored by the player's team and the enemy team.

As shown in FIG. 19, a trajectory data buffer 2k, tracing action data 2l, flicking action data 2m, defense line action data 2n, a tracing action timer 2o, a flicking action timer 2p, a trajectory input timer 2q, a sampling timer 2r, a defense line movement flag 2s, an enlargement flag 2t, and central coordinates for enlargement 2u are further recorded in the WRAM 22. These data are also data which are generated by the CPU core 21 executing the game program, and whose descriptions vary in accordance with game progression.

The trajectory data buffer 2k records, as appropriate, coordinate data which is input by the player using the touch panel 13 and which has been converted to game field coordinates (gx, gy). The trajectory data buffer 2k includes coordinate data 2k1, coordinate data 2k2, and so on. The trajectory data buffer 2k is an area for temporarily storing trajectory data which is input by the player, and stores a sequence of (one round of) trajectory inputs. Depending on the type of input trajectory, it is determined whether a tracing action has been input, a flicking action has been input, or a defense line has been input. In the case where a tracing action or a defense line has been input, the trajectory data in the trajectory data buffer 2k is copied to the tracing action data area 2l or the defense line action data area 2n. In the case where a flicking action has been input, a flicking vector is determined from the trajectory data in the trajectory data buffer 2k, and is stored to the flicking action data area 2m. Thereafter, the trajectory data in the trajectory data buffer 2k is erased. The tracing action data 2l stores, for each given player's team athlete (player object) which makes a tracing action, trajectory data defining the action of each athlete number, including tracing action data 2l1, tracing action data 2l2, and so on. The flicking action data 2m records, for each given player's team athlete (player object) which makes a flicking action, a flicking vector defining the action of each athlete number, including flicking action data 2m1, flicking action data 2m2, and so on. The defense line action data 2n includes trajectory data 2n1 for a defense line which is formed on the field. Note that the coordinates or trajectory data which are stored in the trajectory data buffer 2k, the tracing action data 2l, the flicking action data 2m, and the defense line action data 2n are trajectory data based on game field coordinates, and not trajectory data based on touch panel coordinates.

The tracing action timer 2o is a timer for measuring a predetermined amount of time in a tracing action process (described later with reference to FIG. 30), such that an athlete object will move along a trajectory at the interval of every predetermined amount of time. As described earlier, when the player has performed a touch operation in a manner of flicking, a touch-operable object makes a flicking action for a certain period of time (Th). The flicking action timer 2p is a timer for causing a touch-operable object to make a flicking action for a certain period of time. The flicking action timer 2p is started at the beginning of a flicking action, and is used for determining the end timing of the flicking action, which comes after the lapse of the certain period of time. The trajectory input timer 2q is a timer for determining whether a trajectory input which has been made by the player is an input for a flicking action, or an input for a tracing action. Specifically, as will be described later, the input is determined as an input for a tracing action if the touch operation has continued for one second or more, and determined as an input for a flicking action if the touch operation has continued for less than one second. The trajectory input timer 2q is started when the player performs a touch operation, and is stopped when a sequence of touch operation is ended. The sampling timer 2r is a timer for measuring an interval at which trajectory data is sampled.

The defense line movement flag 2s is a flag indicating whether or not to move a defense line in response to a drag operation performed by the player using the touch panel 13. The enlargement flag 2t and the central coordinates for enlargement 2u are, respectively, a flag indicating whether or not to enlarge the second game image and central coordinates used during the enlargement, which are recorded in response to an instruction to enlarge the second game image which is input by the player using the touch panel 13.

Figure 20:
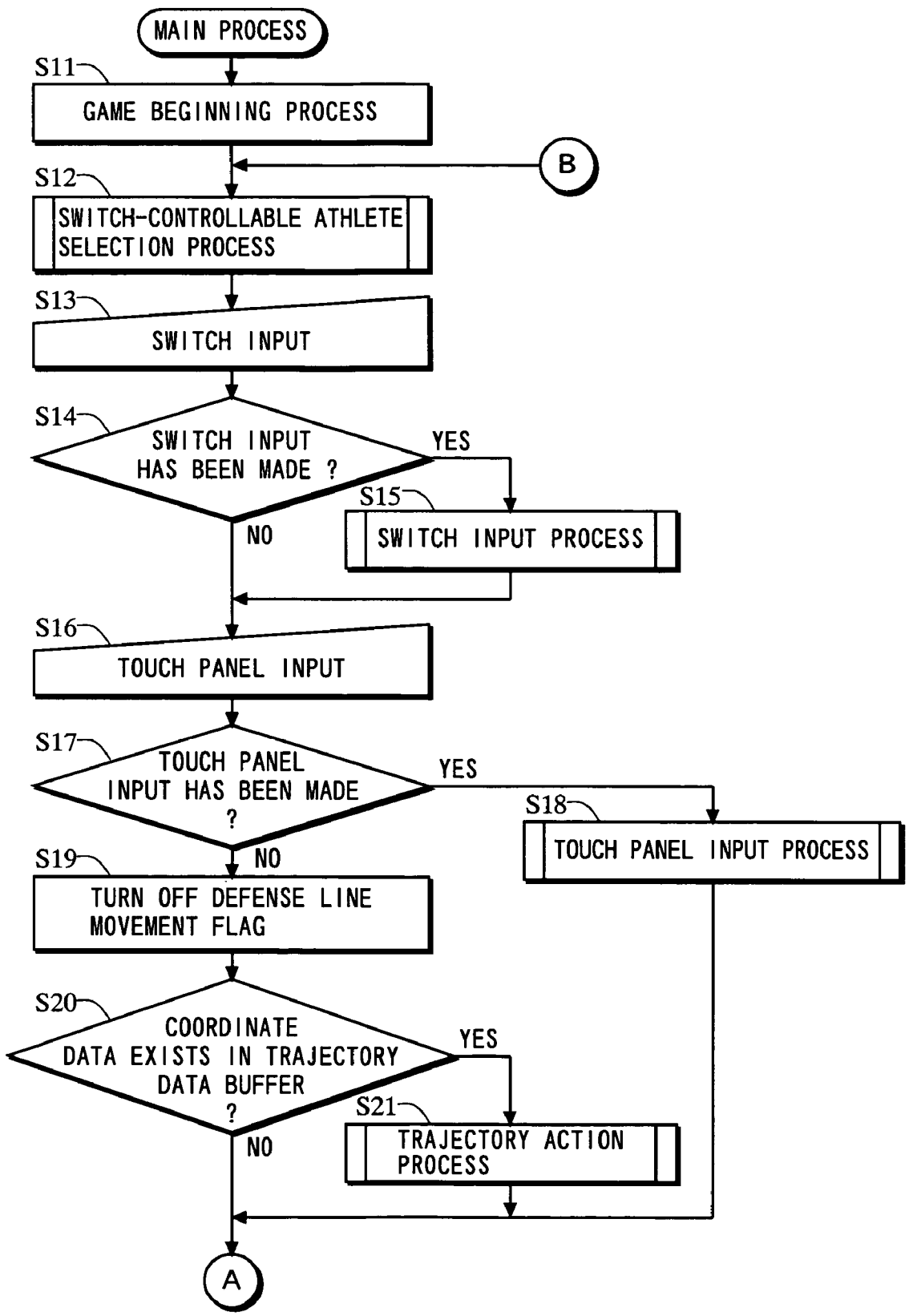
FIG. 20 is a flowchart illustrating a former half of a main process executed in the game apparatus 1 in accordance with a game program according to the first embodiment.
Figure 21:
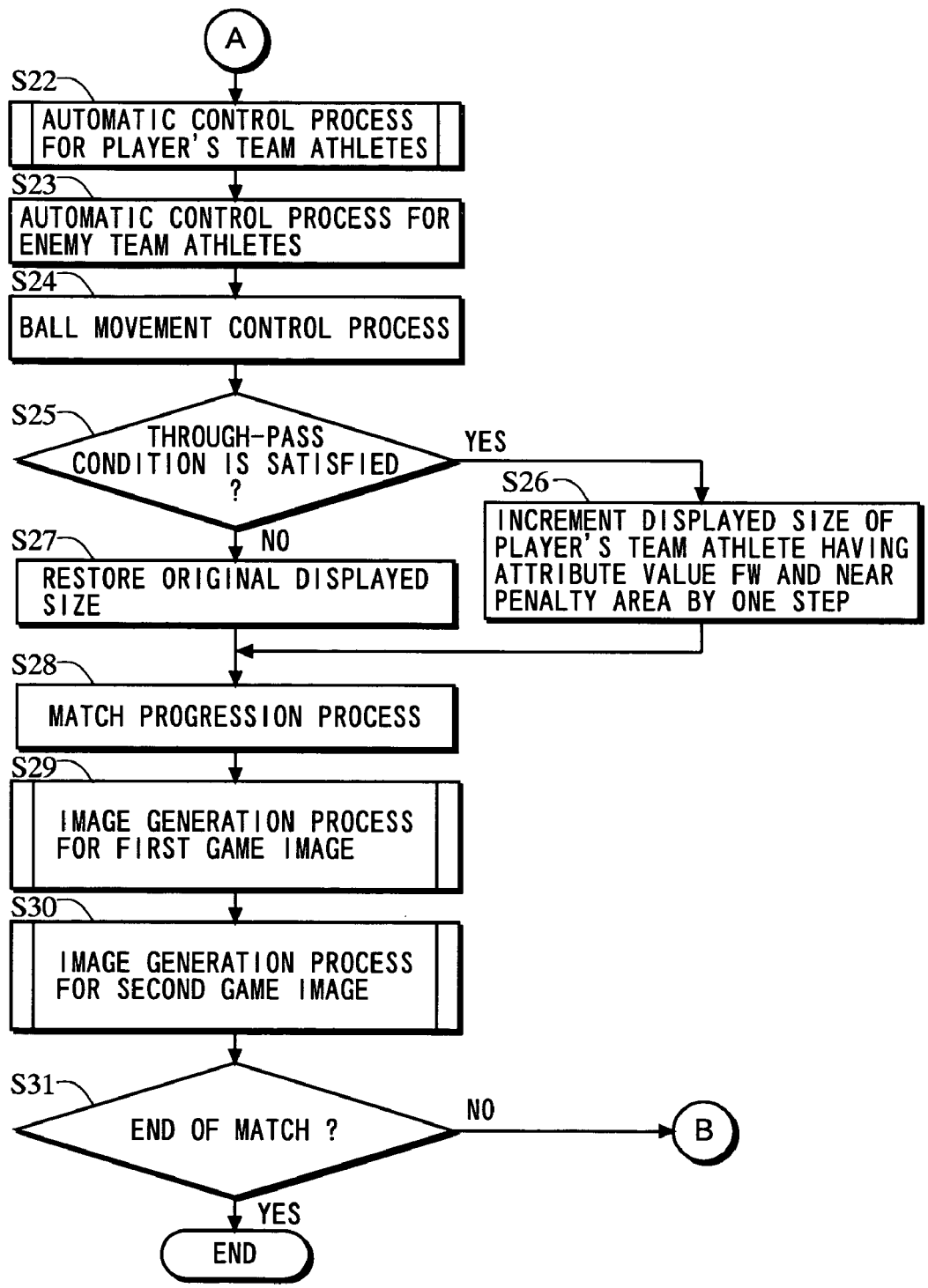
FIG. 21 is a flowchart illustrating a latter half of the main process shown in FIG. 20.
Figure 22:
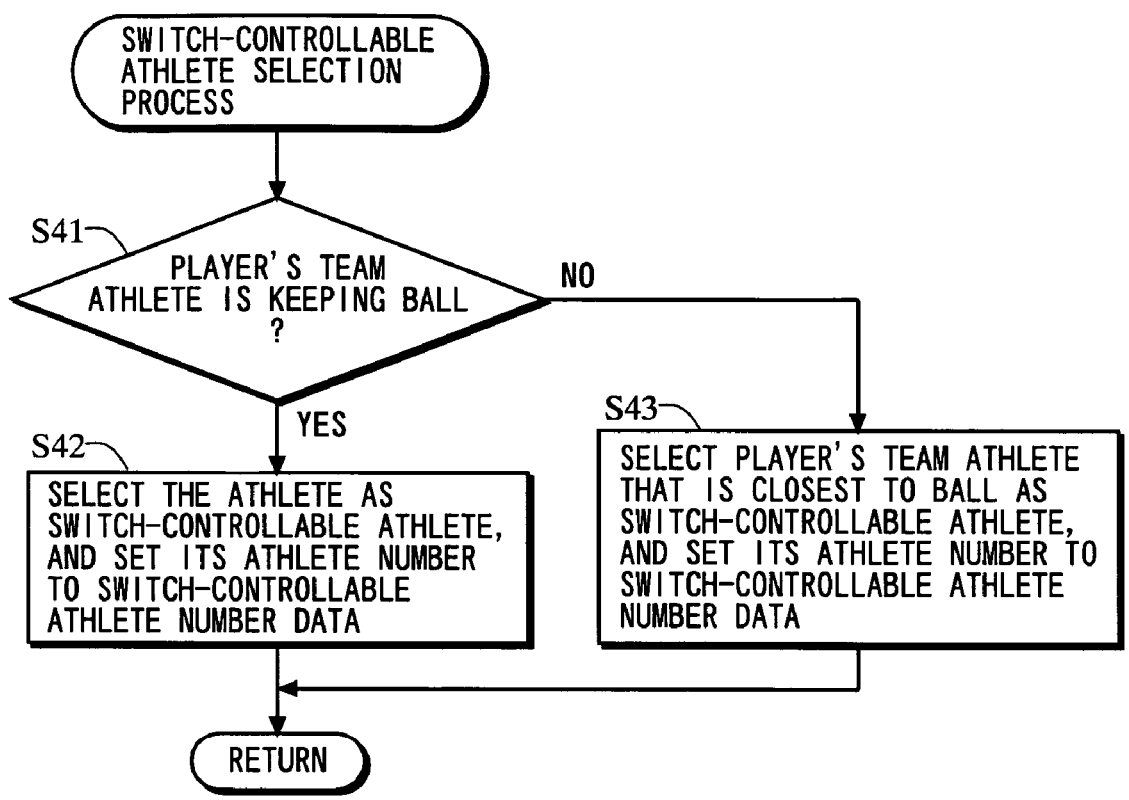
FIG. 22 shows the subroutine of a switch-controllable athlete selection process to be performed at step S12 of FIG. 20.
Figure 24:
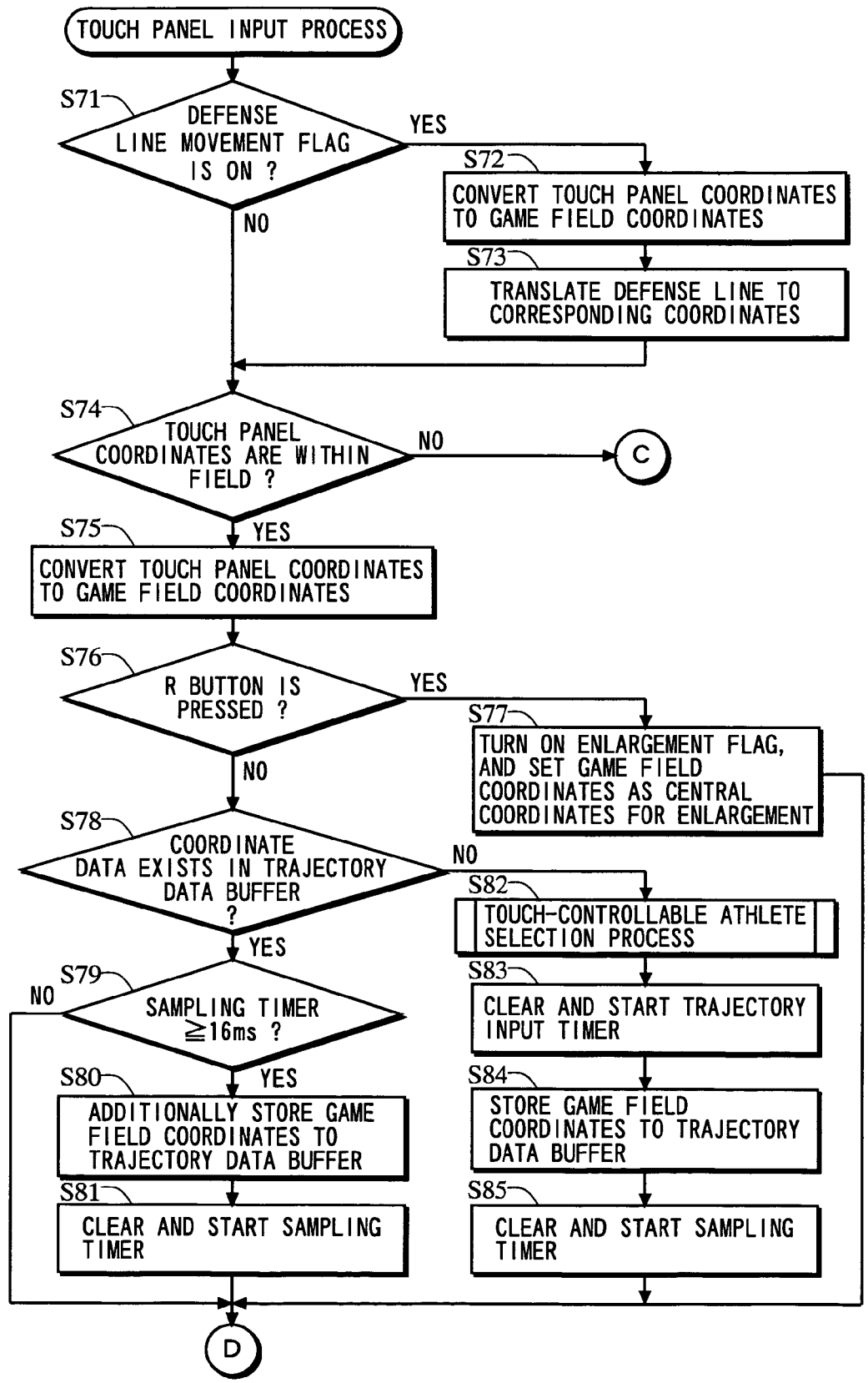
FIG. 24 shows the subroutine of a former half of a touch panel input process to be performed at step S18 of FIG. 20.
Figure 25:
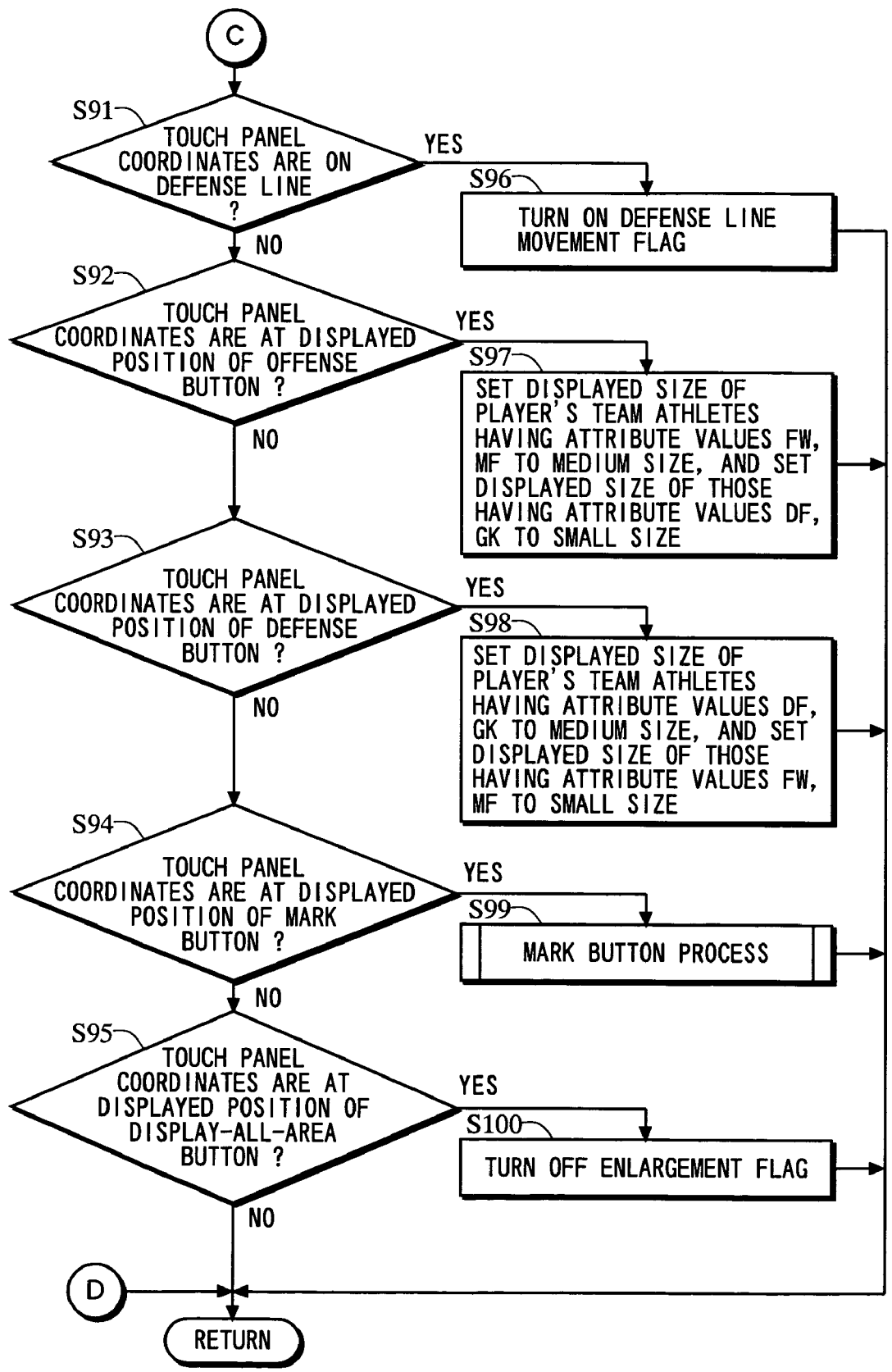
FIG. 25 shows the subroutine of a latter half of a touch panel input process to be performed at step S18 of FIG. 20.
Figure 26:
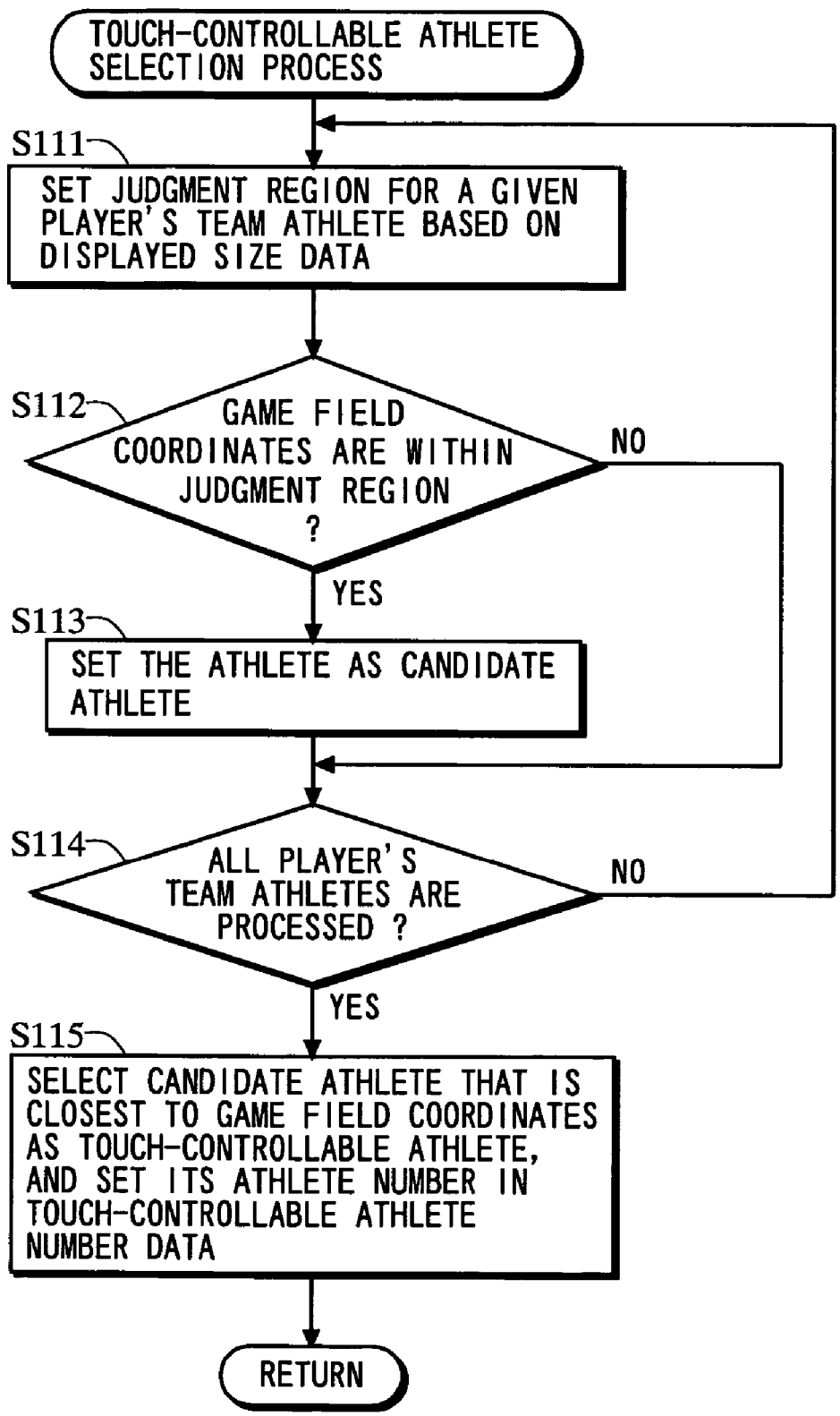
FIG. 26 shows the subroutine of a touch-controllable athlete selection process to be performed at step S82 of FIG. 24.
Figure 27:
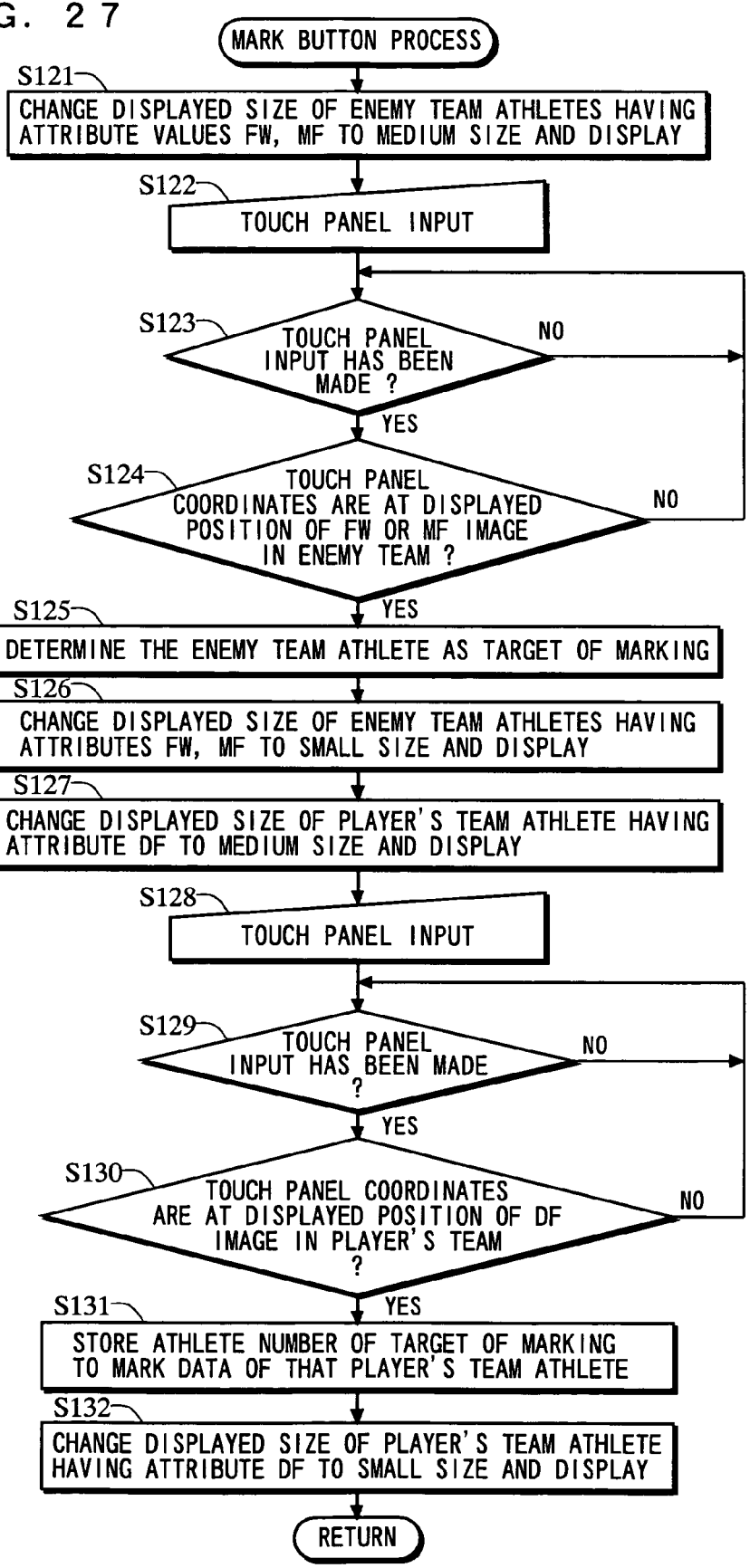
FIG. 27 shows the subroutine of a mark button process to be performed at step S99 of FIG. 25.
Figure 28:
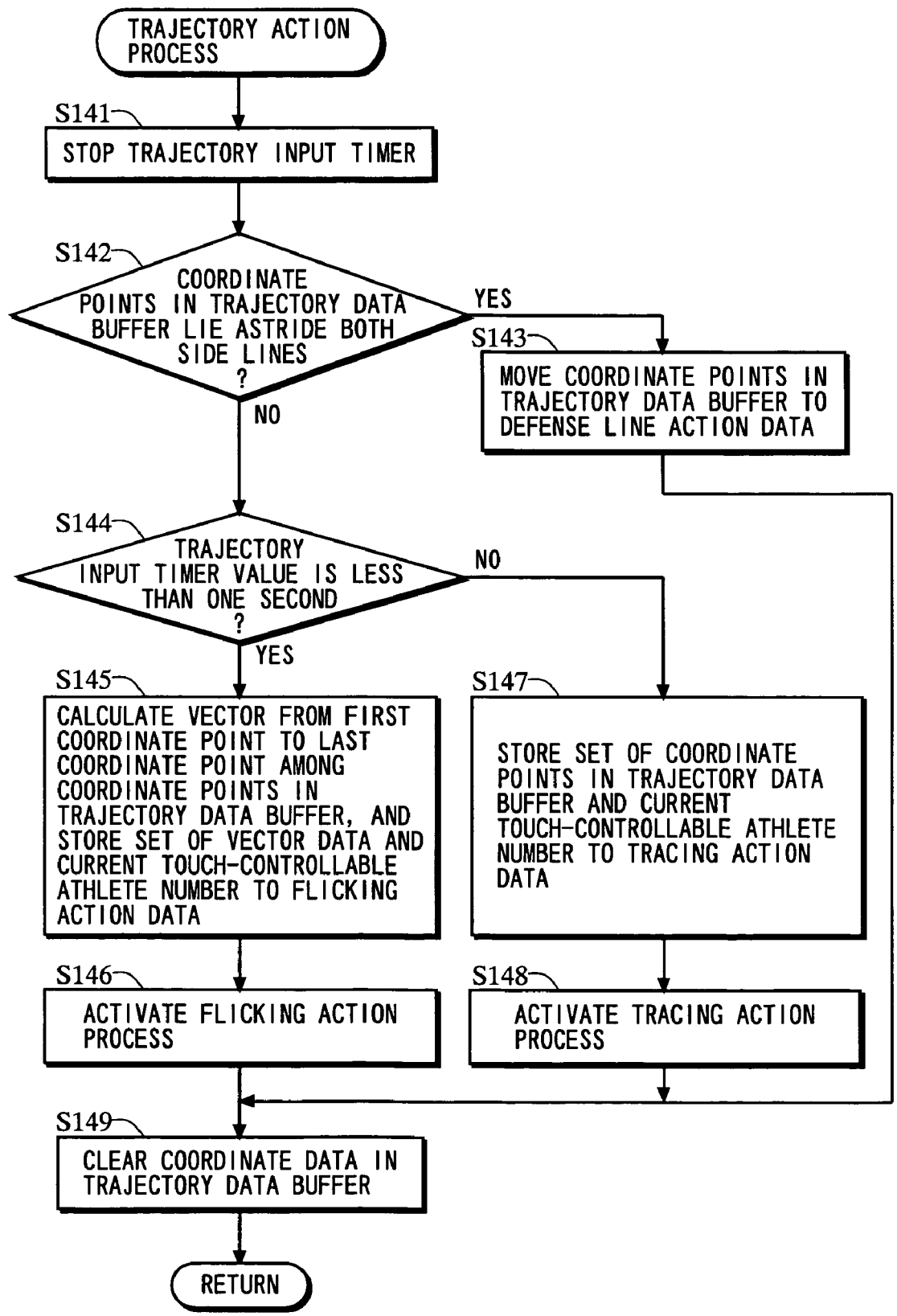
FIG. 28 shows the subroutine of a trajectory action process to be performed at step S21 of FIG. 20.
Figure 29:
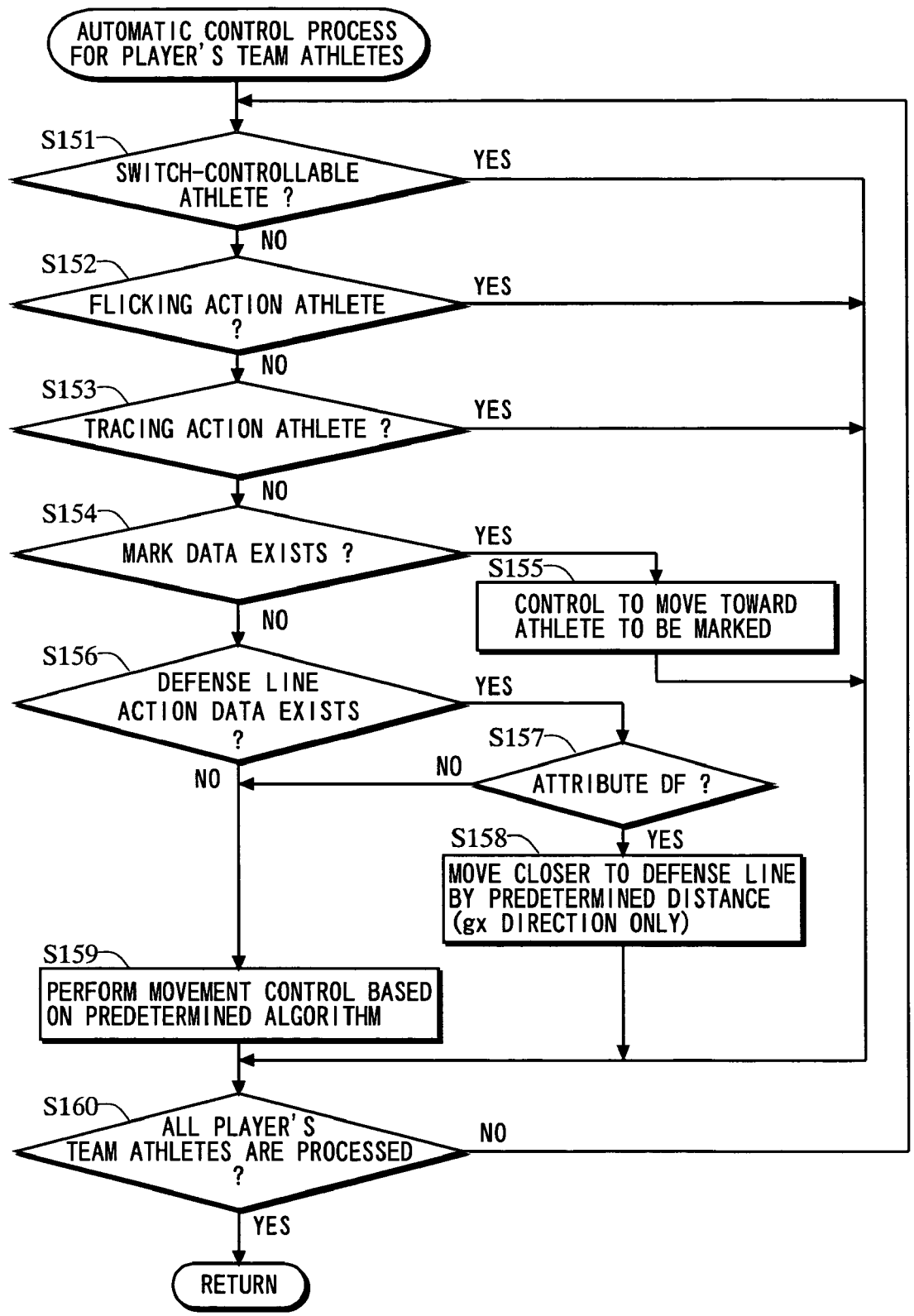
FIG. 29 shows the subroutine of an automatic control process for player's team athletes to be performed at step S22 of FIG. 21.
Figure 30:
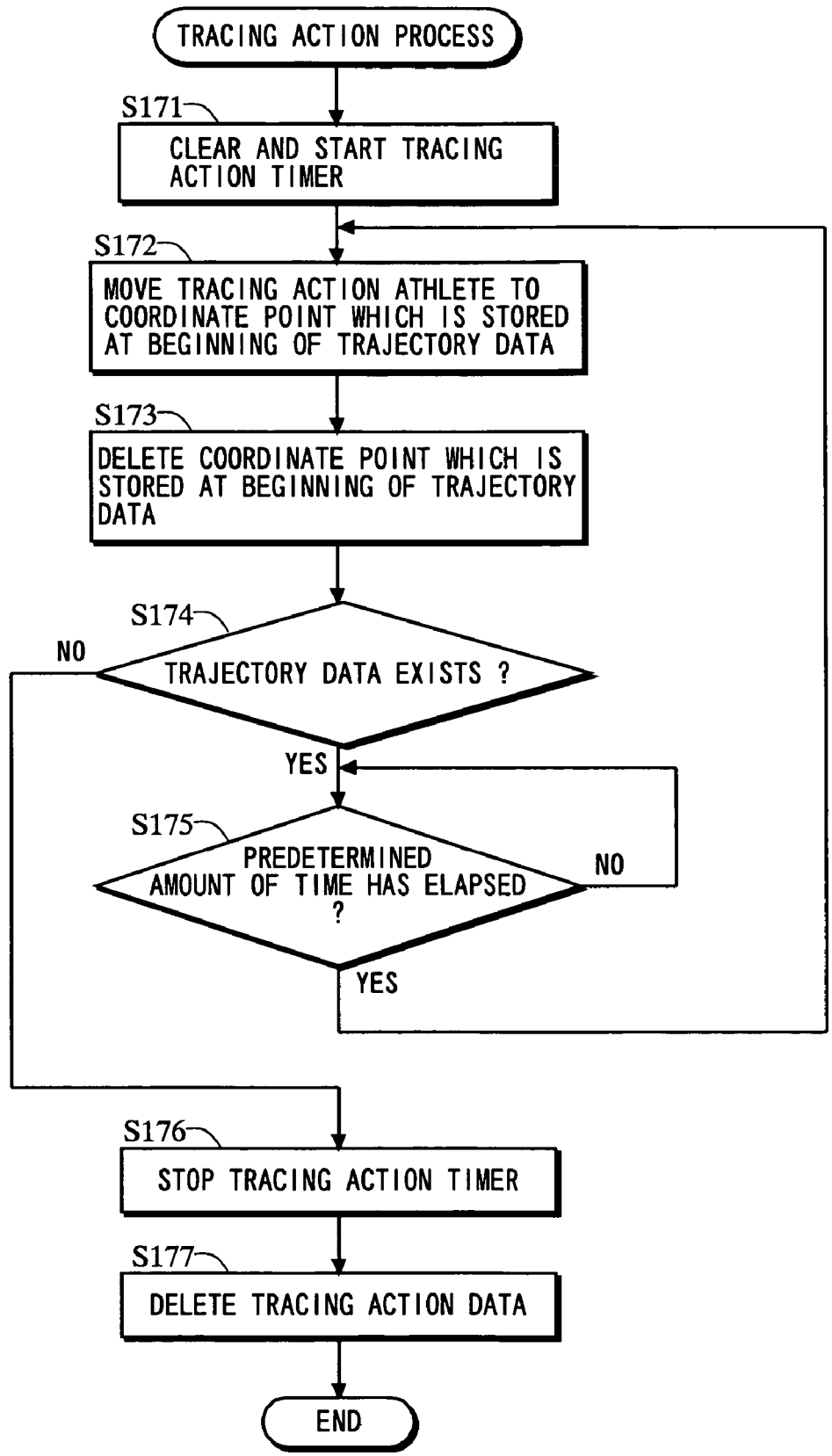
FIG. 30 is a flowchart showing a tracing action process to be performed in parallel to the main process of FIG. 20 and FIG. 21.
Figure 31:
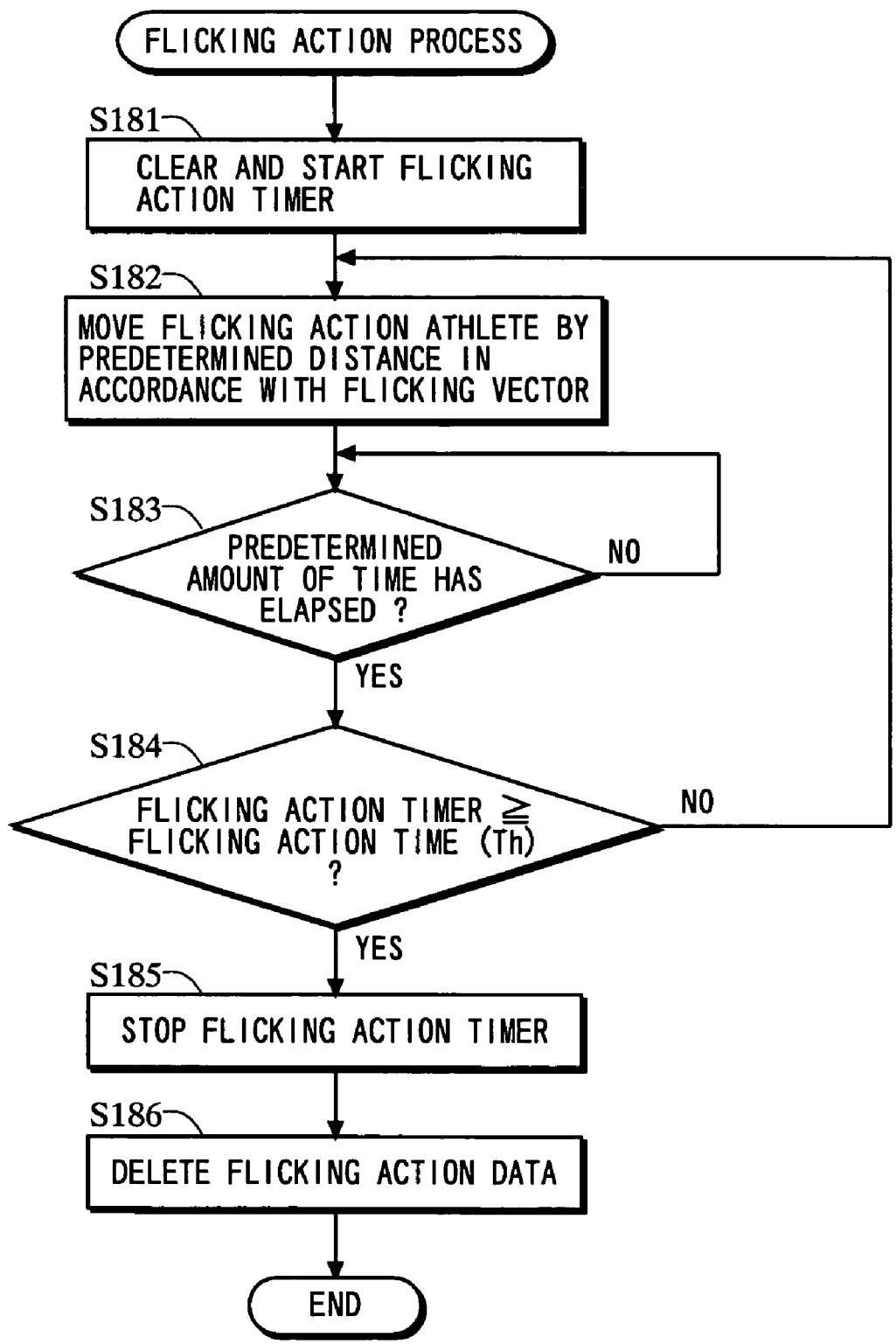
FIG. 31 is a flowchart showing a flicking action process to be performed in parallel to the main process of FIG. 20 and FIG. 21.
Figure 32:
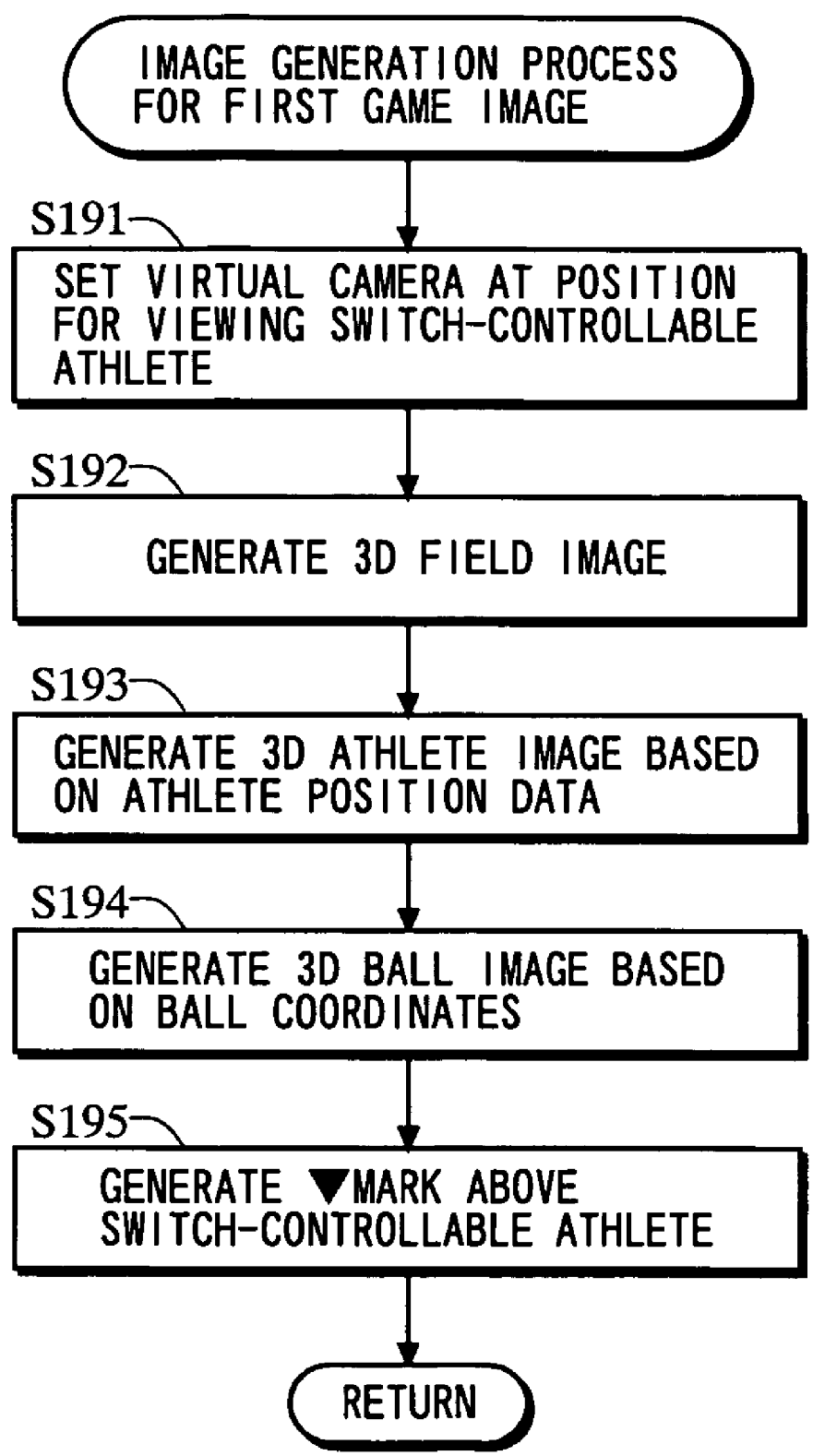
FIG. 32 shows the subroutine of an image displaying process for a first game image to be performed at step S29 of FIG. 21.
Figure 33:
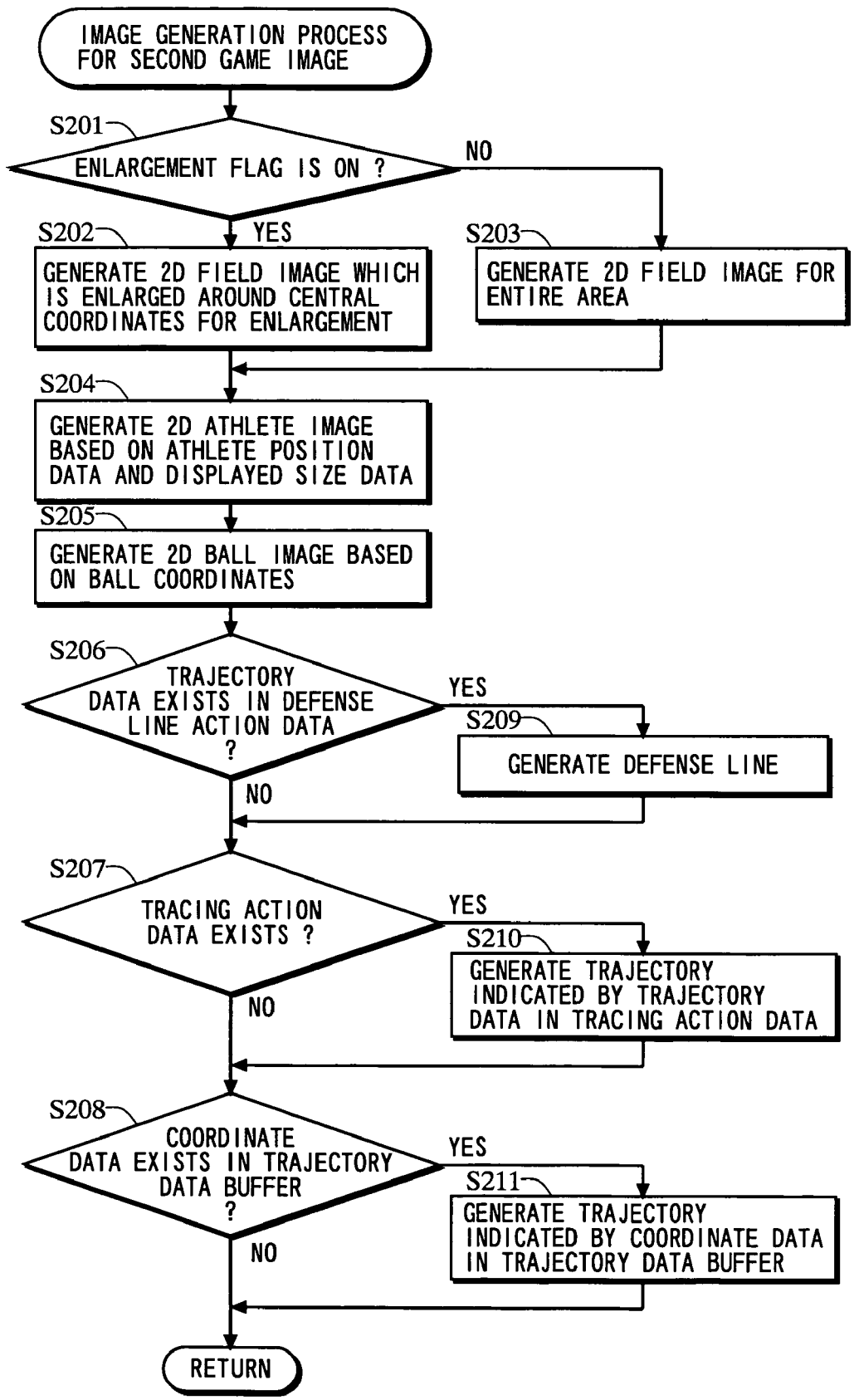
FIG. 33 shows the subroutine of an image displaying process for a second game image to be performed at step S30 of FIG. 21.

Hereinafter, the exemplary processes to be performed by a computer in realizing an illustrative embodiments will be described with reference to the flowcharts of FIGS. 20 to 33. FIGS. 20 and 21 are flowcharts illustrating a main process executed in the game apparatus 1 in accordance with the game program. FIG. 22 shows the subroutine of a switch-controllable athlete selection process to be performed at step S12 of FIG. 20. FIG. 23 shows the subroutine of a switch input process to be performed at step S15 of FIG. 20. FIGS. 24 and 25 show the subroutine of a touch panel input process to be performed at step S18 of FIG. 20. FIG. 26 shows the subroutine of a touch-controllable athlete selection process to be performed at step S82 of FIG. 24. FIG. 27 shows the subroutine of a mark button process to be performed at step S99 of FIG. 25. FIG. 28 shows the subroutine of a trajectory action process to be performed at step S21 of FIG. 20. FIG. 29 shows the subroutine of an automatic control process for player's team athletes to be performed at step S22 of FIG. 21. FIG. 30 is a flowchart showing a tracing action process to be performed in parallel to the main process of FIG. 20 and FIG. 21. FIG. 31 is a flowchart showing a flicking action process to be performed in parallel to the main process of FIG. 20 and FIG. 21. FIG. 32 shows the subroutine of an image displaying process for a first game image to be performed at step S29 of FIG. 21. FIG. 33 shows the subroutine of an image displaying process for a second game image to be performed at step S30 of FIG. 21. The programs for performing these processes are contained in the game program which is stored in the ROM 171, and loaded from the ROM 171 to the WRAM 22 when power to the game apparatus 1 is turned on, so as to be executed by the CPU core 21.

Referring to FIG. 20, when power to the game apparatus 1 is turned on, various exemplary initialization processes for the game apparatus 1 are performed in accordance with a program in a boot ROM (not shown). Furthermore, at least part of the programs stored in the ROM 171 are read and stored to the WRAM 22. Thereafter, the player operates the operation switch section 14 and the like to cause a game to be started. In response, the CPU core 21 begins executing the game program, and performs a game beginning process (specifically, a soccer game match is begun; step S11). Then, the CPU core 21 selects a switch-controllable athlete from among a plurality of player objects (step S12), and control proceeds to the next step. The detailed procedure of the switch-controllable athlete selection process at step S12 will be described later.

Next, the CPU core 21 awaits a switch input from the player (step S13). As used herein, a "switch input" in this process is an input made by the player using any operation means other than the touch panel 13, and corresponds specifically to an operation input using the operation switch section 14. Then, the CPU core 21 determines whether a switch input has been made by the player or not (step S14). If a switch input has been made, a switch input process (step S15) is performed, and control proceeds to the next step S16. The detailed procedure of the switch input process at step S15 will be described later. On the other hand, if no switch input is made, the CPU core 21 proceeds to the next step S16.

At step S16, the CPU core 21 awaits a touch panel input from the player. As used herein, a "touch panel input" in this process is an input made through a touch operation by the player using the touch panel 13 as an operation means. Then, the CPU core 21 determines whether the player has made a touch panel input or not (step S17). If a touch panel input has been made, a touch panel input process (step S18) is performed, and control proceeds to the next step S22. The detailed procedure of the touch panel input process at step S18 will be described later.

On the other hand, if no touch panel input is made at step S17, the CPU core 21 sets the defense line movement flag $2s$ (see FIG. 19) to "off" (step S19), and determines whether coordinate data exists in the trajectory data buffer $2k$ (see FIG. 19) (step S20). If coordinate data exists in the trajectory data buffer $2k$, the CPU core 21 performs a trajectory action process (step S21), and control proceeds to the next step S22. The detailed procedure of the trajectory action process at step S21 will be described later. On the other hand, if no coordinate data exists in the trajectory data buffer $2k$, the CPU core 21 proceeds to the next step S22.

Referring to FIG. 21, at step S22, the CPU core 21 performs an automatic control process for the player's team athletes (player objects). The automatic control process for the player's team athletes at step S22, whose detailed procedure will be described later, is to be performed for any player's team athlete other than the athletes which are set as a switch-controllable athlete, a flicking action athlete, and a tracing action athlete described below. Next, the CPU core 21 performs an automatic control process for the enemy team athletes (enemy objects) (step S23). Then, in accordance with the results of the automatic control processes for the player objects and the enemy objects at steps S22 and S23, the CPU core 21 performs a movement control process for the ball (ball object) (step S24), and control proceeds to the next step. The processes of steps S23 and S24 are to be performed by the CPU core 21 using a predetermined thinking routine as in conventional techniques, and any detailed description thereof is omitted here.

Next, the CPU core 21 determines whether the current game situation satisfies a through-pass condition (step S25). For example, if a player object of the attribute value MF has the ball object B, and a player object of the attribute value FW is positioned near the penalty area of the enemy team, it is determined that the through-pass condition is satisfied. The CPU core 21 can determine whether the through-pass condition is satisfied or not by referring to the player's team athlete data $2d$ and the ball coordinates $2h$ (see FIG. 18). If the through-pass condition is satisfied, the CPU core 21 proceeds to the next step S26. If the through-pass condition is not satisfied, control proceeds to the next step S27.

At step S26, in accordance with the through-pass state $2c4$ described in the display size change table $2c$, the CPU core 21 updates the displayed size which is stored in the player's team athlete data $2d$. Specifically, the displayed size stored in any piece of player's team athlete data $2d$ having the attribute value FW relevant to the aforementioned through-pass condition (e.g., player's team athlete data $2d$ for a player object of the attribute value FW positioned near the penalty area of the enemy team) is set so as to be enlarged one step larger. The displayed size in the player's team athlete data $2d$ is set so that an athlete $2a21$ of either the large size $2a2L$, medium size $2a2M$, or small size $2a2S$ contained in the 2D image data $2a2$ is selected. For example, if the displayed size of a piece of player's team athlete data $2d$ having the attribute value FW relevant to the through-pass condition is currently set at the medium size $2a2M$, the CPU core 21 sets the displayed size to the large size $2a2L$. If the displayed size of a piece of player's team athlete data $2d$ having the attribute value FW relevant to the through-pass condition is currently set at the small size $2a2S$, the CPU core 21 sets the displayed size to the medium size $2a2M$. Then, the CPU core 21 proceeds to the next step S28. On the other hand, at step S27, if the displayed size has been changed due to the through-pass condition being met, the CPU core 21 restores the displayed size to the original size, and control proceeds to the next step S28. Thus, a player object to which a through-pass can be made will have its displayed size in the second game image increased relative to the other player objects.

Next, the CPU core 21 performs a match progression process (step S28), an image generation process for a first game image (step S29), and an image generation process for a second game image (step S30). The detailed procedures of the image generation processes at steps S29 and S30 will be described later. Then, the CPU core 21 determines whether the end of the match has been reached (step S31). If the match is to be continued, control returns to the aforementioned step S12 to continue with the process. If the match is to be ended, the main process in accordance with the flowchart is ended.

Referring to FIG. 22, the detailed procedure of an exemplary switch-controllable athlete selection process at step S12 will be described. First, the CPU core 21 determines whether a player's team athlete (player object) is keeping the ball (step S41). If a player's team athlete (player object) is keeping the ball, the CPU core 21 selects the player's team athlete as a switch-controllable athlete, and sets an athlete number which is designated for this athlete in the player's team athlete data $2d$ as the switch-controllable athlete number $2f$ (see FIG. 18) (step S42), and ends the processing of this subroutine. On the other hand, if none of the player's team athletes is keeping the ball, the CPU core 21 selects a player's team athlete that is closest to the ball as a switch-controllable athlete. The CPU core 21 sets an athlete number which is designated for this athlete in the player's team athlete data $2d$ as the switch-controllable athlete number $2f$ (step S43), and ends the processing of this subroutine. Through the above processes, a player object that is closest to the ball object B is set as a switch-controllable athlete.

Referring to FIG. 23, the detailed procedure of an exemplary switch input process at step S15 will be described. First, the CPU core 21 determines whether an input has been made by the player using the direction switch (cross key) $14c$ (step S51). If an input has been made using the direction switch $14c$, the CPU core 21 proceeds to the next step S52. If no such input has been made, control proceeds to the next step S57.

At step S52, the CPU core 21 changes the position of the switch-controllable athlete in accordance with the input from the direction switch 14c. Specifically, by referring to a piece of player's team athlete data 2d corresponding to the athlete number which is set in the switch-controllable athlete number 2f, the CPU core 21 changes the position of the player's team athlete data 2d (game field coordinates (gx, gy)) in accordance with the input from the direction switch 14c. Next, the CPU core 21 determines whether the switch-controllable athlete is set as a flicking action athlete (step S53). This is determined based on whether the athlete number which is designated in the switch-controllable athlete number 2f coincides with any of the athlete numbers designated in the flicking action data 2m (see FIG. 19). If the switch-controllable athlete is set as a flicking action athlete, the CPU core 21 deletes a piece of flicking action data 2m in which the athlete number of this athlete is designated (step S54), and proceeds to the next step S55. On the other hand, if the switch-controllable athlete is not set as a flicking action athlete, the CPU core 21 proceeds to the next step S55. Through the process of step S54, the player object is controlled so as to act while giving priority, over the flicking action (described later), to any further instruction for movement which is given by means of the direction switch 14c.

At step S55, the CPU core 21 determines whether the switch-controllable athlete is set as a tracing action athlete. This is determined based on whether the athlete number designated in the switch-controllable athlete number 2f coincides with any of the athlete numbers designated in the tracing action data 2l (see FIG. 19). If the switch-controllable athlete is set as a tracing action athlete, the CPU core 21 deletes a piece of tracing action data 2l in which the athlete number of this athlete is designated (step S56), and ends the processing of this subroutine. On the other hand, if the switch-controllable athlete is not set as a tracing action athlete, the processing of this subroutine is ended. Through the process of step S56, the player object is controlled so as to act while giving priority, over the tracing action (described later), to any further instruction for movement which is given by means of the direction switch 14c.

On the other hand, if no input has been made using the direction switch 14c, the CPU core 21 proceeds to step S57. At step S57, the CPU core 21 determines whether the switch-controllable athlete is keeping the ball. If the switch-controllable athlete is keeping the ball, the CPU core 21 causes the switch-controllable athlete to make an action which is in accordance with the manner in which the operation switch section 14 is operated. Specifically, if the player has operated the operation switch (A button) 14a ("Yes" at step S58), the CPU core 21 causes the switch-controllable athlete to make a passing action (step S60), and ends the processing of this subroutine. If the player has operated the operation switch (B button) 14b ("Yes" at step S59), the CPU core 21 causes the switch-controllable athlete to make a shooting action (step S61), and ends the processing of this subroutine. On the other hand, if the switch-controllable athlete is not keeping the ball, or no input has been made from the operation switch 14a or 14b, the CPU core 21 ends the processing of this subroutine. Through the processes of steps S51 to S61, parameters pertaining to the player object which is set as the switch-controllable athlete are changed in accordance with an input from the operation switch section 14.

Referring to FIGS. 24 to 27, the detailed procedure of an exemplary touch panel input process at step S18 will be described. In FIG. 24, the CPU core 21 determines whether the defense line movement flag 2s is on (step S71). If the defense line movement flag 2s is off, the CPU core 21 proceeds to the next step S74. On the other hand, if the defense line movement flag 2s is on, the CPU core 21 converts the coordinates at which the player is currently touching the touch panel 13 (hereinafter referred to as "touch panel coordinates") to game field coordinates (step S72), and proceeds to the next step. Hereinafter, with reference to FIG. 34, the relationship between touch panel coordinates and game field coordinates will be described.

In FIG. 34, the touch panel 13 has an exemplary coordinate system corresponding to the coordinate system of the second VRAM 25 as described above, and outputs data of position coordinates corresponding to a position which is input by the player through a touch operation. For example, the touch panel 13 is provided so as to cover the entire display area of the second LCD 12, in which touch panel coordinates (tx, ty) are defined. The touch panel coordinate (tx) indicates a position along the lateral direction (i.e., the horizontal direction in FIG. 34) on the second LCD 12, whereas the touch panel coordinate (ty) indicates a position along the vertical direction on the second LCD 12 (i.e., the vertical direction in FIG. 34). On the other hand, game field coordinates define a coordinate system corresponding to the entire area of the soccer field which is set in the game space, such that the positions of player objects, enemy objects, and the like are to be designated within this coordinate system. For example, game field coordinates (gx, gy) are defined in the soccer field which is set in the game space as viewed from above. The game field coordinate (gx) indicates a position along a direction which is parallel to the side lines (touch lines) in the soccer field (i.e., the horizontal direction in FIG. 34), whereas the game field coordinate (gy) indicates a position along a direction which is parallel to the goal lines in the soccer field (i.e., the vertical direction in FIG. 34). The conversion from touch panel coordinates to game field coordinates is performed by using a predetermined coordinate conversion function which maps any point expressed by touch panel coordinates to a corresponding point on the game field in the second LCD 12.

Referring back to FIG. 24, after the process of step S72, the CPU core 21 performs a process of translating the defense line (step S73), and proceeds to the next step S74. The trajectory data (FIG. 19) which is designated in the defense line action data 2n is composed of a plurality of pieces of game field coordinate data, as described later. The defense line is to be translated along the gx direction by adding or subtracting a predetermined value to or from the gx value of each coordinate point constituting the trajectory data. Specifically, attention is paid to the gy value of the game field coordinates (gx, gy) which have been obtained through the conversion at step S72. In the trajectory data for the defense line, a coordinate point having the same gy value as this gy value is selected (this coordinate point will be referred to as the "coordinate point DY"). Next, the gx value of the game field coordinates (gx, gy) which have been obtained through the conversion at step S72 is compared against the gx value of the coordinate point DY, and a difference therebetween is defined as dx. Then, the difference dx is added to the gx value of each coordinate point in the trajectory data for the defense line action data 2n. Thus, in accordance with the player's drag operation, the CPU core 21 calculates trajectory data for translating the defense line along a direction which interconnects the goals on the soccer field.

At step S74, the CPU core 21 determines whether the player has touched a coordinate point on the game field in the second LCD 12. In other words, it is determined whether the touch panel coordinates which are currently being touched by the player are within the soccer field represented by the second game image displayed on the second LCD 12. If the touch panel coordinates fall within the soccer field, the CPU core 21 proceeds to the next step S75. If the touch panel coordinates fall outside the soccer field, control proceeds to the next step S91.

At step S75, the CPU core 21 converts the touch panel coordinates which are currently being touched by the player to game field coordinates. Next, the CPU core 21 determines whether an input has been made by the player using the side switch (R button) 14g (step S76). If an input has been made using the side switch 14g, the CPU core 21 sets the enlargement flag 2t (see FIG. 19) to "on", sets the game field coordinates obtained by converting the touch panel coordinates as central coordinates for enlargement 2u (see FIG. 19) (step S77), and ends the processing of this subroutine. As a result, a flag indicating that enlargement is to be performed for the second game image to be displayed on the second LCD 12 and central coordinates used for the enlargement are set. Note that, at step S76, the operation switch section 14 which is used by the CPU core 21 to determine whether enlargement is to be performed may be other than the side switch 14g. On the other hand, if no input has been made using the side switch 14g, the CPU core 21 proceeds to the next step S78.

At step S78, the CPU core 21 determines whether coordinate data exists in the trajectory data buffer 2k (see FIG. 19). If coordinate data exists in the trajectory data buffer 2k, the CPU core 21 proceeds to the next step S79. On the other hand, if no coordinate data exists in the trajectory data buffer 2k, the CPU core 21 proceeds to the next step S82. It is while a sequence of trajectory inputs are being continuously made that coordinate data exists in the trajectory data buffer 2k. On the other hand, it is when a first touch operation for a sequence of trajectory inputs has just been made that no coordinate data exists in the trajectory data buffer 2k.

At step S79, the CPU core 21 determines whether the count of the sampling timer 2r (see FIG. 19) has reached a predetermined amount of time (e.g., 16 ms) or above. If the count of the sampling timer 2r is equal to or greater than the predetermined amount of time, the CPU core 21 additionally stores the game field coordinates which are obtained through the conversion at step S75 (step S80) to the trajectory data buffer 2k. Then, after clearing the sampling timer 2r, the CPU core 21 causes counting to be started (step S81), and ends the processing of this subroutine. On the other hand, if the count of the sampling timer 2r is less than the predetermined amount of time, the CPU core 21 ends the processing of this subroutine. Through repetitions of the processes of steps S79 to S81, game field coordinates obtained by converting the touch panel coordinates as touched by the player in every predetermined amount of time are sampled at the interval of 16 ms, and are stored to the trajectory data buffer 2k.

At step S78, if no coordinate data exists in the trajectory data buffer 2k, the CPU core 21 proceeds to the next step S82. At step S82, the CPU core 21 performs a touch-controllable athlete selection process (step S82), and proceeds to the next step. Hereinafter, with reference to FIG. 26, the touch-controllable athlete selection process will be described.

In FIG. 26, in accordance with the position and displayed size designated in each piece of player's team athlete data 2d, the CPU core 21 sets a judgment region for the athlete (player object) (step S111), and proceeds to the next step. Note that the judgment region is to be set by using one size of judgment region data 2b (large size 2bL, medium size 2bM, or small size 2bS). The size is to be selected in accordance with the displayed size designated in the player's team athlete data 2d. For example, if the displayed size in the player's team athlete data 2d is set at the large size 2a2L, then the large size 2bL of judgment region data 2b is used for the player's team athlete judgment region. By using a position designated in the player's team athlete data 2d as a central position, judgment region data 2b corresponding to the displayed size is pasted, whereby a judgment region on the game field coordinate system is set (e.g., areas shown by broken lines in FIG. 6).

Next, the CPU core 21 determines whether game field coordinates (game field coordinates corresponding to the touched position) obtained through the conversion at step S75 fall within the judgment region which has been set at step S111 (step S112). If the game field coordinates fall within the judgment region, the CPU core 21 nominates the player's team athlete for which the judgment region has been set at step S111 as a candidate athlete (step S113), and proceeds to the next step S114. On the other hand, if the game field coordinates do not fall within the judgment region, the CPU core 21 proceeds to the next step S114.

At step S114, the CPU core 21 determines whether the processes of steps S111 and S112 have been performed for every player's team athlete. If any unprocessed player's team athlete is still left, the CPU core 21 returns to step S111 to repeat the process for the other player's team athlete(s). On the other hand, if the process has been performed for all player's team athletes, among the candidate athletes which have been nominated at step S113, the CPU core 21 sets the candidate athlete whose symbolized representation's outer periphery lies closest to the game field coordinates obtained through the conversion at step S75 as a touch-controllable athlete, sets an athlete number designated for this athlete in the player's team athlete data 2d as the touch-controllable athlete number 2g (see FIG. 18) (step S115), and ends the processing of this subroutine. Through these processes, as shown in FIG. 6, on the field, a player object whose judgment region accommodates a touch operation start point and the outer periphery of whose symbolized representation lies closest to the touch operation start point is set as a touch-controllable athlete.

Referring back to FIG. 24, after the process of step S82, the CPU core 21 clears the trajectory input timer 2q, and thereafter causes counting to be started (step S83). Thus, a duration for which a sequence of trajectory inputs is continued is measured. Next, the CPU core 21 stores to the trajectory data buffer 2k the game field coordinates obtained through the conversion at step S75 (step S84). Then, after clearing the sampling timer 2r, the CPU core 21 causes counting to be started (step S85), and ends the processing of this subroutine.

In FIG. 25, if the touch panel coordinates fall outside the soccer field, the CPU core 21 proceeds to the next step S91. In other words, the process of step S91 and the subsequent steps are processes to be performed in the case where the player has performed a touch operation outside the soccer field represented by the second game image displayed on the second LCD 12. The CPU core 21 determines whether the touch panel coordinates which are currently being touched by the player coincide with any of the following positions: a defense line K (see FIG. 10; step S91); a displayed position of the offense button OB (see FIG. 4; step S92); a displayed position of the defense button DB (see FIG. 5; step S93); a displayed position of the mark button MB (see FIG. 11; step S94); and a displayed position of the display-all-area button AB (see FIG. 16; step S95).

If the touch panel coordinates which are currently being touched by the player are on the defense line K ("Yes" at step S91), the CPU core 21 sets the defense line movement flag 2s to "on" (step S96), and ends the processing of this subroutine.

If the touch panel coordinates which are currently being touched by the player are at the displayed position of the offense button OB ("Yes" at step S92), the CPU core 21 refers to the description in the display size change table 2c corresponding to the case where an offense button operation is performed (2c1), and accordingly updates the displayed sizes stored in the player's team athlete data 2d. Specifically, the CPU core 21 sets the displayed sizes of any pieces of player's team athlete data 2d having the attribute values FW and MF to medium size, and sets the displayed sizes of any pieces of player's team athlete data 2d having the attribute values DF and GK to small size. Thus, when the player has touch-operated the offense button OB, the player objects which are responsible for the offense have their displayed sizes in the second game image set so as to be relatively large as compared to the other player objects. Then, the CPU core 21 ends the processing of this subroutine.

If the touch panel coordinates which are currently being touched by the player are at the displayed position of the defense button DB ("Yes" at step S93), the CPU core 21 refers to the description in the display size change table 2c corresponding to the case where a defense button operation has been performed (2c2), and accordingly updates the displayed sizes stored in the player's team athlete data 2d. Specifically, the CPU core 21 sets the displayed sizes of any pieces of player's team athlete data 2d having the attribute values DF and GK to medium size, and sets the displayed sizes of any pieces of player's team athlete data 2d having the attribute values FW and MF to small size. Thus, when the player has touch-operated the defense button DB, the player objects which are responsible for the defense have their displayed sizes in the second game image set so as to be relatively large as compared to the other player objects. Then, the CPU core 21 ends the processing of this subroutine.

If the touch panel coordinates which are currently being touched by the player are at the displayed position of the mark button MB ("Yes" at step S94), the CPU core 21 performs a mark button process (step S99). Hereinafter, the mark button process will be described with reference to FIG. 27.

In FIG. 27, the CPU core 21 refers to the description in the display size change table 2c corresponding to the first phase of the case where a mark button operation has been performed (2c3), and accordingly updates the displayed sizes stored in the enemy team athlete data 2e (see FIG. 18) (step S121). Specifically, the CPU core 21 sets the displayed sizes of any pieces of enemy team athlete data 2e having the attribute values FW and MF to medium size, and sets the displayed sizes of any pieces of enemy team athlete data 2e having the attribute values DF and GK to small size. Next, the CPU core 21 awaits a further touch panel input from the player (step S122), and accepts a further input of touch panel coordinates indicative of the displayed position of an enemy team athlete (enemy object) having the attribute value FW or MF in the second game image (steps S123 and S124).

At step S124, if a further input of touch panel coordinates is made which are indicative of the displayed position of an enemy team athlete of the attribute value FW or MF, the CPU core 21 determines the enemy team athlete which is designated by the touch panel coordinates as a target of marking (step S125). Next, the CPU core 21 restores the displayed size of the enemy team athlete data 2e as set at step S121 to the original size (step S126). Specifically, the CPU core 21 sets the displayed sizes of any pieces of enemy team athlete data 2e having the attribute values FW and MF to small size.

Next, the CPU core 21 refers to the description in the display size change table 2c corresponding to the second phase of the case where a mark button operation has been performed (2c3), and accordingly updates the displayed sizes stored in the player's team athlete data 2d (step S127). Specifically, the CPU core 21 sets the displayed sizes of any pieces of player's team athlete data 2d having the attribute value DF to medium size, and sets the displayed sizes of any pieces of player's team athlete data 2d having the attribute value FW, MF, and GK to small size. Then, the CPU core 21 awaits a further touch panel input from the player (step S128), and accepts a further input of touch panel coordinates indicative of the displayed position of a player's team athlete (player object) having the attribute value DF in the second game image (steps S129 and S130).

At step S130, if a further input of touch panel coordinates is made which are indicative of the displayed position of a player's team athlete having the attribute value DF, the CPU core 21 writes, into the mark data in a piece of player's team athlete data 2d corresponding to that player's team athlete, the athlete number of the enemy team athlete which has been set as a target of marking at step S125. Next, the CPU core 21 restores the displayed size of the player's team athlete data 2d as set at step S127 to the original size (step S132), and ends the processing of this subroutine. Specifically, the CPU core 21 sets the displayed sizes of any pieces of player's team athlete data 2d having the attribute value DF to small size. Thus, when the player has touch-operated the mark button MB, enemy objects which could become targets of marking and the player objects capable of performing the marking have their displayed sizes in the second game image set so as to become relatively large as compared to the other player objects at their respective selection timings. In a manner similar to the above description of FIG. 26, the determinations at steps S124 and S130 are made by relying on judgment regions which are set in accordance with the displayed size data.

Referring back to FIG. 25, if the touch panel coordinates which are currently being touched by the player are at the displayed position of the display-all-area button AB ("Yes" at step S95), the CPU core 21 sets the enlargement flag 2t (see FIG. 19) to "off" (step S100), and ends the processing of this subroutine. If the results of the determinations at steps S91 to S95 are all "No", the CPU core 21 ends the processing of this subroutine.

With reference to FIG. 28, the detailed procedure of the trajectory action process at step S21 will be described. In FIG. 28, the CPU core 21 causes the trajectory input timer 2q to stop counting (step S141). Next, the CPU core 21 determines whether the coordinate data 2k1, 2k2, etc., stored in the trajectory data buffer 2k lie astride both side lines (touch lines) of the soccer field (step S142). If the coordinate data 2k1, 2k2, etc., lie astride both side lines, the CPU core 21 moves the coordinate data 2k1, 2k2, etc., stored in the trajectory data buffer 2k to the trajectory data 2n1 in the defense line action data 2n (step S143), and proceeds to the next step S149. On the other hand, if the coordinate data 2k1, 2k2, etc., stored in the trajectory data buffer 2k do not lie astride both side lines, the CPU core 21 proceeds to the next step S144.

At step S144, the CPU core 21 determines whether the count (time data) by the trajectory input timer 2q, which has stopped counting at step S141, is less than a predetermined amount of time (e.g., one second). If the count of the trajectory input timer 2q is less than the predetermined amount of time, the CPU core 21 extracts, from among the coordinate data 2k1, 2k2, etc., which are recorded in the trajectory data buffer 2k, a coordinate point ("first coordinate point") which was recorded in the buffer at the oldest point in time and a coordinate point ("last coordinate point") which was recorded in the buffer at the latest point in time. Next, the CPU core 21 calculates a vector from the first coordinate point to the last coordinate point, and stores a set of the athlete number designated in the touch-controllable athlete number 2g and the calculated vector data as a set of an athlete number and a flicking vector in the flicking action data 2m (e.g., flicking action data 2m1; see FIG. 19) (step S145). Then, the CPU core 21 activates a flicking action process (described later) (step S146), and proceeds to the next step S149. If only one piece of coordinate data is stored in the trajectory data buffer 2k, a zero vector is to be stored as the flicking vector.

On the other hand, if step S144 finds that the count of the trajectory input timer 2q is equal to or greater than the predetermined amount of time, the CPU core 21 records a set of the athlete number designated in the touch-controllable athlete number 2g and the coordinate data 2k1, 2k2, etc., which are recorded in the trajectory data buffer 2k, as a set of an athlete number and trajectory data in the tracing action data 21 (e.g., tracing action data 211; see FIG. 19) (step S147). Then, the CPU core 21 activates a tracing action process (described later) (step S148), and proceeds to the next step S149.

At step S149, the CPU core 21 clears coordinate data 2k1, 2k2, etc., stored in the trajectory data buffer 2k, and ends the processing of this subroutine.

Referring to FIG. 29, the detailed procedure of the automatic control process for the player's team athletes at step S22 will be described. First, the CPU core 21 selects one of the plurality of player's team athletes (player objects), and determines whether the player's team athlete is a switch-controllable athlete (step S151), a flicking action athlete (step S152), or a tracing action athlete (step S153). These determinations can be made by checking whether the athlete number designated for the selected player's team athlete is designated in the switch-controllable athlete number 2f, the flicking action data 2m, or the tracing action data 21. Then, if the selected player's team athlete is any of the above athletes ("Yes" at one of steps S151 to S153), the CPU core 21 proceeds to the next step S160 (i.e., no process is performed with respect to the player's team athlete). On the other hand, if the selected player's team athlete corresponds to none of the above athletes ("No" at all of steps S151 to S153), the CPU core 21 proceeds to the next step S154.

At step S154, the CPU core 21 determines whether the athlete number of an enemy team athlete to be marked is designated in the player's team athlete data 2d of the selected player's team athlete. If the athlete number of an enemy team athlete to be marked is designated in the player's team athlete data 2d, the CPU core 21 controls the player's team athlete so as to move toward the enemy team athlete (step S155), and proceeds to the next step S160. Specifically, the movement control is performed so that the position data (game field coordinates) in the player's team athlete data 2d is brought closer to the position data (game field coordinates) in the enemy team athlete data 2e by a predetermined distance (after moving by the predetermined distance, the player's team athlete follows the enemy team athlete).

On the other hand, if the athlete number of an enemy team athlete is not designated in the player's team athlete data 2d of the selected player's team athlete, the CPU core 21 determines whether trajectory data 2n1 exists in the defense line action data 2n (step S156). If any trajectory data 2n1 exists in the defense line action data 2n, the CPU core 21 determines whether the attribute value of the player's team athlete data 2d of the selected player's team athlete is DF (step S157). If the attribute value is DF, the selected player's team athlete is controlled so as to move toward the defense line by a predetermined distance (step S158), and control proceeds to the next step S160. Specifically, the movement control is performed so that the gx value of the game field coordinates in the player's team athlete data 2d is brought closer by a predetermined amount to the gx value of the coordinate data (among the coordinate data in the trajectory data 2n1 in the defense line action data 2n) that has the same gy value as the gy value of the game field coordinates in the player's team athlete data. On the other hand, if no trajectory data 2n1 exists in the defense line action data 2n, or if the attribute value is not DF, the CPU core 21 controls the movement of the selected player's team athlete according to a predetermined algorithm (step S159), and proceeds to the next step S160. The process of step S159 is to be performed by the CPU core 21 using a predetermined thinking routine as in conventional techniques, and any detailed description thereof is omitted here.

At step S160, the CPU core 21 determines whether the process has been completed for every player's team athlete. If any unprocessed player's team athlete is still left, the CPU core 21 returns to step S151 to repeat the process for the other player's team athlete(s). On the other hand, if the process has been performed for all player's team athletes, the CPU core 21 ends the processing of this subroutine.

Next, referring to FIG. 30, the tracing action process will be described. The tracing action process, which is to be performed in parallel to the main process as mentioned earlier, is begun when the CPU core 21 processes step S148. If there is a plurality of player objects to be subjected to the tracing action process, each one of them is processed in parallel. For example, if the player object P1 and the player object P2 are in a tracing action state, the tracing action process for the player object P1 and the tracing action process for the player object P2 are performed in parallel. In other words, as many instances of the tracing action process as there are sets of athlete numbers and trajectory data stored in the tracing action data 21 are activated.

In FIG. 30, the CPU core 21 clears the tracing action timer 20 (see FIG. 19), and thereafter causes counting to be started (step S171). Next, the CPU core 21 moves a player's team athlete (hereinafter referred to as a "tracing action athlete") having an athlete number designated in the tracing action data 21 to a coordinate point which is recorded at the beginning of the trajectory data corresponding to the athlete number (step S172). Then, the CPU core 21 deletes the coordinate data used at step S172 (step S173), and proceeds to the next step. By deleting the coordinate data which has been used, the next piece of coordinate data comes to the beginning, so that this next piece of coordinate data will be referred to at the next run of step S172. Thus, the coordinate data in the trajectory data are referred to in a sequential order.

Next, the CPU core 21 determines whether any trajectory data exists in the tracing action data 21 (step S174). If there exists any trajectory data, the CPU core 21 waits for the count of the tracing action timer 2o to equal a predetermined amount of time (step S175), and thereafter returns to the aforementioned step S172 to continue with the process. On the other hand, if there exists no trajectory data, the CPU core 21 causes the tracing action timer 2o to stop counting (step S176), deletes the tracing action data 21 (including the athlete number) used in this flowchart (step S177), and ends the process according to this flowchart. Thus, the tracing action athlete is processed so as to move in the game field in every predetermined amount of time, along a trajectory along which the player has touched the touch panel 13.

Next, with reference to FIG. 31, the flicking action process will be described. The flicking action process, which is to be performed in parallel to the main process as mentioned earlier, is begun when the CPU core 21 processes step S146. If there is a plurality of player objects to be subjected to the flicking action process, each one of them is processed in parallel, as is the case with the tracing action process.

In FIG. 31, the CPU core 21 clears the flicking action timer 2p (see FIG. 19), and thereafter causes counting to be started (step S181). Next, the CPU core 21 moves a player's team athlete (hereinafter referred to as a "flicking action athlete") having an athlete number designated in the flicking action data 2m by a predetermined distance in accordance with the flicking vector which is designated in the flicking action data 2m (step S182). Then, the CPU core 21 waits for the count of the flicking action timer 2p to equal a predetermined amount of time (step S183), and thereafter determines whether the counting has reached a flicking action time Th (step S184). The CPU core 21 repeats steps S182 and S183 until the count of the flicking action timer 2p reaches the flicking action time Th. Once the flicking action time Th is reached, the CPU core 21 proceeds to the next step S185. As used herein, the flicking action time Th refers to a predetermined amount of time during which the flicking action athlete keeps moving in accordance with the flicking vector.

At step S185, the CPU core 21 causes the flicking action timer 2p to stop counting. Then, the CPU core 21 deletes the flicking action data 2m (including the athlete number) which was used in this flowchart (step S186), and ends the process according to this flowchart. Thus, the flicking action athlete is processed so as to move in the game field in a direction in which the player has touched the touch panel 13 (flicking operation), until reaching the flicking action time Th.

Referring to FIG. 32, the detailed procedure of the image generation process for a first game image of step S29 will be described. In FIG. 32, the CPU core 21 sets a virtual camera at a position in the game space for viewing the switch-controllable athlete which is positioned on the game field (step S191). Next, by using the field image data 2a13 contained in the 3D image data 2a1, the CPU core 21 generates a 3D soccer field (game field) image as viewed from the virtual camera, and writes this image into the first VRAM 23 via the first GPU 24 (step S192). Moreover, in accordance with the positions (game field coordinates) which are respectively set for the player's team athletes and the enemy team athletes, the CPU core 21 deploys the athletes on the game field. Then, by using the athlete image data 2a11 contained in the 3D image data 2a1, the CPU core 21 generates 3D athlete images (player objects and enemy objects) as viewed from the virtual camera at the respective deployment positions in accordance with their operational statuses and the like, and writes these images into the first VRAM 23 via the first GPU 24 (step S193). Furthermore, in accordance with the ball coordinates 2h which are designated for the ball, the CPU core 21 deploys the ball in the game field. Then, by using the ball image data 2a12 contained in the 3D image data 2a1, a 3D ball image (ball object) as viewed from the virtual camera is generated at the deployment position, and this image is written into the first VRAM 23 via the first GPU 24 (step S194). Moreover, the CPU core 21 adds a predetermined mark (e.g., a solid triangle) above the head of a player object corresponding to the switch-controllable athlete, writes such an image to the first VRAM 23 via the first GPU 24 (step S195), and ends the processing of this subroutine. Through this procedure, the images which are written into the first VRAM 23 are represented as the first game image. Since the image generation process for the first game image is similar to conventional image generation processes based on the game parameters which are set for each object, no further description thereof is provided herein.

Referring to FIG. 33, an exemplary image generation process for a second game image of the detailed procedure of step S30 will be described. In FIG. 33, the CPU core 21 determines whether an enlargement flag 2t is set to "on" (step S201). If the enlargement flag 2t is "on", the CPU core 21 enlarges the field image data 2a23 contained in the 2D image data 2a2, around the central coordinates for enlargement 2u, by a predetermined factor, thus generating a 2D soccer field (game field) image. The CPU core 21 writes this image into the second VRAM 25 via the second GPU 26 (step S202). Then, the CPU core 21 proceeds to the next step S204. On the other hand, if the enlargement flag 2t is "off", the CPU core 21 generates a 2D soccer field (game field) image by using the entire area of the field image data 2a23 contained in the 2D image data 2a2, and writes this image into the second VRAM 25 via the second GPU 26 (step S203). Then, the CPU core 21 proceeds to the next step S204.

At step S204, in accordance with the positions (game field coordinates) which are respectively set for the player's team athletes and the enemy team athletes, the CPU core 21 deploys the athletes on the game field. By using the athlete image data 2a21 contained in the 2D image data 2a2 of the displayed size respectively set therefor, 2D athlete images (symbolized player objects and enemy objects) are generated at the deployment positions, and written into the second VRAM 25 via the second GPU 26. In accordance with the ball coordinates 2h which are designated for the ball, the CPU core 21 deploys the ball in the game field. Then, by using the ball image data 2a22 contained in the 2D image data 2a2, a 2D ball image (symbolized ball object) is generated at the deployment position, and this image is written into the second VRAM 25 via the second GPU 26 (step S205), and control proceeds to the next step.

Next, the CPU core 21 determines whether trajectory data 2n1 exists in the defense line action data 2n (step S206). If trajectory data 2n1 exists in the defense line action data 2n, the CPU core 21 generates a defense line in a corresponding position on the game field in accordance with the trajectory data 2n1, writes this image into the second VRAM 25 via the second GPU 26 (step S209), and proceeds to the next step S207. On the other hand, if no trajectory data 2n1 exists in the defense line action data 2n, the CPU core 21 proceeds to the next step S207.

At step S207, the CPU core 21 determines whether there exists any tracing action data 21. If any tracing action data 21 exists, the CPU core 21 generates a trajectory in a corresponding position on the game field in accordance with the trajectory data in the tracing action data 21, writes this image into the second VRAM 25 via the second GPU 26 (step S210), and proceeds to the next step S208. On the other hand, if no tracing action data 21 exists, the CPU core 21 proceeds to the next step S208. If there exists a plurality of pieces of tracing action data, an image is drawn for each one of them.

At step S208, the CPU core 21 determines whether any coordinate data exists in the trajectory data buffer 2k. If any coordinate data exists, the CPU core 21 generates a trajectory in a corresponding position on the game field in accordance with the coordinate data, writes this image into the second VRAM 25 via the second GPU 26 (step S211), and ends the processing of this subroutine. On the other hand, if no coordinate data exists, the CPU core 21 ends the processing of this subroutine. Through this procedure, the images which are written into the second VRAM 25 are represented as the second game image. Since the image generation process for the second game image is similar to conventional image generation processes based on the game parameters which are set for each object, no further description thereof is provided herein.

Thus, in a game where the action or settings of a game object image (player object symbolized in the second game image) is changed by touch-operating the game object, the image of a game object that is highly likely to be operated in the current situation is enlarged, thereby facilitating touch-operation. Also, through the visual effect of enlarging the size of the game object image, the player can readily recognize a game object which is highly frequently operated in situations similar to the current situation.

Although the above descriptions are given with respect to a case where a plurality of 2D image data $2a2L$, $2a2M$, and $2a2L$ of different display sizes are previously stored in the WRAM 22 in order to enlarge the size of the game object image in the second game image, an enlarged image may be generated in a different manner. For example, the second image may be generated by storing, for each character, image data in one size, and enlarging/reducing the image data.

The above embodiments illustrate examples where two physically separate LCDs 11 and 12 are disposed one on top of the other (i.e., two vertically-arranged screens) as liquid crystal display sections embodying two screens. However, such two display screens may be realized by any other structure. For example, the first LCD 11 and the second LCD 12 may be disposed side by side upon one of the principle faces of the lower housing 18a. Alternatively, an LCD which has the same horizontal dimension as that of the first LCD 11 but has a vertical dimension which is twice as long as its horizontal dimension (i.e., an LDC which is physically a single entity but has a displayed size which can vertically accommodate two screens) may be employed to display two screens on one top of the other (so that the images will be displayed vertically adjacent to each other in a seamless fashion). Alternatively, an LCD which has the same vertical dimension as that of the first LCD 11 but has a horizontal dimension which is twice as long as its vertical dimension (i.e., an LDC which is physically a single entity but has a displayed size which can horizontally accommodate two screens) may be employed to display two screens side by side (so that the images will be displayed horizontally adjacent to each other in a seamless fashion). Thus, an LCD which is physically a single entity can be split into two screens for displaying the first and second game images. Regardless of the modes of the game images, the illustrative embodiments can be realized by providing a touch panel 13 on a screen which displays the second game image.

While the example embodiments have been described in detail, the foregoing description is in all aspects illustrative and not restrictive. It is understood that numerous other modifications and variations can be devised without departing from the scope of the example embodiments.

What is claimed is:

1. A game apparatus for displaying, on a display, a game image in which a plurality of game objects appear in a game space, each of the game objects having a predetermined parameter associated therewith, the game apparatus comprising:
    parameter storage locations for storing the parameter which is associated with each of the game objects;
    a coordinates designation element for inputting coordinates, on the display, designated by a player;
    display control programmed logic circuitry for disposing the game objects in the game space and displaying the disposed game objects on the display;
    designation determination programmed logic circuitry for determining whether the coordinates designated by the coordinates designation element represent a position within a determination area of a predetermined range corresponding to a position at which each of the game objects is displayed on the display;
    operation control programmed logic circuitry for causing, when the designation determination programmed logic circuitry determines that the coordinates designated by the coordinates designation element represent the position within the determination area of the predetermined range corresponding to the position at which each of the game objects is displayed on the display, the game object located at the position to perform a predetermined action;
    parameter determination programmed logic circuitry for determining whether the parameter associated with each of the game objects satisfies a predetermined condition; and
    area size change programmed logic circuitry for changing sizes of determination areas of any of the game objects having the parameter which satisfies the predetermined condition, without requiring the player to designate each of the game objects.

2. The game apparatus according to claim 1, wherein the parameter is associated with an attribute of each of the game objects, the attribute being associated with game object actions during game play, and
    the parameter determination programmed logic circuitry selects, as the predetermined condition, any of the game objects having a same specific attribute.

3. The game apparatus according to claim 2, wherein the attribute has at least one type, and a plural number of the game objects share a same attribute.

4. The game apparatus according to claim 1, wherein the display control programmed logic circuitry displays a button image on the display means,
    the designation determination programmed logic circuitry determines whether the coordinates designated by the coordinates designation element represent a position within a determination area corresponding to a position at which the button image is displayed on the display, and
    when the designation determination programmed logic circuitry determines that the coordinates designated by the coordinates designation element represent the position within the determination area corresponding to the position at which the button image is displayed on the display, the parameter determination programmed logic circuitry further determines, as the predetermined condition, whether the parameter corresponds to a content of the button image.

5. The game apparatus according to claim 4, wherein the button image is an offense button image and a defense button image.

6. The game apparatus according to claim 1, further comprising game situation determination programmed logic circuitry for determining whether a game situation is a predetermined situation during a game progression, wherein
    the parameter determination programmed logic circuitry determines, when the game situation determination programmed logic circuitry determines that the game situation is the predetermined situation, whether the parameter associated with the game situation satisfies the predetermined condition.

7. The game apparatus according to claim 6, wherein the display control programmed logic circuitry changes display sizes of any of the game objects having the parameter which satisfies the predetermined condition.

8. The game apparatus according to claim 1, wherein the display control programmed logic circuitry changes display sizes of any of the game objects having the parameter which satisfies the predetermined condition.

9. The game apparatus according to claim 8, wherein
when any of the game objects having the parameter which satisfies the predetermined condition are disposed at predetermined positions of a game field, the display control programmed logic circuitry further enlarges the display sizes of the game objects whose sizes have been already enlarged.

10. The game apparatus according to claim 1, wherein
when any of the game objects having the parameter which satisfies the predetermined condition are disposed at predetermined positions of a game field, the display control programmed logic circuitry enlarges the determination area of each of the game objects whose size has been already enlarged.

11. The game apparatus according to claim 1, wherein
the coordinates designation element is a pointing device which is any of a touch panel, a mouse or a touch pen.

12. A method for displaying, on a display, a game image in which a plurality of game objects appear in a game space, each of the game objects having a predetermined parameter associated therewith, the method comprising:
storing the parameter which is associated with each of the game objects;
receiving inputting coordinates, on the display, designated by a player;
controlling the display, including disposing the game objects in the game space and displaying the disposed game objects on the display;
determining whether the coordinates designated by the receiving represent a position within a determination area of a predetermined range corresponding to a position at which each of the game objects is displayed on the display;
causing, when the determining determines that the coordinates designated by the receiving represent the position within the determination area of the predetermined range corresponding to the position at which each of the game objects is displayed on the display, the game object located at the position to perform a predetermined action;
determining whether the parameter associated with each of the game objects satisfies a predetermined condition; and
changing sizes of determination areas of any of the game objects having the parameter which satisfies the predetermined condition, without requiring the player to designate each of the game objects.

13. The method according to claim 12, wherein
the parameter is associated with an attribute of each of the game objects, the attribute being associated with game object actions during game play, and
the determining whether the parameter associated with each of the game objects satisfies a predetermined condition includes selecting, as the predetermined condition, any of the game objects having a same specific attribute.

14. The methods according to claim 13, wherein
the attribute has at least one type, and a plural number of the game objects share a same attribute.

15. The method according to claim 12, wherein
the controlling the display includes displaying a button image on the display,
said determining whether the coordinates represent the position includes determining whether the coordinates designated by the receiving represent a position within a determination area corresponding to a position at which the button image is displayed on the display, and
when said determining whether the coordinates represent the position includes determining that the coordinates designated by the receiving represent the position within the determination area corresponding to the position at which the button image is displayed on the display, the determining whether the parameter associated with each of the game objects satisfies a predetermined condition includes further determining, as the predetermined condition, whether the parameter corresponds to a content of the button image.

16. The method according to claim 15, wherein
the button image is an offense button image and a defense button image.

17. The method according to claim 12, further comprising determining whether a game situation is a predetermined situation during a game progression, wherein
the determining whether the parameter associated with each of the game objects satisfies a predetermined condition includes determining, when the determining whether a game situation is a predetermined situation during a game progression determines that the game situation is the predetermine situation, whether the parameter associated with the game situation satisfies the predetermined condition.

18. The method according to claim 17, wherein
the controlling the display includes changing display sizes of any of the game objects having the parameter which satisfies the predetermined condition.

19. The method according to claim 12, wherein
the controlling the display includes changing display sizes of any of the game objects having the parameter which satisfies the predetermined condition.

20. The method according to claim 19, wherein
when any of the game objects having the parameter which satisfies the predetermined condition are disposed at predetermined positions of a game field, the controlling the display further enlarges the display sizes of the game objects whose sizes have been already enlarged.

21. The method according to claim 12, wherein
when any of the game objects having the parameter which satisfies the predetermined condition are disposed at predetermined positions of a game field, the controlling the display enlarges the determination area of each of the game objects whose size has been already enlarged.

22. The method according to claim 12, wherein
the receiving includes receiving input by a pointing device which is any of a touch panel, a mouse or a touch pen.

23. A non-transitory recording medium recording a game program causing a game system, provided with a display for displaying a game image in which a plurality of game objects appear in a game space, each of the game objects having a predetermined parameter associated therewith, to function as
parameter storage locations for storing the parameter which is associated with each of the game objects;
a coordinates designation element for inputting coordinates, on the display, designated by a player;
display control programmed logic circuitry for disposing the game objects in the game space and displaying the disposed game objects on the display;
designation determination programmed logic circuitry for determining whether the coordinates designated by the coordinates designation element represent a position within a determination area of a predetermined range corresponding to a position at which each of the game objects is displayed on the display;
operation control programmed logic circuitry for causing, when the designation determination programmed logic circuitry determines that the coordinates designated by the coordinates designation element represent the position within the determination area of the predetermined range corresponding to the position at which each of the game objects is displayed on the display, the game object located at the position to perform a predetermined action;

parameter determination programmed logic circuitry for determining whether the parameter associated with each of the game objects satisfies a predetermined condition; and area size change programmed logic circuitry for changing sizes of determination areas of any of the game objects having the parameter which satisfies the predetermined condition, without requiring the player to designate each of the game objects.

24. The non-transitory recording medium according to claim 23, wherein the parameter is associated with an attribute of each of the game objects, the attribute being associated with game object actions during game play, and the parameter determination programmed logic circuitry selects, as the predetermined condition, any of the game objects having a same specific attribute.

25. The non-transitory recording medium according to claim 24, wherein the attribute has at least one type, and a plural number of the game objects share a same attribute.

26. The non-transitory recording medium according to claim 23, wherein the display control programmed logic circuitry displays a button image on the display means, the designation determination programmed logic circuitry determines whether the coordinates designated by the coordinates designation element represent a position within a determination area corresponding to a position at which the button image is displayed on the display, and when the designation determination programmed logic circuitry determines that the coordinates designated by the coordinates designation element represent the position within the determination area corresponding to the position at which the button image is displayed on the display, the parameter determination programmed logic circuitry further determines, as the predetermined condition, whether the parameter corresponds to a content of the button image.

27. The non-transitory recording medium according to claim 26, wherein the button image is an offense button image and a defense button image.

28. The non-transitory recording medium according to claim 23, further comprising game situation determination programmed logic circuitry for determining whether a game situation is a predetermined situation during a game progression, wherein the parameter determination programmed logic circuitry determines, when the game situation determination programmed logic circuitry determines that the game situation is the predetermined situation, whether the parameter associated with the game situation satisfies the predetermined condition.

29. The non-transitory recording medium according to claim 28, wherein the display control programmed logic circuitry changes display sizes of any of the game objects having the parameter which satisfies the predetermined condition.

30. The non-transitory recording medium according to claim 23, wherein the display control programmed logic circuitry changes display sizes of any of the game objects having the parameter which satisfies the predetermined condition.

31. The non-transitory recording medium according to claim 30, wherein when any of the game objects having the parameter which satisfies the predetermined condition are disposed at predetermined positions of a game field, the display control programmed logic circuitry further enlarges the display sizes of the game objects whose sizes have been already enlarged.

32. The non-transitory recording medium according to claim 23, wherein when any of the game objects having the parameter which satisfies the predetermined condition are disposed at predetermined positions of a game field, the display control programmed logic circuitry enlarges the determination area of each of the game objects whose size has been already enlarged.

33. The non-transitory recording medium according to claim 23, wherein the coordinates designation element is a pointing device which is any of a touch panel, a mouse or a touch pen.

* * * * *